US012568971B2

(12) United States Patent
Rostami et al.

(10) Patent No.: US 12,568,971 B2
(45) Date of Patent: Mar. 10, 2026

(54) DEGRADATIVE METHOD

(71) Applicant: Catexel Technologies Limited, London (GB)

(72) Inventors: Fatemeh Bakhshandeh Rostami, Leiden (NL); Fabien Pierre Guy Gaulard, Dijon (FR); Ronald Hage, Leiden (NL)

(73) Assignee: Catexel Technologies Limited, London (GB)

( * ) Notice: Subject to any disclaimer, the term of this patent is extended or adjusted under 35 U.S.C. 154(b) by 771 days.

(21) Appl. No.: 17/802,197

(22) PCT Filed: Feb. 26, 2021

(86) PCT No.: PCT/EP2021/054913
§ 371 (c)(1),
(2) Date: Aug. 25, 2022

(87) PCT Pub. No.: WO2021/170840
PCT Pub. Date: Sep. 2, 2021

(65) Prior Publication Data

US 2023/0095399 A1 Mar. 30, 2023

(30) Foreign Application Priority Data

Feb. 28, 2020 (EP) .................................... 20160204

(51) Int. Cl.
*A01N 55/02* (2006.01)
*A01N 59/00* (2006.01)
*A01P 1/00* (2006.01)
*B01J 31/18* (2006.01)

(52) U.S. Cl.
CPC ............. *A01N 55/02* (2013.01); *A01N 59/00* (2013.01); *A01P 1/00* (2021.08); *B01J 31/182* (2013.01); *B01J 2231/70* (2013.01); *B01J 2531/72* (2013.01)

(58) Field of Classification Search
CPC . A01N 55/02; A01N 59/00; A01P 1/00; B01J 31/182; B01J 2231/70; B01J 2531/72
See application file for complete search history.

(56) References Cited

U.S. PATENT DOCUMENTS

| | | | |
|---|---|---|---|
| 3,332,882 | A | 7/1967 | Blumbergs et al. |
| 3,936,448 | A | 2/1976 | Lamberti |
| 4,128,494 | A | 12/1978 | Schirmann et al. |
| 4,397,757 | A | 8/1983 | Bright et al. |
| 4,412,934 | A | 11/1983 | Chung et al. |
| 4,675,393 | A | 6/1987 | Coxon |
| 4,751,015 | A | 6/1988 | Humphreys et al. |
| 6,464,868 | B1 | 10/2002 | Korin |
| 2001/0025695 | A1 | 10/2001 | Patt et al. |
| 2009/0203567 | A1 | 8/2009 | Fernholz et al. |
| 2010/0311139 | A1 | 12/2010 | Baures et al. |
| 2014/0303060 | A1 | 10/2014 | Goekcen et al. |

FOREIGN PATENT DOCUMENTS

| | | | |
|---|---|---|---|
| CL | 2016000965 | A1 | 11/2016 |
| CN | 102459551 | A | 5/2012 |
| CN | 106397617 | A | 2/2017 |
| EP | 0120591 | A1 | 10/1984 |
| EP | 0174132 | A2 | 3/1986 |
| EP | 0185522 | A2 | 6/1986 |
| EP | 0284292 | A2 | 9/1988 |
| EP | 0303520 | A2 | 2/1989 |
| EP | 0331229 | A2 | 9/1989 |
| EP | 0458396 | A1 | 11/1991 |
| EP | 0464880 | A1 | 1/1992 |
| EP | 0544440 | A2 | 6/1993 |
| EP | 0544519 | A2 | 6/1993 |
| EP | 0549271 | A1 | 6/1993 |
| EP | 0549272 | A1 | 6/1993 |
| EP | 0798311 | A1 | 10/1997 |
| GB | 836988 | A | 6/1960 |
| GB | 864798 | A | 4/1961 |
| GB | 907356 | A | 10/1962 |
| GB | 1003310 | A | 9/1965 |
| GB | 1246339 | A | 9/1971 |
| GB | 1261829 | A | 1/1972 |
| GB | 1398421 | A | 6/1975 |
| GB | 1398422 | A | 6/1975 |
| GB | 1439000 | A | 6/1976 |
| GB | 1519351 | A | 7/1978 |
| GB | 1596756 | A | 8/1981 |
| WO | 94/08981 | A1 | 4/1994 |
| WO | 1995/07972 | A1 | 3/1995 |
| WO | 1997/35888 | A1 | 10/1997 |
| WO | 2000/15750 | A1 | 3/2000 |
| WO | 2003/022752 | A1 | 3/2003 |
| WO | 2006/125517 | A1 | 11/2006 |
| WO | 2007/042192 | A2 | 4/2007 |
| WO | 2009/071451 | A2 | 6/2009 |
| WO | 2010/138737 | A2 | 12/2010 |
| WO | 2010/139727 | A1 | 12/2010 |
| WO | 2011/106906 | A1 | 9/2011 |
| WO | 2013/033864 | A1 | 3/2013 |
| WO | 2013/087764 | A1 | 6/2013 |
| WO | 2014/102332 | A1 | 7/2014 |
| WO | 2017/181005 | A1 | 10/2017 |

(Continued)

OTHER PUBLICATIONS

Antonelli et al., Peracetic acid for secondary effluent disinfection: a comprehensive performance assessment. Water Sci Technol. 2013;68(12):2638-44.

(Continued)

*Primary Examiner* — Robert A Wax
*Assistant Examiner* — Olga V. Tcherkasskaya
(74) *Attorney, Agent, or Firm* — McCarter & English, LLP; Yu Lu; James M. Alburger

(57) ABSTRACT

The present invention relates to a method of degrading biofilm by contacting it with an aqueous mixture comprising a peroxide compound and a manganese complex, wherein the aqueous mixture comprises a macrocylic ligand. The invention also relates to a method of degrading a biofilm by contacting it with an aqueous mixture comprising a peroxide compound and a macrocyclic ligand.

20 Claims, 1 Drawing Sheet

(56) References Cited

FOREIGN PATENT DOCUMENTS

| | | | |
|---|---|---|---|
| WO | 2018/009076 | A1 | 1/2018 |
| WO | 2018/115867 | A2 | 6/2018 |
| WO | 2019/159021 | A1 | 8/2019 |
| WO | 2019/160948 | A1 | 8/2019 |

OTHER PUBLICATIONS

ASTM International, Standard Test Method for Testing Disinfectant Efficacy against Pseudomonas aeruginosa Biofilm using the MBEC Assay. Designation: E2799-17. 9 pages. May 30, 2022.

Burton et al., A microplate spectrofluorometric assay for bacterial biofilms. J Ind Microbiol Biotechnol. Jan. 2007;34(1):1-4.

Fu et al., Rheological evaluation of inter-grade and inter-batch variability of sodium alginate. AAPS PharmSciTech. Dec. 2010;11(4):1662-74.

Ghasemlou et al., Structural investigation and response surface optimisation for improvement of kefiran production yield from a low-cost culture medium. Food Chem. Jul. 15, 2012;133(2):383-9.

Gilbert et al., Formation and reaction of O=MnV species in the oxidation of phenolic substrates with H2O2 catalysed by the dinuclear manganese(IV) 1,4,7-trimethyl-1,4,7-triazacyclononane complex [MnIV2(mu-O)3(TMTACN)2](PF6)2. Org Biomol Chem. Apr. 21, 2004;2(8):1176-80.

Gomes et al., Standardized reactors for the study of medical biofilms: a review of the principles and latest modifications. Crit Rev Biotechnol. Aug. 2018;38(5):657-670.

Katara et al., Efficacy studies on peracetic acid against pathogenic microorganisms. Journal of Patient Safety and Infection Control. 2016;4(1):17-21.

Larimer et al., A method for rapid quantitative assessment of biofilms with biomolecular staining and image analysis. Anal Bioanal Chem. Jan. 2016;408(3):999-1008.

Lee et al., Alginate: properties and biomedical applications. Prog Polym Sci. Jan. 2012;37(1):106-126.

Lund et al., The Influence of Disinfection Processes on Biofilm Formation in Water Distribution Systems. Wat Res. 1995;29(4):1013-1021.

Molobela et al., Protease and amylase enzymes for biofilm removal and degradation of extracellular polymeric substance (EPS) produced by Pseudomonas fluorescens bacteria. African Journal of Microbiology Research. Jul. 18, 2010;4(14):1515-1524.

Paquet-Mercier et al., Through thick and thin: a microfluidic approach for continuous measurements of biofilm viscosity and the effect of ionic strength. Lab Chip. Nov. 29, 2016;16(24):4710-4717.

Patel, Biofilms and Antimicrobial Resistance. Clinical Orthopaedics and Related Research. 2005;437:41-47.

Quan et al., Water in bacterial biofilms: pores and channels, storage and transport functions. Crit Rev Microbiol. May 2022;48(3):283-302.

Reinhardt et al., Ligand salts, Metal-free bleach boosters for laundry applications. H&PC Today. Jul./Aug. 2014;9(4):54-57.

Reinhardt, Fingerprints of bleach systems. J Mol Catal A: Chemical. 2006;251:177-184.

Shen et al., Enhanced Efficacy of Peroxyacetic Acid Against Listeria monocytogenes on Fresh Apples at Elevated Temperature. Front Microbiol. Jun. 18, 2019;10:1196, 9 pages.

Smidsrod et al., Kinetic Studies on the Degradation of Alginic Acid by Hydrogen Peroxide in the Presence of Iron Salts. Acta Chemica Scandinavica. 1965;19:143-152.

Sutherland, Biofilm exopolysaccharides: a strong and sticky framework. Microbiology (Reading). Jan. 2001;147(Pt 1):3-9.

Trulear, Dynamics of biofilm processes. Journal WPCF. Sep. 1982;54(9):1288-1301.

Vauchel et al., Decrease In Dynamic Viscosity And Average Molecular Weight Of Alginate From Laminaria Digitata During Alkaline Extraction. J Phycol. Apr. 2008;44(2):515-7.

Vert et al., Terminology for biorelated polymers and applications (IUPAC Recommendations 2012). Pure Appl Chem. 2012;84(2):377-410.

Vu et al., Bacterial extracellular polysaccharides involved in biofilm formation. Molecules. Jul. 13, 2009;14(7):2535-54.

Wilson et al., Quantitative and Qualitative Assessment Methods for Biofilm Growth: A Mini-review. Res Rev J Eng Technol. Dec. 2017;6(4):42 pages.

Wingender et al., Isolation and biochemical characterization of extracellular polymeric substances from Pseudomonas aeruginosa. Methods Enzymol. 2001;336:302-14.

Xu et al., The War against Problematic Biofilms in the Oil and Gas Industry. J Microb Biochem Tech. 2015;7(5):1000e125, 2 pages.

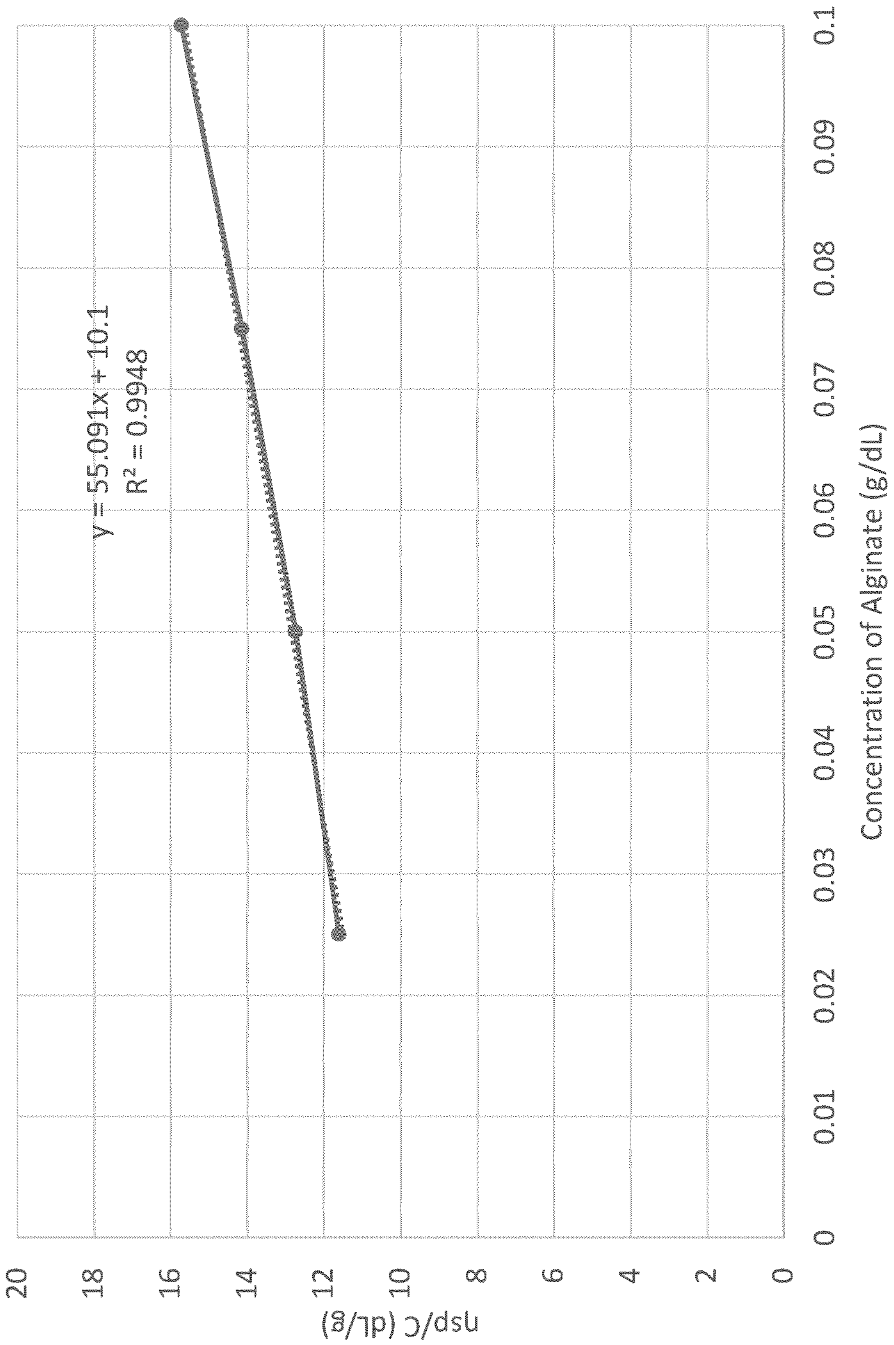
y = 55.091x + 10.1
R² = 0.9948
ηsp/C (dL/g)
Concentration of Alginate (g/dL)
0
2
4
6
8
10
12
14
16
18
20
0
0.01
0.02
0.03
0.04
0.05
0.06
0.07
0.08
0.09
0.1

DEGRADATIVE METHOD

REFERENCE TO RELATED APPLICATIONS

This application is a U.S. national stage filing under 35 U.S.C. § 371 based on International Patent Application No. PCT/EP2021/054913, filed on Feb. 26, 2021, which in turn claims priority to European Patent Application No. 20160204.2, filed on Feb. 28, 2020. The entire contents of each of the foregoing applications are expressly incorporated herein by reference.

FIELD OF THE INVENTION

The present invention relates to a method of degrading biofilm by contacting it with an aqueous mixture comprising a peroxide compound and a manganese complex, wherein the aqueous mixture comprises a macrocylic ligand. The invention also relates to a method of degrading a biofilm by contacting it with an aqueous mixture comprising a peroxide compound and a macrocyclic ligand.

BACKGROUND OF THE INVENTION

Biofilms are defined by M. Vert et al. in *Pure Appl. Chem.,* 2012, 84 (2), 377-410 as aggregates of microorganisms in which cells that are frequently embedded within a self-produced matrix of extracellular polymeric substances (EPS) adhere to each other and/or to a surface. The EPS are produced by the microorganisms within the matrix and typically comprise polysaccharides such as alginate, murein, colonic acid, bacterial cellulose, dextran, kefiran, curdlan, welan, gellan, and xanthan (see, for example, B. Vu et al in *Molecules* 2009, 14, 2535-2554). Since biofilms generally require water to form, they are especially common on equipment that is frequently or permanently exposed to aqueous environments, i.e. equipment operated in the presence of water. Biofilms are frequently found on membranes present in all types of filtration apparatus. All such membranes are susceptible to fouling with biofilms, particularly those found in reverse osmosis systems.

In addition to membranes, other equipment may also be susceptible to biofilm formation, in particular equipment that is frequently exposed to aqueous environments. This includes pipes and plumbing equipment; cleaning (including laundry, dishwashing and bathing) equipment, such as sinks, baths, showers, dishwashers, washing machines, tumble dryers, bidets, and surfaces within spaces used for cleaning (e.g. shower room walls and floors); cooling and heating systems; water vessels (including hulls of ships and boats); and marine apparatus. Aqueous mixtures are commonly used in oil and gas operations, and biofilm formation, for example in pipelines and other production equipment, is a significant problem (see, for example, D. Xu and T. Gu in *J. Microb. Biochem. Technol.* 2015, 7(5)).

Biofilms can restrict or block flow through apparatus, and can corrode materials, thereby reducing the lifetime of the material. Furthermore, biofilms sometimes contain pathogens, such as legionella, that may cause harm when present in water supplies. Prevention and/or treatment of biofilms reduces the need for servicing and cleaning equipment, and thus can lead to lower maintenance and system operating costs. Accordingly, the degradation and prevention of biofilms is commercially useful. However, biofilm degradation can be challenging.

Biofilms possess various defence mechanisms: the EPS may act as a diffusional barrier to degradative materials, and cells within biofilms are able to lower their metabolism in the presence of degradative materials, use efflux pumps to remove degradative materials from within the cell, and multiply quickly on removal of the degradative material, thereby allowing for fast recovery of biofilm following exposure to degradative materials (see D. Xu, and T. Gu, supra).

The EPS of biofilms often contain polysaccharides or proteins. Consequently, degradative methods often comprise the addition of proteases, and/or the addition of amylases, see for example I. P. Molobela, T. E. Cloete, and M. Beukes, *African J. of Microbiology Research,* 2010, 4 (14), 1515-1524. Since biofilms comprise colonies of microorganisms, antimicrobial agents may be employed in degradative methods. However, antimicrobial resistance of microorganisms within biofilms has been found to be greater than that of planktonic microorganisms, which can render biofilm degradative methods utilising antimicrobials ineffective (see R. Patel, *Clin. Orthop. Relat. Res.,* 2005, 437, 41-47).

Biofilms may be removed from equipment using cleaning solutions comprising organic peroxy acids (see WO 2019/160948 A1 and WO 2017/181005 A1, both Ecolab USA Inc.), or surfactants and enzymes (see WO 03/022752 A1, Advanced Biocatalytics Corp.).

Alternatively, biofilm formation may be prevented by using copolymers to reduce the adhesion of microorganisms to surfaces of interest (see, for example WO 2009/071451 A2 (Henkel AG & CO KGaA)), using compositions comprising cyclic ketones (see WO 2018/009076 A1 (Inhibio AS)), or using ultrasonic waves (see WO 2019/159021 A1, Harteel BVPA).

Commonly found biofilms often comprise alginic acids or alginates (used interchangeably herein). Alginates are hydrophilic polysaccharides and are commonly found in the cell walls of brown algae and various other microorganisms.

The use of iron salts and hydrogen peroxide to degrade alginates has been described by O Smidsrød et al. in *Acta Chem. Scand.,* 1965, 19, 143-152. It is shown that preferably high levels (>0.1 M) of hydrogen peroxide and iron(III) chloride (>100 μM) leads to reduction of the viscosity of alginates, assigned to the formation and involvement of the hydroxyl radicals.

In WO 2018/115867 A2 (Marine Biopolymers Ltd.), there is described a process for obtaining a target chemical species from seaweed, which includes a step of bleaching a seaweed portion. The bleaching step comprises use of a bleaching composition, which may include an oxidation catalyst, which may use the ligand 1,4,7-trimethyl-1,4,7-triazacyclononane ($Me_3$-TACN), and be $[(Mn^{IV})_2(\mu\text{-}O)_3(Me_3\text{-}TACN)_2]^{2+}$, $[(Mn^{III})_2(\mu\text{-}O)(\mu\text{-}CH_3COO)_2(Me_3\text{-}TACN)_2]^{2+}$, or $[Mn^{III}Mn^{IV}(\mu\text{-}O)_2(\mu\text{-}CH_3COO)(Me_4\text{-}DTNE)]^{2+}$; or suitable salts thereof. Subsequent optional depolymerisation of the alginate or salt thereof is also described but the use of manganese catalysts to degrade or depolymerise polymers is not disclosed in this application.

It would be of benefit to develop at least alternative methods to degrade biofilms, for example by degrading and/or depolymerising the EPS and/or materials within the microorganisms of biofilms (including materials such as alginates within cell walls of microorganisms). The present invention addresses this.

SUMMARY OF THE INVENTION

The present invention is based on the finding that aqueous mixtures comprising peroxide compound, manganese complexes and macrocyclic ligands are surprisingly active in degrading biofilms. The various defence mechanisms exhibited by biofilms to inhibit their degradation make them more challenging to degrade than their constituent materials, and the use of the aqueous mixtures described herein to degrade biofilms has not been previously disclosed.

Viewed from a first aspect, therefore, the present invention provides a method of degrading a biofilm comprising contacting the biofilm with an aqueous mixture comprising (i) a peroxide compound and (ii) a mononuclear Mn(II), Mn(III) or Mn(IV), or dinuclear Mn(II)Mn(II), Mn(III)Mn(II), Mn(III)Mn(III), Mn(III)Mn(IV) or Mn(IV)Mn(IV) manganese complex, wherein the aqueous mixture comprises a ligand of formula (I) or (II):

(I)

(II)

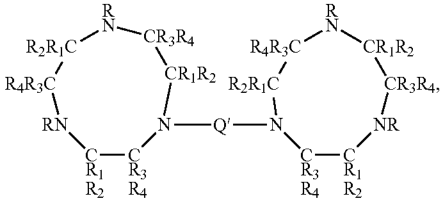

wherein:

Q=

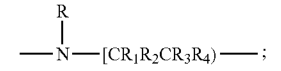

p is 3;

each R is independently selected from the group consisting of hydrogen, $C_1$-$C_{24}$alkyl, $CH_2C_6$-$C_{10}$aryl, $CH_2CH_2OH$, $CH_2COOH$, and pyridin-2-ylmethyl;

Q' is an ethylene or propylene bridge; and $R_1$, $R_2$, $R_3$, and $R_4$ are independently selected from: H, $C_1$-$C_4$alkyl and $C_1$-$C_4$alkylhydroxy.

Biofilms often contain manganese ions which, on addition of macrocyclic ligands, form manganese complexes that are active in degrading biofilm in the presence of peroxide compound. Thus, viewed from a second aspect, the present invention provides a method of degrading a biofilm comprising contacting the biofilm with an aqueous mixture comprising a peroxide compound and a ligand as defined in accordance with the first aspect.

Further aspects and embodiments of the present invention will be evident from the discussion that follows below.

BRIEF DESCRIPTION OF THE FIGURE

FIG. 1 shows a plot of the specific viscosity of alginate divided by the concentration of alginate in solution as a function of the concentration of alginate. The intrinsic viscosity may be determined from the Y intercept of the plot, as outlined in more detail in the experimental section below.

DETAILED DESCRIPTION OF THE INVENTION

In the discussion that follows, reference is made to a number of terms, which have the meanings provided below, unless a context indicates to the contrary. The nomenclature used herein for defining compounds, in particular the compounds according to the invention, is in general based on the rules of the IUPAC organisation for chemical compounds, specifically the "IUPAC Compendium of Chemical Terminology (Gold Book)". For the avoidance of doubt, if a rule of the IUPAC organisation is in conflict with a definition provided herein, the definition herein is to prevail. Furthermore, if a compound structure is in conflict with the name provided for the structure, the structure is to prevail.

The term "comprising" or variants thereof is to be understood herein to imply the inclusion of a stated element, integer or step, or group of elements, integers or steps, but not the exclusion of any other element, integer or step, or group of elements, integers or steps.

The term "consisting" or variants thereof is to be understood to imply the inclusion of a stated element, integer or step, or group of elements, integers or steps, and the exclusion of any other element, integer or step or group of elements, integers or steps.

The term "about" herein, when qualifying a number or value, is used to refer to values that lie within ±5% of the value specified. For example, if a molar ratio of formula (I) to manganese is from about 100:1 to about 0.1:1, molar ratios of 105:1 to 0.095:1 are included.

Reference to physical states of matter (such as liquid or solid) refer to the matter's state at 25° C. and atmospheric pressure unless the context dictates otherwise.

As summarised above, the present invention is based on the surprising finding that contacting a biofilm with an aqueous mixture comprising a peroxide compound, a manganese complex and a macrocyclic ligand of formula (I) or (II) results in degradation of the biofilm.

Degradation of biofilm herein is to be understood as the breaking up of at least a portion of the molecular structure of biofilm by the cleavage of molecular bonds. It is to be understood that degradation is not limited to the complete destruction of the molecular structure of biofilm. Partial degradation of the molecular structure of biofilm is included.

Degradation of biofilm may be achieved by, for example, depolymerising polymeric substances within the biofilm. Degradation may be measured in a variety of ways (see Wilson, C. et al., *Res. Rev. J. Eng. Technol.,* 2017, 6(4), 1-42; and Paquet-Mercier, F. et al., *Lab Chip.,* 2016, 16(24), 4710-4717). It may be measured as a loss of biofilm mass, for example the dry mass or the total carbon content of the biofilm; a reduction in biofilm viscosity or the viscosity of a component within the biofilm, for example the dynamic viscosity of the alginate within the biofilm; or a change in colour or absorbance of the biofilm itself, or the biofilm on staining with a suitable stain.

Viscosity is the measure of internal friction of (herein) a fluid. The dynamic viscosity of a fluid expresses its resistance to shear forces when adjacent layers move parallel to each other with different speeds. In any viscosity measurement of a (bio)polymer it is important to maintain a constant temperature of the solution and to employ a constant weight % of the (bio)polymer in the aqueous solutions as these parameters affect the viscosities of said solutions. In Vauchel et al., *J. Phycol.* 2008, 44, 515-517, dynamic viscosity and capillary viscosity measurements of alginates are used to derive the average alginate polymer chain lengths. The average polymer chain lengths of the alginates became shorter upon prolonging the time of alkaline extraction, i.e. the degree of degradation increased. Thus, dynamic viscosity measurements were employed to obtain information on the degree of alginate degradation.

Degradation of a biofilm may be measured by assessing the reduction in the dynamic viscosity of the components within the biofilm after degradation, and comparing this with the dynamic viscosity of the same components before degradation. For example, alginate may be present within the EPS of the biofilm. The dynamic viscosity of alginate extracted from the biofilm before and after degradation may be used to give an indication of the degree of biofilm degradation. In order to assess the dynamic viscosity of the alginate, it is extracted from the biofilm. J. Wingender, et al., *Methods Enzymol.,* 2001, 336, 302-314 describe a method to extract alginate from biofilm. After separation of microorganism cells from the EPS by centrifugation and dialysis (to remove low molecular weight matter), the polysaccharides can be isolated from the remaining material by addition of an organic solvent and treatment with nucleases and proteases (to degrade the nucleic acid components and proteins, leaving the polysaccharide components intact). When bound to cations, specifically dications such as $Ca^{2+}$, alginates may be difficult to handle. By addition of an acid, the carboxylate groups become protonated and gelled alginic acid forms. This material can be converted to the sodium alginate salt, filtered and further purified by either addition of calcium salt, giving a precipitation of Ca-alginate, or by addition of strong acid, to isolate alginic acid.

In some embodiments, the method of the invention reduces the dynamic viscosity of the alginate within the biofilm by at least about 10%, preferably by at least about 20% (wherein the dynamic viscosity is typically measured at 25° C.).

Alternatively, the difference in the dry mass (typically given as mass per unit area) of the biofilm, before and after it is degraded using the methods of the invention, may be used to assess the degree of biofilm degradation. Portions of the molecular structure of biofilm are cleaved on degradation, and may be easily separated from the residual bulk biofilm mass, for example by rinsing the biofilm with water or other liquid. The dry mass of the residual biofilm is found by placing the biomass in an oven at an elevated temperature (e.g. about 60° C. to about 105° C., without decomposition of (and thus loss of mass from) the biofilm, until the water has been removed. This has occurred when the mass of the biofilm is constant with heating time. The resultant mass value is divided by the area that was covered by the sample of biomass (before drying) to obtain the dry mass as the mass per unit area.

In some embodiments, the methods of the invention reduce the dry mass of the biofilm by at least about 1 wt %, preferably by at least about 10 wt %.

A commonly used method for the detection and quantitative analysis of biofilms is described by C. Larimer et al in *Analytical and Bioanalytical Chem.,* 2016, 408, 999. In this method, broad-spectrum biomolecular staining is used to enhance the visibility of the cells, nucleic acids, and proteins within the biofilm. The amount of biofilm is then quantitatively determined by digital image analysis, based on the intensity of the colour of the biofilm after staining. Alternatively, cationic dyes such as Crystal Violet, may be used. These dyes adhere to the anionic polysaccharides and other negatively-charged constituents of biofilms. Crystal Violet assays are often used to assess the amount of biofilm present. The use of such assays to assess the amount of biofilm in microtiter plates using microplate readers is described by E. Burton et al in *J. Ind. Microbiol. Biotechnol.,* 2007, 34(1), 1-4. In the same paper, spectrofluorometric assays are also described, which are based on the binding of fluorescent probes to N-acetylglucosamide present in biofilms. The amount of biofilm is then quantitatively measured using a fluorescent plate reader.

Biofilms, as already defined herein, are aggregates of microorganisms in which cells that are frequently embedded within a self-produced matrix of extracellular polymeric substances (EPS) adhere to each other and/or to a surface (see M. Vert et al., supra). The EPS are produced by the microorganisms within the matrix and typically comprise polysaccharides such as alginate, murein, colanic acid, bacterial cellulose, dextran, kefiran, curdlan, welan, gellan, and xanthan (see B. Vu et al in *Molecules* 2009, 14, 2535-2554; and Sutherland, I. W., *Microbiology,* 2001, 147, 3-9).

Consistent with their usage in the art, and as reviewed by K. Yong Lee and D. J. Mooney, *Prog. Polym. Sci.* 2012, 37(1), 106-126, the terms alginate(s) and alginic acid(s) are used interchangeably herein to refer to linear co-polymers comprised of 1,4-linked β-D-mannuronic acid (M) and α-L-guluronic acid (G) building blocks. The monomers can appear in homopolymeric blocks of G residues (G-blocks, such as a block with the structure: GGGGGGG), M residues (M-blocks, such as a block with the structure: MMMMMM) or alternating M and G residues (MG blocks, such as a block with the structure: MGMGMGMGMG). Alginates may comprise any number of combinations of M-blocks, G-blocks and/or MG-blocks. The solubility of alginate in water at pH values higher than the pKa values of β-D-mannuronic acid (3.38) and α-L-guluronic acid (3.65) is high, but at pH values lower than the pKa values, an increasing extent of acid groups become protonated, reducing the solubility of the polymer. Polymers with MG-blocks have higher solubility in water than polymers with separate M- and G-blocks. The proportion of M and G within an alginate and the length of blocks within an alginate differs depending on the source of the alginate.

Biofilms may comprise alginate from different bacterial genera. Examples include *Azotobacter* and *Pseudomonas* genera, specifically from the bacterial cell walls. Alginate is often a major component of a biofilm's matrix.

Biofilms may comprise murein, which is often found within bacterial cell walls. Since Gram-positive bacteria are characterised by thicker cell walls (relative to Gram-negative bacteria), they are typically sources of murein. Often, biofilms comprise murein from different bacteria, typically Gram-positive bacteria, such as bacteria of the *Staphylococcus* genus, for example *Staphylococcus Epidermidis*. Murein is a peptidoglycan consisting of sugars and amino acids. The sugar consists of alternating β-(1,4) linked N-acetylglucosamine and N-acetylmuramic acid. Each N-acetylmuramic acid residue is attached to a 4- or 5-amino acid chain via its lactic acid residue. The amino acid chain comprises a combination of amino acids, which may be L- or D-enantiomers. Examples include alanine, glutamic acid, glutamine, lysine, glycine and meso-diaminopimelic acid. The amino acid chain may cross-link to another amino acid chain within the murein.

Biofilms may comprise colonic acids, which may be produced by bacteria, such as bacteria of the Enterobacteriaceae family, for example bacteria of the *Enterobacter* and *Klebsiella* genera. Colanic acids are branched polysaccharides comprising glucose, galactose, fucose, glucuronic acid, acetate and pyruvate.

Biofilms may comprise bacterial cellulose, from bacterial genera such as *Acetobacter, Sarcina ventriculi* and *Agrobacterium* genera. Bacterial cellulose refers to polymers comprised of β 1,4-linked D-glucose units produced by bacteria. It has significantly different macromolecular properties to plant cellulose. For example, bacterial cellulose is typically more chemically pure, has a higher hydrophilicity and a greater tensile strength. Bacterial cellulose is typically produced as an extracellular polysaccharide that forms a protective barrier around bacteria.

Biofilms may comprise dextran, which may be produced by bacteria, such as bacteria of the *Streptococcus* genus. Dextran refers to poly-α-D-glucosides of microbial origin having α-1,6 glycosidic linkages. Dextran is a branched polysaccharide, with branches from α-1,3 glycosidic linkages. The specific structure of dextran depends on the strain of the microbe from which it is produced.

Biofilms may comprise kefiran, which may be produced by bacteria, such as the *Lactobacillus* genus. Kefiran is a branched polysaccharide composed of approximately equal proportions of glucose and galactose. As reported by Ghasemlou, M. et al in *Food Chem.*, 2012, 133(2), 383-389, Kefiran possesses a backbone of (1→6)-linked glucose, (1→3)-linked galactose, (1→4)-linked galactose, (1→4)-linked glucose and (1→2,6)-linked galactose (with a branch attached to O-2 of galactose residues and terminated with glucose residues).

Biofilms may comprise curdlan, which may be produced by from bacteria, such as bacteria from the *Agrobacterium* genus. Curdlan is a linear β-1,3-glucan, comprising entirely of 1,3-β-D-glycosidic linkages. It may be produced as an exopolysaccharide by bacteria, such as bacteria of the *Agrobacterium* genus.

Biofilms may comprise welan, which may be produced by bacteria, such as bacteria of the *Alcaligenes* genus. Welan is a branched polysaccharide consisting of repeating tetrasaccharide units comprising two D-glucose monomers, D-glucuronic acid and L-rhamnose, with monomeric L-rhamnose or L-mannose side chains on C3 of every 1,4-linked glucose.

Biofilms may comprise gellan, which may be produced by bacteria, such as bacteria of the *Sphingomonas* genus. Gellan is similar in structure to Welan, but is a linear polysaccharide, i.e. it does not comprise L-rhamnose or L-mannose side chains.

Biofilms may comprise xanthan, which may be produced by bacteria, such as bacteria of the *Xanthomonas* genus. Xanthan refers to a branched polysaccharide, with a backbone consisting of β-(1,4)-D-glucose. Each alternate glucose residue is bonded to a three sugar side chain consisting of a glucuronic acid residue positioned between two mannose residues. An acetyl group may be bonded to the C6 position of the mannose residue positioned nearest the backbone, and a pyruvate group may be bonded at the C4 and C6 positions of the terminal mannose.

Without being bound by theory, the methods of the invention are understood to depolymerise the polysaccharides within the cell walls of microorganisms within the biofilm and/or within the EPS of the biofilm, thereby breaking up the cell walls of the microorganisms and/or breaking up the EPS, degrading the biofilm and allowing for easier biofilm removal by conventional cleaning processes The methods of the invention comprise contacting the biofilm with an aqueous mixture. It will be understood that contacting may be achieved in a variety of ways. Preferably, however, the aqueous mixture is applied to the biofilm or to a mixture comprising the biofilm. The method of application may be any method that results in the contacting of the aqueous mixture and the biofilm. Typically, the aqueous mixture is applied to the biofilm as a solution, a foam or a suspension, preferably a solution or a foam. The aqueous mixture may be applied to the biofilm by squirting it or spraying it onto the biofilm. Alternatively, a mixture comprising the biofilm may be applied to the aqueous mixture, or the biofilm may be applied directly to the aqueous mixture.

"Mixture" is used herein to refer to a combination of two or more components. For example, the aqueous mixture of the first aspect of the invention comprises water, a peroxide compound, a manganese complex and a macrocyclic ligand. The aqueous mixture may be a suspension (for example, a slurry or paste), comprising a solution in which a proportion of the peroxide compound, manganese complex and macrocyclic ligand of formula (I) or (II) are dissolved, with the remaining proportion suspended in the solution. Alternatively, the aqueous mixture may be a solution in which the peroxide compound, manganese complex and macrocyclic ligand are dissolved. The aqueous mixture is typically a solution.

If a solution, the aqueous mixture of the first aspect of the invention is typically formed by dissolving the manganese complex, peroxide compound and (if added separately to the manganese complex) ligand of formula (I) or (II) in (optionally buffered) solvent (typically water). It is to be understood that any suitable method can be used to form the aqueous mixtures of the invention, the following description focusing on the first aspect of the invention (the skilled person will understand that appropriate adjustments (e.g. to omit a manganese complex) may be made with regard to the method of the second aspect of the invention where the aqueous mixture need not comprise a manganese complex). The peroxide compound may be commercially available as a solution and may be added as a solution to the solvent before, after, or with (i.e. at the same time as) addition of the manganese complex and optional ligand. For example, an aqueous solution comprising a peroxide compound may be added to water before, after, or with the manganese complex, which may be $[Mn^{IV}Mn^{IV}(\mu\text{-}O)_3(1,4,7\text{-trimethyl-}1,4,7\text{-triazacyclononane})_2][CH_3COO]_2$ ("μ" denoting, according to convention, a bridging ligand). Alternatively, if the peroxide compound is commercially available as a solid, it may be dissolved in an (optionally buffered) solvent (typically water) before contacting with the manganese complex and optional ligand. Examples of solid peroxide compounds include sodium percarbonate, sodium perborate monohydrate and sodium perborate tetrahydrate.

If ligand of formula (I) or (II) is added separately to the manganese complex, it may be added to the solvent before, after, or with the manganese complex, and the peroxide compound may similarly be added before, after, or with the ligand. For example, the ligand, such as 1,4,7-trimethyl-1,4,7-triazacyclononane, may be added to water before, after or at the same time as addition of the manganese complex, and addition of an aqueous solution comprising the peroxide compound. If the peroxide compound is a solid, it may be mixed with the manganese complex and optional ligand of formula (I) or (II) (if not part of the manganese complex). The resultant mixture may then be added to the solvent and dissolved to form the aqueous mixture. For example, a mixture of solid sodium percarbonate, manganese complex, and ligand such as 1,4,7-trimethyl-1,4,7-triazacyclononane may be added to water and dissolved in the water. Typically, however, the solid peroxide compound is first dissolved in water, to which the manganese complex and optional ligand of formula (I) or (II) (if not part of the manganese complex) is added, and the resultant mixture is contacted with biofilm. Alternatively, the solid peroxide may be dissolved in water and added to biofilm. The manganese complex and optional ligand of formula (I) or (II) (if not part of the manganese complex) may then be added to the mixture. Similar variations as those just discussed may be practised where the aqueous mixture is a suspension.

Further variations are possible. For example, the manganese complex need not be added as such: manganese ions may be present in, or may be added to, an aqueous mixture and a manganese complex formed in the aqueous mixture by addition of an appropriate ligand of formula (I) or (II). Furthermore, and in accordance with the second aspect of the invention, the biofilm may comprise sufficient quantities of manganese ions that useful quantities of the manganese complexes described herein can be generated in the aqueous mixture by addition of an appropriate amount of the ligands of formula (I) or (II) described herein.

In accordance with the first aspect of the invention, the aqueous mixture which contacts the biofilm comprises (i) a peroxide compound and (ii) a mononuclear Mn(II), Mn(III) or Mn(IV), or dinuclear Mn(II)Mn(II), Mn(III)Mn(II), Mn(III)Mn(III), Mn(III)Mn(IV) or Mn(IV)Mn(IV) manganese complex, wherein the aqueous mixture comprises a ligand of formula (I) or (II).

It is not necessary that the ligand of formula (I) or (II) is part of the manganese complex, i.e. such a ligand may be uncomplexed in the aqueous mixture. In some embodiments, the manganese complex comprises the ligand, as in $[Mn^{IV}Mn^{IV}(\mu\text{-}O)_3$(1,4,7-trimethyl-1,4,7-triazacyclononane$)_2][CH_3COO]_2$. The aqueous mixture may comprise excess ligand such that the manganese complex comprises the ligand and the aqueous mixture comprises additional, uncomplexed ligand.

The aqueous mixtures used in accordance with the aspects of the invention, and embodiments thereof, comprise a ligand of formula (I) and/or (II), wherein R is independently selected from the group consisting of $C_1$-$C_{24}$alkyl, $CH_2C_6$-$C_{10}$aryl, $CH_2CH_2OH$, $CH_2COOH$ and pyridin-2-ylmethyl.

If the biofilm is contacted with the aqueous mixture (e.g. solution) disclosed herein as a mixture, it may be a slurry, paste or suspension.

The term "alkyl" is well known in the art and defines univalent groups derived from alkanes by removal of a hydrogen atom from any carbon atom, wherein the term "alkane" is intended to define cyclic or acyclic branched or unbranched hydrocarbons. If an alkyl is a $C_1$-$C_4$alkyl, it is selected from the group consisting of methyl, ethyl, n-propyl, isopropyl, n-butyl, sec-butyl, isobutyl and tert-butyl.

The term "aryl" is also well known in the art and defines univalent groups derived from arenes by removal of a hydrogen atom from a ring carbon atom, wherein the term "arene" is intended to define monocyclic and polycyclic aromatic hydrocarbons. The term "aromatic" defines a cyclically conjugated molecular entity with a stability (due to delocalisation) significantly greater than that of a hypothetical localised structure. The Huckel rule is often used in the art to assess aromatic character; monocyclic planar (or almost planar) systems of trigonally (or sometimes diagonally) hybridised atoms that contain (4n+2) π-electrons (where n is a non-negative integer) will exhibit aromatic character. The rule is generally limited to n=0 to 5.

R may be independently selected from the group consisting of $C_1$-$C_{24}$alkyl, $CH_2C_6$-$C_{10}$aryl, $CH_2CH_2OH$ and $CH_2COOH$. Often, the alkyl is a $C_1$-$C_{12}$alkyl, thus R is often independently selected from the group consisting of $C_1$-$C_{12}$alkyl, $CH_2C_6$-$C_{10}$aryl, $CH_2CH_2OH$ and $CH_2COOH$.

Typically, where R is an alkyl, it is a $C_1$-$C_6$alkyl. Preferably, the alkyl is a methyl.

Often, where R is $CH_2C_6$-$C_{10}$aryl, it is a benzyl. Thus, in some embodiments, R is independently selected from the group consisting of $C_1$-$C_6$alkyl, benzyl, $CH_2CH_2OH$ and $CH_2COOH$.

R may be independently selected from $C_1$-$C_6$alkyl or $CH_2C_6$-$C_{10}$aryl. In some embodiments, R is independently selected from $C_1$-$C_6$alkyl or benzyl. Typically, R is independently selected from methyl or benzyl, preferably methyl.

Typically, each R is the same.

In formula (I) and formula (II), $R_1$, $R_2$, $R_3$, and $R_4$ are independently selected from H, $C_1$-$C_4$alkyl and $C_1$-$C_4$alkylhydroxy. The term "alkylhydroxy" is used herein to refer to univalent groups derived from alkyl groups by substitution of a hydrogen atom (—H) for a hydroxyl group (—OH). The $C_1$-$C_4$alkylhydroxy may be selected from the group consisting of hydroxymethyl, hydroxyethyl, hydroxyl-n-propyl, hydroxyisopropyl, hydroxyl-n-butyl, hydroxyl-sec-butyl, hydroxyisobutyl and hydroxyl-tert-butyl. Preferably, the $C_1$-$C_4$alkyl is methyl and the $C_1$-$C_4$alkylhydroxy is hydroxymethyl, thus, $R_1$, $R_2$, $R_3$, and $R_4$ are often independently selected from H, methyl and hydroxymethyl. Typically, $R_1$, $R_2$, $R_3$, and $R_4$ are independently H or methyl. Preferably, $R_1$, $R_2$, $R_3$, and $R_4$ are H.

When Q' is a propylene bridge in formula (II), it may be 1,3-propylene ($—(CH_2)_3—$) or 1,2-propylene ($—CH_2CH(CH_3)—$).

Often, Q' is an ethylene bridge and the ligand of formula (II) is thus represented by the following structure

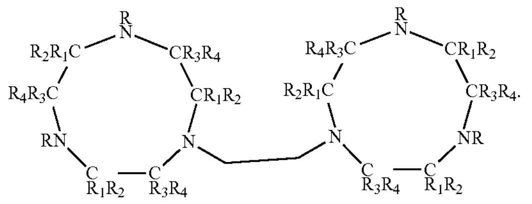

Often, the ligand of formula (I) is 1,4,7-trimethyl-1,4,7-triazacyclononane ($Me_3$-TACN) and the ligand of formula (II) is 1,2-bis(4,7-dimethyl-1,4,7-triazacyclonon-1-yl)-ethane ($Me_4$-DTNE). Thus, in some embodiments the ligand is $Me_3$-TACN or $Me_4$-DTNE. In many embodiments, the ligand is $Me_3$-TACN.

In accordance with the method of the first aspect of the invention the manganese complex is a mononuclear Mn(II), Mn(III) or Mn(IV), or dinuclear Mn(II)Mn(II), Mn(III)Mn(II), Mn(III)Mn(III), Mn(III)Mn(IV) or Mn(IV)Mn(IV) complex. The skilled person is familiar with such complexes and salts of such complexes, which may form in the aqueous mixture, without isolation, or which may be well-defined.

By a well-defined complex is meant herein (as the term is customarily used in the art) a complex that has been isolated such that it is susceptible to characterisation (i.e. definition) and analysis (e.g. to determine its structure and degree of purity). In contrast, a complex that is not well-defined is one that is prepared without isolation from the medium (e.g. reaction medium) in which it is prepared.

Typically, the complex is a dinuclear complex. However, the use of salts of mononuclear manganese ion-containing complexes is also within the scope of the present invention. Examples of such complexes are described in patent publication applications EP 0549271 A1, EP 0549272 A1, EP 0544519 A2 and EP 0544440 A2 (all Unilever).

Mononuclear manganese complexes that comprise a ligand of formula (I) comprise one ligand of formula (I) for every manganese ion, to which the ligand of formula (I) coordinates. Dinuclear manganese complexes that comprise a ligand of formula (I) generally comprise two ligands of formula (I) for every two manganese ions, in which each ligand of formula (I) is coordinated to one manganese ion. For example, when the ligand of formula (I) is $Me_3$-TACN, and the manganese complex comprises the ligand, the manganese complex may be a mononuclear complex comprising one manganese ion and one $Me_3$-TACN ligand or a dinuclear complex comprising two manganese ions and two $Me_3$-TACN ligands.

In contrast, dinuclear manganese complexes that comprise a ligand of formula (II) typically comprise one ligand of formula (II) for every two manganese ions and the ligand of formula (II) coordinates to each manganese ion in the complex. For example, when the ligand of formula (II) is $Me_4$-DTNE, and the manganese complex comprises the ligand, the manganese complex may be a dinuclear complex comprising two manganese ions and one $Me_4$-DTNE ligand.

As mentioned above, the aqueous mixture, comprises excess ligand in certain embodiments such that the manganese complex comprises the ligand and the aqueous mixture comprises further uncomplexed ligand. Used herein, "excess ligand" refers to a ratio of ligand to manganese ions resulting in an aqueous mixture comprising uncomplexed ligand. Accordingly, excess ligand refers to a ratio of formula (I) to manganese ions that is greater than 1, and typically refers to a ratio of ligand of formula (II) to manganese ions that is greater than 0.5. When the aqueous mixture comprises excess ligand, it may comprise a mixture of uncomplexed ligand and not well-defined mononuclear and dinuclear manganese complexes. For example, when the ligand is of formula (II), such as $Me_4$-DTNE, the aqueous mixture may comprise a not well-defined mixture of dinuclear complexes comprising two manganese ions and one $Me_4$-DTNE ligand, mononuclear complexes comprising one manganese ion and one $Me_4$-DTNE ligand (with one of the macrocyclic rings of the ligand uncomplexed), and uncomplexed $Me_4$-DTNE ligand.

In some embodiments, the manganese complex is well-defined. The manganese complex may be well-defined and the aqueous mixture further comprises uncoordinated ligand.

Whilst uncomplexed ligands of formula (I) or (II), which may be used in accordance with the invention, do not by themselves, i.e. in the absence of manganese ions, degrade biofilm, the inventors have found that degradation of biofilm is unexpectedly more effective when excess ligand (i.e. of formula (I) or (II)) is present. Also, as described above, a biofilm may contain manganese ions, which may bind to a ligand of formula (I) or (II), leading to biofilm degradation activity in the presence of a peroxide. Without being bound by theory, the presence of excess ligand may shift the equilibria to favour complexation of the ligand to manganese. On practising a method of the invention, should some of the ligand complexed to the manganese complexes become uncomplexed (and for example degrade or otherwise become unable to complex to manganese ions), then it may be replaced by the excess ligand in the aqueous mixture, thereby regenerating manganese complexes comprising ligands of formula (I) or (II).

Typically, the molar ratio of a ligand of formula (I) to manganese in the aqueous mixture of the first aspect of the invention is from about 100:1 to about 0.1:1, more typically from about 10:1 to about 0.5:1, even more typically from about 5:1 to about 0.8:1 and most typically from about 2:1 to about 1.001:1. A molar ratio of about 1:1 refers to either a well-defined manganese complexes comprising a ligand of formula (I) with no uncomplexed ligand in the aqueous mixture, or to a mixture of manganese complex and a ligand of formula (I) in equimolar ratio.

Typically, the molar ratio of a ligand of formula (II) to manganese in the aqueous mixture of the first aspect of the invention is from about 50:1 to about 0.05:1, more typically from about 5:1 to about 0.1:1, even more typically from about 3:1 to about 0.2:1 and most typically from about 1:1 to about 0.5001:1. A molar ratio of 0.5:1 refers either to well-defined manganese complexes comprising a ligand of formula (II) with no uncomplexed ligand in the aqueous mixture, or to a mixture of manganese complex and a ligand of formula (II) comprising two molar equivalents of manganese ions with respect to ligand of formula (II).

The manganese complexes used in accordance with this invention may comprise coordinating ligands additional to ligands of formula (I) or (II). When the manganese complex is a dinuclear manganese complex, it may comprise one or more bridging ligands. These are typically independently selected from the group consisting of oxide, hydroxide, water, phenylboronate, and $R^5COO^-$, wherein $R^5$ is selected from the group consisting of hydrogen, $C_1$-$C_{12}$alkyl and optionally $C_1$-$C_6$alkyl-substituted phenyl, which ligands bridge the two manganese ions. Often, the $C_1$-$C_{12}$alkyl is a $C_1$-$C_6$alkyl, particularly often a $C_1$-$C_4$alkyl, and preferably methyl. Often, the optionally $C_1$-$C_6$alkyl-substituted phenyl is an optionally $C_1$-$C_4$alkyl-substituted phenyl, preferably a methyl-substituted phenyl.

The term "substituted" when used herein is intended to refer to the replacement of a hydrogen atom on the group referred to with the referenced substituent(s). For example, optionally $C_1$-$C_6$alkyl-substituted phenyl refers to a phenyl, in which one or more of the hydrogen atoms are optionally replaced with a $C_1$-$C_6$alkyl, typically with a methyl, whereby to provide, for example, benzyl.

$R^5$ is typically selected from the group consisting of hydrogen (i.e. the bridging ligand is a formate), $C_1$-$C_{12}$alkyl and phenyl optionally substituted with one or more methyl groups. Even more typically, $R^5$ is selected from the group consisting of hydrogen, $C_1$-$C_6$alkyl and phenyl. Yet more typically, $R^5$ is selected from the group consisting of hydrogen, $C_1$-$C_4$alkyl and phenyl wherein $C_1$-$C_4$alkyl is preferably methyl. Preferably, $R^5$ is methyl or phenyl, most preferably methyl, i.e. if a carboxylate bridge is present, it is preferably either acetate or benzoate, most preferably acetate.

The one or more bridging ligands are in particular embodiments one or a combination selected from the group consisting of oxide, hydroxide, water, acetate and benzoate.

In some embodiments, the dinuclear manganese complex comprises two or three bridging ligands, often three bridging ligands.

The manganese complex may be dinuclear, i.e. it comprises two manganese ions. Both such ions may be Mn(II), Mn(III) or Mn(IV), one ion may be Mn(II) and the other Mn(III), or one ion may be Mn(III) and the other Mn(IV). In some embodiments, the dinuclear manganese complex is a Mn(III)Mn(III), Mn(III)Mn(IV) or Mn(IV)Mn(IV) complex.

When the dinuclear manganese complex is a Mn(III)Mn(III) complex, it typically comprises one bridging oxide ligand and two bridging carboxylate ligands ($R^5COO^-$). Often, the carboxylate ligands are acetate ligands. When the Mn(III)Mn(II) complex comprises two ligands of $Me_3$-TACN, it is typically $[Mn^{III}Mn^{III}(\mu\text{-}O)(\mu\text{-}CH_3COO)_2(Me_3\text{-}TACN)_2]^{2+}$.

When the dinuclear complex is a Mn(III)Mn(IV) complex, it preferably comprises three bridging ligands; typically one or two bridging oxide ligands and two or one bridging acetate ligands. When the Mn(III)Mn(IV) complex comprises two ligands of formula (I) (for example when two $Me_3$-TACN ligands are chelating the Mn ions), it typically comprises one bridging oxide ligand and two bridging acetate ligands. Thus, the dinuclear complex may be $[Mn^{III}Mn^{IV}(\mu\text{-}O)(\mu\text{-}CH_3COO)_2(Me_3\text{-}TACN)_2]^{3+}$. In contrast, when the Mn(III)Mn(IV) complex comprises one ligand of formula (II) (for example when a $Me_4$-DTNE is chelating both Mn ions in the complex) it typically comprises two bridging oxide ligands and one bridging acetate ligand. Thus, the dinuclear complex is typically $[Mn^{III}Mn^{IV}(\mu\text{-}O)_2(\mu\text{-}CH_3COO)(Me_4\text{-}DTNE)]^{2+}$.

When the dinuclear complex is a Mn(IV)Mn(IV) complex, it typically comprises two or three bridging oxide ligands and no or one bridging acetate ligand. When the Mn(IV)Mn(IV) complex comprises two ligands of formula (I) (for example when two $Me_3$-TACN ligands are chelating the Mn ions), it typically comprises three bridging oxide ligands. Thus, the dinuclear complex may be $[Mn^{IV}Mn^{IV}(\mu\text{-}O)_3(Me_3\text{-}TACN)_2]^{2+}$. In contrast, when the Mn(IV)Mn(IV) complex comprises one ligand of formula (II) (for example when a $Me_4$-DTNE is chelating both Mn ions in the complex) it typically comprises two bridging oxide ligands and one bridging acetate ligand. Thus, the dinuclear complex is typically $[Mn^{IV}Mn^{IV}(\mu\text{-}O)_2(\mu\text{-}CH_3COO)(Me_4\text{-}DTNE)]^{3+}$.

In some embodiments, the manganese complex is selected from any one of the group consisting of $[Mn^{III}Mn^{III}(\mu\text{-}O)(\mu\text{-}R^5COO)_2(Me_3\text{-}TACN)_2]^{2+}$, $[Mn^{III}Mn^{IV}(\mu\text{-}O)(\mu\text{-}R^5COO)_2(Me_3\text{-}TACN)_2]^{3+}$, $[Mn^{IV}Mn^{IV}(\mu\text{-}O)_3(Me_3\text{-}TACN)_2]^{2+}[Mn^{III}Mn^{IV}(\mu\text{-}O)_2(\mu\text{-}R^5COO)(Me_4\text{-}DTNE)]^{2+}$ and $[Mn^{IV}Mn^{IV}(\mu\text{-}O)_2(\mu\text{-}R^5COO)(Me_4\text{-}DTNE)]^{3+}$, wherein $R^5$ is as described above. Preferably, $R^5$ is methyl.

Typically, the manganese complex is selected from any one of the group consisting of $[Mn^{III}Mn^{III}(\mu\text{-}O)(\mu\text{-}CH_3COO)_2(Me_3\text{-}TACN)_2]^{2+}$, $[Mn^{III}Mn^{IV}(\mu\text{-}O)(\mu\text{-}CH_3COO)_2(Me_3\text{-}TACN)_2]^{3+}$, $[Mn^{IV}Mn^{IV}(\mu\text{-}O)_3(Me_3\text{-}TACN)_2]^{2+}[Mn^{III}Mn^{IV}(\mu\text{-}O)_2(\mu\text{-}CH_3COO)(Me_4\text{-}DTNE)]^{2+}$ and $[Mn^{IV}Mn^{IV}(\mu\text{-}O)_2(\mu\text{-}CH_3COO)(Me_4\text{-}DTNE)]^{3+}$.

Often, the manganese complex is $[Mn^{IV}Mn^{IV}(\mu\text{-}O)_3(Me_3\text{-}TACN)_2]^{2+}$ or $[Mn^{III}Mn^{IV}(\mu\text{-}O)_2(\mu\text{-}R^5COO)(Me_4\text{-}DTNE)]^{2+}$, wherein $R^5$ is as described above. Preferably, as noted above, $R^5$ is methyl.

As described above, the manganese complex of the invention may be not well-defined. For example, a variety of dinuclear Mn(II) complexes comprising two and/or three bridging ligands may be used, which upon exposure to air form dinuclear Mn(III)Mn(III), Mn(III)Mn(IV) or even Mn(IV)Mn(IV) species. Such a variety of dinuclear Mn(II) complexes may form in the aqueous mixture, for example, when the aqueous mixture comprises one or more manganese salts, such as $Mn(II)(acetate)_2$ and excess ligand of formula (I) or (II), such as $Me_3$-TACN.

Often, the mononuclear or dinuclear manganese complex is positively charged. Typically, the positive charge is balanced by one or more non-coordinating counteranions. In other words, the manganese complex may be part of a salt comprising one or more non-coordinating counterions. The identity of the counteranion(s) is not an essential feature of the invention although, for improved solubility in aqueous media, very large counterions, such as tetraphenylborate, are generally (although not necessarily) avoided.

Often, the non-coordinating counterions are selected from any one of the group consisting of $Cl^-$, $Br^-$, $I^-$, $NO_3^-$, $ClO_4^-$, $PF_6^-$, $SO_4^{2-}$, $R^6SO_3^-$, and $R^5COO^-$, wherein $R^5$ is as described above in respect of the carboxylate bridging ligands; and $R^6$ is optionally $C_1$-$C_6$alkyl-substituted phenyl, $C_1$-$C_6$alkyl (e.g. methyl) or $CF_3$. When $R^6$ is a $C_1$-$C_6$alkyl-substituted phenyl, the phenyl may be substituted one or more times with the $C_1$-$C_6$alkyl. Typically, when $R^6$ is a $C_1$-$C_6$alkyl-substituted phenyl, it is a $C_1$-$C_4$alkyl-substituted phenyl, wherein $C_1$-$C_4$alkyl is preferably methyl. $R^6$ may be phenyl optionally substituted with one or more methyl groups. Often, the phenyl is substituted with one methyl group, typically in the para position.

In some embodiments, the non-coordinating counterions are selected from the group consisting of $SO_4^{2-}$, $R^5COO$–, $Cl^-$, $NO_3^-$, $R^6SO_3^-$ and $PF_6^-$. Often, the non-coordinating counterions are selected from the group consisting of $SO_4^{2-}$, $CH_3COO^-$, $Cl^-$, $NO_3^-$, $CH_3C_6H_4SO_3^-$ (tosylate) and $PF_6^-$.

Salts comprising manganese complexes and having significant water-solubility, such as at least 30 g/l at 20° C., e.g. at least 50 g/l at 20° C. or at least 70 g/l at 20° C., are described in WO 2006/125517 A1 (Unilever PLC). The use of such highly water-soluble salts, i.e. salts having solubilities of at least 30 g/l at 20° C., e.g. at least 50 g/l at 20° C. or at least 70 g/l at 20° C., such as and typically (but not necessarily) those described in WO 2006/125517 A1 (Unilever PLC), for example those comprising small counterions such as chloride, nitrate, sulfate and acetate, can be advantageous since their high-water solubilities mean, for example, that greater concentrations of the salts can be used in the aqueous mixtures of the invention than when using poorly water-soluble salts, such as those comprising the $PF_6^-$ ion. For example, the water solubility of $[Mn^{IV}Mn^{IV}(\mu\text{-}O)_3(Me_3\text{-}TACN)_2][PF_6]_2$ is only 10.8 g/l at 20° C.

Moreover, poorly water-soluble salts such as those comprising $PFPF_6^-$ are typically formed by introduction of the anion ($PF_6^-$) as a potassium salt after the formation of the manganese complex, which leads to precipitation of the salt comprising the manganese complex and the poorly water-soluble counterion ($PF_6^-$). The precipitate is typically re-dissolved, for example in water, prior to addition to the aqueous mixture disclosed in accordance with the first aspect of the invention. Such additional steps introduce complexity and cost, as well as often occasioning the use of relatively large volumes of water or other solvent, since the solubility (in water) is quite low.

Thus, it is preferable that the non-coordinating counterions are selected from the group consisting of $Cl^-$, $NO_3^-$, $SO_4^{2-}$ and acetate. However, where the non-coordinating counterion is $PF_6$, the manganese complex is typically $[Mn^{IV}Mn^{IV}(\mu\text{-}O)_3(Me_3\text{-}TACN)_2]^{2+}$, i.e the manganese salt is typically $[Mn^{IV}Mn^{IV}(\mu\text{-}O)_3(Me_3\text{-}TACN)_2][PF_6]_2$.

In some embodiments, the manganese complex is part of a salt selected from any one of the group consisting of $[Mn^{III}Mn^{III}(\mu\text{-}O)(\mu\text{-}R^5COO)_2(Me_3\text{-}TACN)_2][CH_3COO]_2$, $[Mn^{III}Mn^{IV}(\mu\text{-}O)(\mu\text{-}R^5COO)_2(Me_3\text{-}TACN)_2][CH_3COO]_3$, $[Mn^{IV}Mn^{IV}(\mu\text{-}O)_3(Me_3\text{-}TACN)_2][CH_3COO]_2$, $[Mn^{III}Mn^{III}(\mu\text{-}O)(\mu\text{-}R^5COO)_2(Me_3\text{-}TACN)_2][SO_4]$, $[Mn^{III}Mn^{IV}(\mu\text{-}O)(\mu\text{-}R^5COO)_2(Me_3\text{-}TACN)_2]_2[SO_4]_3$, $[MnIVMn^{IV}(\mu\text{-}O)_3(Me_3\text{-}TACN)_2][SO_4]$, $[Mn^{III}Mn^{III}(\mu\text{-}O)(\mu\text{-}R^5COO)_2(Me_3\text{-}TACN)_2][NO_3]_2$, $[Mn^{III}Mn^{IV}(\mu\text{-}O)(\mu\text{-}R^5COO)_2(Me_3\text{-}TACN)_2][NO_3]_3$, $[Mn^{IV}Mn^{IV}(\mu\text{-}O)_3(Me_3\text{-}TACN)_2][NO_3]_2$, $[Mn^{IV}Mn^{IV}(\mu\text{-}O)_3(Me_3\text{-}TACN)_2][PF_6]_2$, $[Mn^{III}Mn^{IV}(\mu\text{-}O)_2(\mu\text{-}R^5COO)(Me_4\text{-}DTNE)][Cl]_2$ and $[Mn^{IV}Mn^{IV}(\mu\text{-}O)_2(\mu\text{-}R^5COO)(Me_4\text{-}DTNE)][Cl]_3$, wherein $R^5$ is as described above. Preferably, $R^5$ is methyl.

Preferably, the manganese complex is part of a salt selected from any one of the group consisting of $[Mn^{IV}Mn^{IV}(\mu\text{-}O)_3(Me_3\text{-}TACN)_2][CH_3COO]_2$, $[Mn^{IV}Mn^{IV}(\mu\text{-}O)_3(Me_3\text{-}TACN)_2][SO_4]$, $[Mn^{IV}Mn^{IV}(\mu\text{-}O)_3(Me_3\text{-}TACN)_2][NO_3]_2$ or $[Mn^{III}Mn^{IV}(\mu\text{-}O)_2(\mu\text{-}R^5COO)(Me_4\text{-}DTNE)][Cl]_2$, wherein $R^5$ is as described above. Preferably, $R^5$ is methyl.

It is to be understood that the salt comprising the manganese complex may (in its solid form) contain additional water molecules, known in the art as hydrates. For example, crystalline $[Mn^{IV}Mn^{IV}(\mu\text{-}O)_3(Me_3\text{-}TACN)_2][PF_6]_2$ typically comprises one water molecule within its crystal lattice. The molecular formula of the hydrate is $[Mn^{IV}Mn^{IV}(\mu\text{-}O)_3(Me_3\text{-}TACN)_2][PF_6]_2 \cdot H_2O$.

A solid manganese salt (comprising the manganese complex) may be synthesised in such a way that it is isolated in combination with additional salts. During synthesis of the manganese salt, an excess of the reagent used to provide the desired counterion may have been used and may not have been separated from the resultant solid comprising the manganese salt. For example, potassium hexafluorophosphate may be present in solid $[Mn^{IV}Mn^{IV}(\mu\text{-}O)_3(Me_3\text{-}TACN)_2][PF_6]_2$ and sodium chloride may be present in $[Mn^{III}Mn^{IV}(\mu\text{-}O)_2(\mu\text{-}R^5COO)(Me_4\text{-}DTNE)][Cl]_2$ as exemplified in Example 2 of WO 2013/033864 A1 (Kemp, R. W. et al).

Alternatively, and in accordance with the second aspect, it is contemplated that the aqueous mixture contacted with the biofilm comprises a peroxide compound and a ligand of formula (I) or (II) without requiring the presence of manganese ions. The solvent used to make the aqueous mixture may contain manganese ions as an impurity, which may bind to the ligand of formula (I) or (II) to form (not well-defined) mononuclear or dinuclear manganese complexes. Similar observations have been made in relation to tea-stain bleaching, where notable bleaching effects were observed when using a salt of the protonated $Me_3$-TACN ligand in combination with hydrogen peroxide (G. Reinhardt, *J. Molecular Catalysis,* 2006, 251, 177-184). Furthermore, biofilms may also contain manganese ions that, upon addition of a ligand of formula (I) or (II) will form not well-defined mononuclear Mn(II), Mn(III), Mn(IV), or dinuclear Mn(II)Mn(II), Mn(III)Mn(II), Mn(III)Mn(III), Mn(III)Mn(IV), or Mn(IV) Mn(IV) complexes.

If, in accordance with the second aspect of the invention, the aqueous mixture contacted with the biofilm comprises a peroxide compound and ligand of formula (I) or (II) without requiring the presence of manganese ions, the concentration of manganese complex formed in the aqueous mixture is typically from about 0.0001 to about 300 μM, more typically from about 0.001 to about 200 μM, even more typically from about 0.01 to about 100 μM, and yet more typically from about 0.1 to about 50 μM. Often, the concentration of manganese complex is from about 0.01 to about 30 μM, and even more often from about 0.05 to about 20 μM.

On contacting the aqueous mixtures disclosed herein with biofilm, the biofilm is degraded. Surprisingly, the extent of degradation has been found by the inventors to be greater when, prior to the contacting, a manganese compound is contacted with a reducing agent to provide the manganese complex. It is to be understood that a "manganese compound" refers to any manganese ion-containing compound that, on contact with a reducing agent, forms the manganese complex referred to in the first aspect of the invention. Without being bound by theory, addition of a reducing agent may lower the oxidation state of the manganese ion or ions present in the manganese compound. Thus, the manganese ion(s) within the manganese compound are of a higher oxidation state than the manganese ion(s) within the corresponding manganese complex, which forms on contacting the manganese compound with a reducing agent.

In view of this, the reducing agent is generally contacted with manganese compounds comprising manganese ions with an oxidation state of 3 or more. Typically, the reducing agent is contacted with a mononuclear Mn(III) or Mn(IV) compound, or a dinuclear Mn(III)Mn(III), Mn(III)Mn(IV), or Mn(IV)Mn(IV) compound. In some embodiments, the manganese compound is a dinuclear Mn(III)Mn(III), Mn(III)Mn(IV) or Mn(IV)Mn(IV) compound.

As an example, addition of one molar equivalent of a two-electron reducing compound, such as ascorbic acid, to a dinuclear Mn(IV)Mn(IV) compound may lead to reduction of both Mn(IV) ions to yield a dinuclear Mn(III)Mn(III) complex. However, it is not necessarily the case that a well-defined dinuclear Mn(III)Mn(III) complex will be formed when one molar equivalent of a two electron reducing agent such as ascorbic acid is added to a well-defined dinuclear Mn(IV)Mn(IV) compound, such as a manganese compound comprising $[Mn^{IV}Mn^{IV}(\mu\text{-}O)_3(Me_3\text{-}TACN)_2]^{2+}$. Rather, different manganese complexes may be present in the resultant mixture, for example a mixture of dinuclear Mn(II)Mn(II), Mn(III)Mn(II), Mn(III)Mn(III), Mn(III)Mn (IV), or Mn(IV)Mn(IV) complexes may form (wherein the average oxidation state is Mn(III)Mn(III)). It might also be possible that ligand dissociation occurs leading to the formation of mononuclear manganese complexes, i.e. Mn(II), Mn(III) and/or Mn(IV) complexes, see for example B. C. Gilbert, et al. *Org. Biomol. Chem.,* 2004, 2, 1176-1180, or of course that less than complete (i.e. less than the stoichiometrically calculated) reduction occurs.

Where the manganese complex is provided by contacting a manganese compound with a reducing agent, the manganese complex is typically provided in a solution (typically an aqueous solution). Such a solution may be formed by any suitable method. For example, the manganese compound may be obtained or prepared as a solution or suspension and may be added as a solution or suspension to an optionally buffered solvent (typically water) before, after, or with a reducing agent. Alternatively, if the manganese compound is obtained or prepared as a solid, it may be added to the optionally buffered solvent (typically water) before contacting with the reducing agent. Where the reducing agent is a solid (such as ascorbic acid), it may be mixed with the manganese compound, and the resultant mixture may then be added to the solvent. Alternatively, the reducing agent may be provided in a solution or suspension (typically an aqueous solution or suspension).

The manganese compound may be selected from the group consisting of dinuclear Mn(III)Mn(III), Mn(III)Mn (IV) and Mn(IV)Mn(IV) complexes and, on contacting with the reducing agent, may provide any one or a combination of manganese complexes selected from the group consisting of mononuclear Mn(II), Mn(III) and Mn(IV), and dinuclear Mn(II)Mn(II), Mn(III)Mn(II), Mn(III)Mn(III) and Mn(III) Mn(IV) complexes.

The reducing agent may be any reducing agent suitable to lower the oxidation state of the manganese compound. Suitable reducing agents include ascorbic acid and ester derivatives, such as ascorbyl palmitate or ascorbyl stearate, optionally $C_1$-$C_4$alkyl- or allyl-substituted catechol, optionally $C_1$-$C_4$alkyl-substituted hydroquinone, pyrogallol, caffeic acid, optionally $C_1$-$C_4$alkyl-substituted maltol, n-propylgallate and alkali metal sulfites, alkali metal bisulfites and alkali metal thiosulfates.

The alkali metal of the sulfites, bisulfites and thiosulfates is often sodium or potassium, typically sodium.

The reducing agent may be any one selected from the group consisting of ascorbic acid, ascorbyl palmitate, ascorbyl stearate, catechol, hydroquinone, pyrogallol 4-tert-butyl catechol, 4-allylcatechol, tert-butyl hydroquinone, 2,5-di-tert-butyl hydroquinone, n-propylgallate, caffeic acid, maltol, ethylmaltol, sodium sulfite, sodium bisulfite and sodium thiosulfate.

The reducing agent is often anyone selected from the group consisting of ascorbic acid, ascorbyl palmitate, ascorbyl stearate, catechol, hydroquinone, pyrogallol, sodium sulfite, sodium bisulfite and sodium thiosulfate.

In some embodiments, the reducing agent is selected from the group consisting of ascorbic acid, catechol, hydroquinone, pyrogallol, and sodium sulfite. According to particular embodiments, the reducing agent is ascorbic acid.

Often, when the reducing agent is ascorbic acid, the manganese compound comprises a hexafluorophosphate counterion, for example the manganese compound is $[Mn^{IV}Mn^{IV}(\mu\text{-}O)_3(Me_3\text{-}TACN)_2][PF_6]_2$.

The molar ratio of the manganese compound comprising, for example, a dinuclear Mn(III)Mn(III), Mn(III)Mn(IV) or Mn(IV)Mn(IV) complex, to the reducing agent is typically from about 0.1:1 to about 10:1, more typically from about 0.2:1 to about 3:1, and most typically from about 0:5:1 to about 1:1, i.e. from about one or two molar equivalents of a reducing agent is added to the manganese compound. A large excess of reducing agent with respect to manganese compound may not be desirable, as the excess reducing agent may react with the peroxide compound present in the aqueous mixture. Conversely, a large excess of manganese compound may not be desirable, as the majority of the manganese compound may not react with the reducing agent, thereby remaining in a less active form.

In certain embodiments of the first aspect of the invention, the manganese compound comprises one or more of the ligands of formula (I) or one of the ligands of formula (II); two or three, preferably three, of the bridging ligands described herein; and/or one or more of the non-coordinating counterions described herein. It is not necessary that the ligand of formula (I) or (II) is part of the manganese compound. Such a ligand may be added separately to the aqueous mixture and may contact with the transition metal compound on formation of the transition metal complex, or may remain uncomplexed in the aqueous mixture. For the avoidance of doubt, embodiments of the first aspect of the invention that apply to the manganese complex, apply mutatis mutandis to the manganese compound. For example, the manganese compound may comprise a ligand of formula (I) or (II), which is preferably $Me_3$-TACN or $Me_4$-DTNE. The manganese compound may comprise one or more non-coordinating counterions selected from the group consisting of $SO_4^{2-}$, $R^5COO^-$, $Cl^-$, $NO_3^-$, $R^6SO_3^-$ and $PF_6^-$, wherein $R^5$ and $R^6$ are as defined herein. Preferably the one or more non-coordinating counterions are selected from the group consisting of acetate, chloride, sulfate, nitrate and hexafluorophosphate, e.g. acetate, chloride, sulfate and nitrate.

In another example, the manganese compound may be dinuclear, and when dinuclear may comprise two or three bridging ligands independently selected from the group consisting of oxide, hydroxide, water, phenylboronate and $R^5COO$— wherein $R^5$ is as defined herein (preferably methyl).

In yet another example, the manganese compound may comprise any one of the group consisting of $[Mn^{III}Mn^{III}(\mu\text{-}O)(\mu\text{-}R^5COO)_2(Me\text{-}TACN)_2]^{2+}$, $[Mn^{III}Mn^{IV}(\mu\text{-}O)(\mu\text{-}R^5COO)_2(Me_3\text{-}TACN)_2]^{3+}$, $[Mn^{IV}Mn^{IV}(\mu\text{-}O)_3(Me_3\text{-}TACN)_2]^{2+}$$[Mn^{III}Mn^{IV}(\mu\text{-}O)_2(\mu\text{-}R^5COO)(Me_4\text{-}DTNE)]^{2+}$ and $[Mn^{IV}Mn^{IV}(\mu\text{-}O)_2(\mu\text{-}R^5COO)(Me_4\text{-}DTNE)]^{3+}$, wherein $R^5$ is as defined herein (preferably methyl).

The manganese compound may be any one of the group consisting of $[Mn^{III}Mn^{III}(\mu\text{-}O)(\mu\text{-}R^5COO)_2(Me_3\text{-}TACN)_2][CH_3COO]_2$, $[Mn^{III}Mn^{IV}(\mu\text{-}O)(\mu\text{-}R^5COO)_2(Me_3\text{-}TACN)_2][CH_3COO]_3$, $[Mn^{IV}Mn^{IV}(\mu\text{-}O)_3(Me_3\text{-}TACN)_2][CH_3COO]_2$, $[Mn^{III}Mn^{III}(\mu\text{-}O)(\mu\text{-}R^5COO)_2(Me_3\text{-}TACN)_2][SO_4]$, $[Mn^{III}Mn^{IV}(\mu\text{-}O)(\mu\text{-}R^5COO)_2(Me_3\text{-}TACN)_2]_2[SO_4]_3$, $[Mn^{IV}Mn^{IV}(\mu\text{-}O)_3(Me_3\text{-}TACN)_2][SO_4]$, $[Mn^{III}Mn^{III}(\mu\text{-}O)(\mu\text{-}R^5COO)_2(Me_3\text{-}TACN)_2][NO_3]_2$, $[Mn^{III}Mn^{IV}(\mu\text{-}O)(\mu\text{-}R^5COO)_2(Me_3\text{-}TACN)_2][NO_3]_3$, $[Mn^{IV}Mn^{IV}(\mu\text{-}O)_3(Me_3\text{-}TACN)_2][NO_3]_2$, $[Mn^{IV}Mn^{IV}(\mu\text{-}O)_3(Me_3\text{-}TACN)_2][PF_6]_2$, $[Mn^{III}Mn^{IV}(\mu\text{-}O)_2(\mu\text{-}R^5COO)(Me_4\text{-}DTNE)][Cl]_2$ and $[Mn^{IV}Mn^{IV}(\mu\text{-}O)_2(\mu\text{-}R^5COO)(Me_4\text{-}DTNE)][Cl]_3$, wherein $R^5$ is as defined herein (preferably methyl).

In another example, the manganese compound may comprise $[Mn^{IV}Mn^{IV}(\mu\text{-}O)_3(Me_3\text{-}TACN)_2]^{2+}$ or $[Mn^{III}Mn^{IV}(\mu\text{-}O)_2(\mu\text{-}R^5COO)(Me_4\text{-}DTNE)]^{2+}$, wherein $R^5$ is as defined herein (preferably methyl).

In yet another example, the manganese compound may be $[Mn^{IV}Mn^{IV}(\mu\text{-}O)_3(Me_3\text{-}TACN)_2][CH_3COO]_2$, $[Mn^{IV}Mn^{IV}(\mu\text{-}O)_3(Me_3\text{-}TACN)_2][SO_4]$, $[Mn^{IV}Mn^{IV}(\mu\text{-}O)_3(Me_3\text{-}TACN)_2][NO_3]_2$ or $[Mn^{III}Mn^{IV}(\mu\text{-}O)_2(\mu\text{-}CH_3COO)(Me_4\text{-}DTNE)][Cl]_2$.

The aqueous mixture in accordance with the first and second aspects of the invention comprises a peroxide compound. As used herein, a "peroxide compound" is a compound of structure ROOR', in which R and R' may independently be hydrogen or organyl.

"Organyl" as used herein and understood in the art to refer to an organic substituent with a free valence at a carbon atom. Similarly, "organylene" refers to an organic group with two free valences, which may be on the same or different carbon atoms derived by removing two hydrogen atoms from an organic compound. Thus, for example, an organyl may be anyone selected from the group consisting of —C(O)R", $C_1$-$C_{12}$alkyl and phenyl-$C_1$-$C_4$alkyl, wherein R" is an alkylene or substituted alkylene group. R and R' may be the same or different organyl groups. Where R is hydrogen and R' is —C(O)R", the peroxide compound is a peroxy acid. Where R is hydrogen and R' is alkyl, the peroxide is an alkylhydroperoxide. Where R is hydrogen and R' is phenylalkyl is phenylalkylhydroperoxide. Where R and R' are alkyl, the peroxide is a ketone peroxide. Peroxy acid, alkylhydroperoxide, phenylalkylhydroperoxide and ketone peroxide are further defined herein.

The peroxide compound may be any one or a combination of the group consisting of hydrogen peroxide, a peroxyacid, an alkylhydroperoxide, a phenylalkylhydroperoxide, and a ketone peroxide.

Often, the peroxide is any one or a combination of hydrogen peroxide, peroxyacid, alkylhydroperoxide and phenylalkylhydroperoxide. More often, the peroxide is a combination of hydrogen peroxide and a peroxyacid. One or more different peroxide compounds may be used in combination.

The term "peroxyacid" is used herein to refer to acids, such as carboxylic acids, in which at least one acidic —OH group has been replaced by an —OOH group. Typical mono- or diperoxyacids are of the general formula HOO(CO)R"Y, wherein R is an alkylene or substituted alkylene group containing from 1 to about 20 carbon atoms, optionally having an internal amide linkage or a phenylene or $C_1$-$C_{12}$alkyl-substituted phenylene group; and Y is hydrogen, halogen, $C_1$-$C_{12}$alkyl, $C_6$-$C_{10}$aryl (preferably phenyl), imido, a COOH or (C═O)OOH group or a quaternary ammonium group.

By "imido" is meant a diacyl derivative of ammonia or primary amines, i.e. comprising the structure R'''—C(O)NRC(O)—R''', wherein the R''' groups are independently selected organyl groups, or more typically, are together an organylene group connecting carbonyl moieties, whereby to provide a cyclic imido; and R—represents the remainder of the peroxyacid, i.e. is HOO(CO)R''—Typically, the imido is cyclic, for example one of the group consisting of phthalimido, maleimido, succinimido, and glutarimido. Preferably, the imido is phthalimido.

In some embodiments, R'' is an optionally substituted $C_1$-$C_{12}$alkylene or phenylene; and Y is —H, halo, $C_1$-$C_{12}$alkyl, phenyl, phthalimido, —COOH or —(C═O)OOH or a quaternary ammonium. Typically, R'' is an optionally substituted $C_1$-$C_4$alkylene or phenylene; and Y is —H, halo or $C_1$-$C_4$alkyl, wherein $C_1$-$C_4$alkylene is selected from any of the group consisting of methylene, ethylene, n-propylene, isopropylene, n-butylene, sec-butylene, isobutylene and tert-butylene, preferably methylene, and $C_1$-$C_4$alkyl is preferably methyl. More typically, R'' is an optionally substituted $C_1$-$C_4$alkylene or phenylene; and Y is —H, or halo. Typically, halo is chloro or fluoro.

Examples of mono-peroxy acids include peracetic acid, trifluoroperacetic acid, phthaloyl peroxide, a peroxy benzoic acid such as meta-chloroperbenzoic acid, peroxy lauric acid, N,N-phthaloylaminoperoxy caproic acid and 6-octylamino-6-oxo-peroxyhexanoic acid. Typical diperoxy acids include, for example, 1,12-diperoxydodecanoic acid and 1,9-diperoxyazeleic acid.

Typically, the peroxyacid is any one or a combination selected from peracetic acid, trifluoroacetic peracid and meta-chloroperbenzoic acid.

The term "alkylhydroperoxide" refers to monosubstitution products of hydrogen peroxide, in which an —H is substituted with an alkyl group. The alkyl may be a $C_1$-$C_{12}$alkyl, and is often a $C_1$-$C_4$alkyl, preferably tert-butyl.

The term "phenylalkylhydroperoxide" refers to monosubstitution products of hydrogen peroxide, in which an —H is substituted with a phenylalkyl group. The phenylalkyl may be a phenyl-$C_1$-$C_4$alkyl selected from the group consisting of phenylmethyl, phenylethyl, phenyl-n-propyl, phenylisopropyl, phenyl-n-butyl, phenyl-sec-butyl, phenylisobutyl and phenyl-tert-butyl, often phenylisopropyl.

The term "ketone peroxide" refers to a peroxide compound that forms on contacting a ketone with hydrogen peroxide. Such peroxide compounds are often not well-defined, and may form in the aqueous mixture on contacting a ketone and hydrogen peroxide. Suitable ketones include acetone, methylethylketone (butanone), methylpropylketone, methylisopropylketone, ethylpropylketone, methylphenylketone and diphenylketone. The ketone peroxide is typically methylethylketone peroxide or acetone peroxide.

The peroxide compound of the first and second aspects of the invention is often obtained or prepared as an aqueous solution (optionally diluted, for example with water or alkaline buffers), such as an aqueous solution comprising any one or a combination selected from the group consisting of hydrogen peroxide, peroxyacid, alkylhydroperoxide and phenylalkylhydroperoxide. Handling of liquid peroxide compounds is generally easier.

The peroxide compound of the first and second aspects may form in the aqueous mixture from a suitable precursor. Suitable precursors of peroxide compounds are known in the art and the skilled person is capable of identifying appropriate precursors for use in accordance with the first and second aspects of the invention. When the peroxide compound is hydrogen peroxide, it may form in the aqueous mixture from precursors including alkali metal peroxides, organic peroxides such as urea hydrogen peroxide, and inorganic persalts, such as alkali metal perborates (e.g. sodium perborate), percarbonates, perphosphates, persilicates, and persulfates such as potassium monopersulfate. Often the persalt is optionally hydrated sodium perborate (e.g. sodium perborate monohydrate and sodium perborate tetrahydrate) or sodium percarbonate. Sodium percarbonate degrades into hydrogen peroxide and sodium carbonate. It is generally considered to be more environmentally-friendly than other sources of hydrogen peroxide and is consequentially more widely used as a solid source of hydrogen peroxide.

Other suitable hydrogen peroxide sources include enzymatic systems that, together with a suitable substrate, produce hydrogen peroxide. An example of this is a $C_1$-$C_4$alcohol oxidase enzyme and a $C_1$-$C_4$ alcohol, for example a combination of methanol oxidase and ethanol. Such combinations are described in WO 95/07972 A1 (Unilever N.V. and Unilever plc).

When the peroxide compound is a peroxy acid, it may form in the aqueous mixture from a so-called peroxy precursor. The peroxy precursor may react with hydrogen peroxide to generate the peroxy acid. Peroxy precursors are well known to the skilled person and are described in GB 836988 A (Unilever Ltd), GB 864798 A (Unilever Ltd), GB 907356 A (Konink ind Mij Voorheen Noury), GB 1003310 A (Unilever Ltd) and GB 1519351 A (Unilever Ltd); EP 0185522 A2 (Clorox Co), EP 0174132 A2 (Proctor & Gamble), EP 0120591 A1 (Proctor & Gamble); and U.S. Pat. No. 1,246,339 A (Smit Isaac J), U.S. Pat. No. 3,332,882 A (FMC Corp), U.S. Pat. No. 4,128,494 A (Ugine Kuhlmann), U.S. Pat. No. 4,412,934 A (Proctor & Gamble) and U.S. Pat. No. 4,675,393 A (Lever Brothers Ltd).

Suitable peroxy precursors include the cationic, quaternary ammonium-substituted peroxyacid bleach precursors described in U.S. Pat. Nos. 4,751,015 A and 4,397,757 A (both Lever Brothers Ltd); and in EP 0284292 A (Kao Corp) and EP 0331229 A (Unilever NV). Examples of these include 2-(N,N,N-trimethyl ammonium) ethyl sodium-4-sulfophenyl carbonate chloride (SPCC) and N,N,N-trimethyl ammonium tolyloxy benzene sulfonate.

Another class of peroxy precursors is formed by the cationic nitriles described in EP 0303520 A (Kao Corp), EP 0458396 A (Unilever NV) and EP 0464880 A (Unilever NV). Other classes of bleach precursors for use with the present invention are described in WO 00/15750 A1 (Proctor & Gamble), for example 6-(nonanamidocaproyl)oxybenzene sulfonate.

Typically, the peroxy precursor is selected from the group consisting of an ester, including a sulfophenyl alkanoate and a sulfophenyl phenylalkanoate; an acyl-amide; and a quaternary ammonium substituted peroxy precursor, including a cationic nitrile. Examples of typical peroxy precursors (sometimes referred to as peroxyacid bleach activators) are sodium-4-benzoyloxy benzene sulfonate (SBOBS); N,N,N',N'-tetraacetylethylenediamine (TAED); sodium 1-methyl-2-benzoyloxy benzene-4-sulfonate; sodium-4-methyl-3-benzoloxy benzoate; trimethylammonium toluyloxy benzene sulfonate; SPCC; sodium nonanoyloxybenzene sulfonate (SNOBS); sodium 3,5,5-trimethyl hexanoyloxybenzene sulfonate; and the substituted cationic nitriles. Often, the peroxy precursor is TAED or salts of nonanoyloxybenzene sulfonate (NOBS), e.g. SNOBS.

Where more than one peroxide compound is used, the combination may be selected from the group consisting of hydrogen peroxide, peroxyacid, $C_1$-$C_{12}$alkylhydroperoxide, and phenylalkylhydroperoxide. When there is more than one peroxide compounds in the aqueous mixture, these are typically selected from hydrogen peroxide and any one peroxide compound selected from the group consisting of peroxyacid, $C_1$-$C_{12}$alkylhydroperoxide, and phenylalkylhydroperoxide. Generally, hydrogen peroxide is the most effective peroxide compound for a method of the invention. However, if catalase enzymes are present in the aqueous mixture (e.g. produced by the microorganisms within the biofilm), or transition-metal ions that preferentially react with hydrogen peroxide, then the amount of active hydrogen peroxide in the aqueous mixture decreases. The manganese complex of the invention may instead react with the peroxide compound selected from the group consisting of peroxyacid, $C_1$-$C_{12}$alkylhydroperoxide, and phenylalkylhydroperoxide. Thus, use of a peroxide compound that is not hydrogen peroxide can be advantageous in a method of the invention. For example, the antimicrobial properties of peroxyacids are well known and, when degrading biofilms, antimicrobial activity is likely to be desirable (for antimicrobial properties of peroxyacids, see Katara, G. et al, *J. Patient Saf. Infect. Control,* 2016, 4(1), 17-21; Shen, X. et al., Front. Microbiol., 2019, 10, 1196; Antonelli, M. et al., *Water Sci. Technol.,* 2013, 68(12), 2638-2644; and WO 2017/181005 A1 (Ecolab USA Inc.)). Often, a peroxyacid is used in a method of the invention in combination with hydrogen peroxide, often with a greater molar ratio of hydrogen peroxide used with respect to peroxyacid.

In some embodiments, a mixture of $C_{1-12}$alkylhydroperoxides (preferably tert-butylhydroperoxide) and hydrogen peroxide is used. Often, the molar ratio of $C_{1-12}$alkylhydroperoxide to hydrogen peroxide is from about 10:1 to about 1:10.

Alternatively, a mixture of peroxyacids (typically selected from the group consisting of peracetic acid, meta-chloroperbenzoic acid, trifluoroacetic peracid and phthaloyl peroxide, preferably peracetic acid) and hydrogen peroxide is used. Often, the molar ratio of peroxyacid to hydrogen peroxide is from about 10:1 to about 1:100, preferably from about 5:1 to about 1:10.

Often, a mixture of peracetic acid and hydrogen peroxide is used. Typically, the molar ratio of peracetic acid to hydrogen peroxide is from about 10:1 to about 1:100, more typically from about 3:1 to about 1:30, and even more typically about 1:1 to about 1:10.

The concentration of the peroxide compound may be varied. For the avoidance of doubt, the concentration of the peroxide compound refers to the total concentration of all peroxide compounds within the aqueous mixture, including hydrogen peroxide, peroxyacid, alkylhydroperoxide, phenylalkylhydroperoxide, and ketone hydroxide. Typically, the concentration of the peroxide compound is from about 0.01 to about 500 mM, more typically from about 0.1 to about 100 mM, and most typically from about 0.3 to about 30 mM.

The biofilm has been found by the inventors to degrade on contact with the aqueous solution of the first aspect of the invention comprising the peroxide compound, manganese complex and ligand of formula (I) or (II). If either the ligand or the peroxide compound is removed or degraded, there will be no further degradation of the biofilm.

The method of the first and second aspects of the invention may be performed at a variety of temperatures and pH ranges. Degradation of the manganese complex may occur when the pH of the aqueous mixture is outside a suitable range. When the aqueous mixture has a high pH value, insoluble manganese hydroxides/oxides may form, for example at a pH>12, or >13. In addition, degradation of the peroxide compound by the manganese complex may occur at high pH values, for example at a pH≥10.5. Such degradation of the peroxide compound can inhibit biofilm degradation. However, this may easily be avoided by, for example, increasing the concentration of peroxide compound in the aqueous mixture, e.g. by using a greater excess of peroxide compound with respect to manganese complex, such as a molar excess of >2000.

At low pHs, the peroxide compound and/or the ligand of formula (I) or (II) may be protonated. Consequently, activation of the peroxide compound by the manganese complex may be inhibited and/or the ligand of formula (I) or (II) may dissociate from the manganese complex. In addition, biofilms are often less prone to degradation at low pHs. Inhibition of biofilm degradation may occur at a pH<4, or at a pH<3. Accordingly, the pH of the aqueous mixture is typically from about 4 to about 12, more typically from about pH 6 to about 11. The pH of the aqueous medium is easily altered through the addition of acid or alkali (for example HCl or NaOH) or by using a buffered solution, i.e. in some embodiments the aqueous mixture comprises a buffer. Often, a buffer is added to the aqueous mixture when the manganese complex is the product of a reducing agent and a manganese compound. Typically, the buffer is selected from the group consisting of carbonate, phosphate or borate, preferably carbonate buffers. Often, the buffer is a carbonate and the pH of the aqueous mixture is from about 8 to about 10.5, often from about 8 to about 10, typically from about 8.5 to 9.5, and most typically about 9. Where added as a solution or suspension, the buffer is typically prepared by dissolving the solid buffer in a solvent (typically water). Alternatively, the buffer may be added to the aqueous mixture as a solid. The buffer may be added before, during or with the manganese complex or compound, peroxide compound and/or optional ligand of formula (I) or (II).

Alternatively, according to particular embodiments, a solid or liquid buffer is not added to the aqueous mixture. For the avoidance of doubt, such embodiments do not exclude the natural formation of a buffer in the aqueous mixture, for example by the dissolution of carbon dioxide from the air into the aqueous mixture thereby forming a carbonate or bicarbonate buffer. According to other embodiments, no buffer is added to the aqueous mixture.

If the manganese complex is not the product of a reducing agent and a manganese compound, then the pH of the aqueous mixture is typically from about 9.5 to about 11.5, more typically from about 10 to about 11, even more typically from about 10 to about 10.5. At these pH values, a sequestrant is typically included within the aqueous mixture. Sequestrants are described below.

The temperature of the aqueous mixture is typically from about 15° C. to about 90° C., more typically from about 20° C. to about 70° C. Preferably, the temperature of the aqueous mixture is from about 25° C. to about 50° C.

The methods of the invention may be carried out for any amount of time. The skilled person is aware that a longer reaction time will lead to a greater degree of biofilm degradation. Even so, the method of the reaction effectively degrades biofilm at reaction times of less than 10 minutes. Typically, the methods of the invention are carried out for about 0.1 to about 60 minutes, more typically about 0.1 to about 30 minutes, and preferably about 0.1 to about 10 minutes.

On contact with biofilm, the degradative activity of the aqueous mixture of the first and second aspects of the invention may increase over time. Without being bound by theory, components of biofilm may donate electrons to the manganese complexes in the aqueous mixture, thereby reducing the manganese complexes in a manner similar to that of the reducing agents mentioned above. Components that may be suitable for reduction of the manganese complexes in the aqueous mixture include proteins comprising amino acid residues that may act as reducing agents of the manganese complexes in the aqueous mixture. Amino acid residues that may be suitable for such reduction include tyrosine residues and cysteine residues). Metal ions of a low oxidation state, such as Fe(II) may be present in the biofilm and may also be suitable components for the reduction of the manganese complexes in the aqueous mixture.

The reduced manganese complexes, i.e. those having less positive oxidation states, may be more active than the parent manganese complexes. For example, a two-electron reducing component of the biofilm may reduce both Mn(IV) ions of a dinuclear Mn(IV)Mn(IV) complex to yield a dinuclear Mn(III)Mn(III) complex. Alternatively, not well-defined manganese complexes may be formed, for example a mixture of dinuclear Mn(II)Mn(II), Mn(III)Mn(II), Mn(III)Mn(III), Mn(III)Mn(IV), or Mn(IV)Mn(IV) complexes may form. It might also be possible that the dinuclear manganese complexes split apart leading to the formation of mononuclear Mn complexes, i.e. Mn(II), Mn(III) and/or Mn(IV) complexes, see for example B. C. Gilbert et al. (supra).

As mentioned herein, the aqueous mixture of the first and second aspects comprises an optionally buffered solvent, which is typically water. However, other solvents may be used. The identity of the solvent is not an essential feature of the invention, provided the solvent is miscible with water. The aqueous mixture will generally have at least 1 wt % water, by which is meant that the water-containing liquid constituting the liquid aqueous mixture comprises at least 1% by weight water, more typically at least 10 wt %, even more typically 25 wt %, and most typically at least 50 wt % water. The liquid balance (if any) of the aqueous mixture that is not water may be any convenient liquid, for example a liquid alcohol, e.g. a $C_1$-$C_4$ alcohol such as methanol or ethanol. Although the solvent will often be entirely water, it will be understood that this does not exclude the presence of small amounts of other liquids (e.g. in a total amount of less than about 10 wt %, more typically less than about 5 wt %), e.g. as contaminants in the other materials with which the liquid continuous phases are brought into contact.

In some embodiments, the aqueous mixture of the first and second aspects of the invention comprises a sequestrant selected from the group consisting of an aminophosphate, an aminocarboxylate and a carboxylate. When present, the sequestrant is typically in concentrations of from about 0.001 to about 10 g/l. Without being bound by theory, a sequestrant may have two functions. Firstly, the sequestrant may improve" the activity of the manganese complex, (for example, as disclosed in WO 2007/042192 A (Unilever PLC)), and/or it may bind to manganese impurities that may be present in the aqueous mixture, or the biofilm. Manganese ions such as Cu, Mn, or Fe are well known to react with peroxide compounds, and in particular with hydrogen peroxide to either decompose hydrogen peroxide into water and dioxygen, or to form radicals such as superoxide and/or hydroxyl radicals. This may result in less peroxide compound available in the aqueous mixture to be activated by the manganese complex, and thus may inhibit biofilm degradation. Therefore, the sequestrant may prevent the inhibition of biofilm degradation by manganese impurities present in the aqueous mixture and/or the biofilm.

Preferred aminophosphonate sequestrants include nitrilo trimethylene phosphonate, ethylenediamine-N,N,N',N'-tetra (methylene phosphonate) (DEQUEST 204™) and diethylenetriamine-N,N,N',N",N"-penta(methylene phosphonate) (DEQUEST 206™). One skilled in the art will be aware that different salts of each DEQUEST™ exist, e.g., as phosphonic acid or as sodium salts or any mixture thereof.

Preferred aminocarboxylate sequestrants include ethylenediaminetetraacetic acid (EDTA), N-hydroxyethylenediaminetetraacetic acid (HEDTA), nitrilotriacetic acid (NTA), N-hydroxyethylaminodiacetic acid, N-hydroxyethylaminodiacetic acid, glutamic diacetic acid, sodium iminodisuccinate, diethylenetriaminepentaacetic acid (DTPA), ethylenediamine-N,N'-disuccinic acid (EDDS), methylglycinediacetic acid (MGDA), and alanine-N,N-diacetic acid.

The sequestrant may be in the form of a salt. For example, the sequestrant may comprise one or more cations selected from the group consisting of alkali metal ions, alkaline earth metal ions, ammonium ions, or substituted ammonium ions. Preferably the sequestrant is in the free acid form, or comprises sodium or magnesium cations, i.e. is in its sodium or magnesium salt form.

Preferred carboxylate sequestrants are polycarboxylates containing two carboxy groups including the water-soluble salts of succinic acid, malonic acid, (ethylenedioxy) diacetic acid, gluconic acid, maleic acid, diglycolic acid, tartaric acid, tartronic acid and fumaric acid, as well as the ether carboxylates. Polycarboxylates containing three carboxy groups include, in particular, water-soluble citrates, aconitrates and citraconates as well as succinate derivatives such as the carboxymethyloxysuccinates. Polycarboxylates containing four carboxy groups include oxydisuccinates disclosed in GB 1261829 A (Unilever Ltd), 1,1,2,2-ethane tetracarboxylates, 1,1,3,3-propane tetracarboxylates and 1,1,2,3-propane tetracarboxylates. Polycarboxylates containing sulfo substituents include the sulfosuccinate derivatives disclosed in GB 1398421 A (Unilever Ltd) and GB 1398422 A (Unilever Ltd) and in U.S. Pat. No. 3,936,448 A (Lever Brothers Ltd), and the sulfonated pyrolysed citrates described in GB 1439000 A (Henkel & CIE GMBH).

Other suitable carboxylate sequestrants are the homo- or co-polymeric polycarboxylic acids or their salts in which the polycarboxylic acid comprises at least two carboxyl radicals separated from each other by not more than two carbon atoms. Polymers of the latter type are described in GB 1596756 A (Proctor & Gamble Ltd). Examples of such salts are polyacrylates of molecular weight 2000 to 5000 Daltons and their copolymers with maleic anhydride, such copolymers having a molecular weight of from 20,000 to 70,000 Daltons, especially about 40,000 Daltons.

Also, copolymeric polycarboxylate polymers which, formally at least, are formed from an unsaturated polycarboxylic acid such as maleic acid, citraconic acid, itaconic acid and mesaconic acid as first monomer, and an unsaturated monocarboxylic acid such as acrylic acid or an alpha-C1-C4 alkyl acrylic acid as second monomer. Such polymers are available from BASF under the trade name SOKALAN® CP5 (neutralised form), SOKALAN® CP7, and SOKALAN® CP45 (acidic form).

Typically, the sequestrant is ethylenediamine-N,N,N',N'-tetra(methylene phosphonate) (DEQUEST 204™), diethylenetriamine-N,N,N',N",N"-penta(methylenephosphonate) (DEQUEST 206™), ethylenediaminetetraacetic acid (EDTA), diethylenetriaminepentaacetic acid (DTPA), methylglycinediacetic acid (MGDA), citric acid, citrate alkali salts and gluconate.

Often, the sequestrant is an ethylenediamine-N,N,N',N'-tetra(methylene phosphonate) (DEQUEST 204™). This is especially the case where the manganese complex of the first aspect of the invention is not the product of a manganese compound and a reducing agent.

The sequestrant is optionally present in the aqueous mixture comprising the transition-metal complex, peroxide compound and ligand of formula (I) or (II). Alternatively, or in addition, the biofilm may be contacted with one or more of the aforementioned sequestrants prior to the contacting with the aqueous mixture. Without being bound by theory, if the biofilm comprises manganese impurities and the aqueous mixture comprises hydrogen peroxide, then contacting the biofilm with the sequestrant before contacting with the aqueous mixture may reduce the number of manganese impurities that may otherwise decompose hydrogen peroxide. Removal of ions such as $Ca^{2+}$ or $Mg^{2+}$ may make the biofilm more susceptible towards degradation.

Where added as a solution or suspension, the sequestrant is typically prepared by dissolving the solid sequestrant in a solvent (typically water). Alternatively, the sequestrant may be added to the aqueous mixture as a solid. The sequestrant may be added before, during or at the same time as the manganese complex, peroxide compound, optional ligand, and/or buffer.

The aqueous mixture of the first and second aspects may comprise additional agents that aid degradation of the biofilm. The additional agents may be antimicrobial agents that aid degradation of microbial cells, thereby enhancing biofilm degradation. The additional agents may inhibit the growth biofilm.

Removal or partial removal of the biofilm on a surface leads to less bacteria present on the surface, which consequently leads to slower growth of new biofilms.

In some embodiments, the biofilm comprises any one or a combination of polysaccharides. Without being bound by theory, depolymerisation of the polysaccharides within the biofilm may lead to a weaker matrix of EPS, which may then be cleaned or further degraded more easily. Typically, the polysaccharide is any one or a combination of alginate, colanic acid, dextran, kefiran, curdlan, welan, gellan, and xanthan. More typically, the biofilm comprises any one or a combination of alginate, dextran, kefiran, curdlan, welan, gellan, and xanthan. The polysaccharide is often an alginate. In certain embodiments, the alginate is produced by bacteria (preferably Azobacter and/or *Pseudomonas*) or algae (preferably green algae).

In some embodiments, the biofilm is on the surface of a membrane; a pipe; other plumbing equipment; cleaning equipment (including laundry, dishwashing and bathing equipment, such as sinks, baths, showers, dishwashers, washing machines, tumble dryers, bidets); a bathroom; a kitchen; a utility room; a changing room, for example in a gyms or a leisure centre; walls and floors (and/or surfaces within spaces used for cleaning (e.g. shower room walls and floors)); a cooling and/or heating system; a water vessel (including hulls of ships and boats); and a marine apparatus.

The biofilm may, prior to the contacting with the aqueous mixture, be contacted with enzymes such as amylase and/or protease enzymes so as to degrade the sugars and proteins within the biofilm.

The methods of the invention may be carried out in discontinuous and continuous processes, and may be carried out in, for example, vessels, pipes, and/or tubes. The aqueous mixture may be agitated or stirred during the method of the invention. This may increase the rate of biofilm degradation, and/or allow greater amounts of biofilm to be degraded.

The methods of the invention may be carried out in conjunction with other processes that improve biofilm degradation. For example, the microwave-assisted depolymerisation process described in WO 2014/102332 A1 (Dupont Nutrition Biosciences APS) may be carried out before, after, or at the same time as the methods of the invention.

Each and every patent and non-patent reference referred to herein is hereby incorporated by reference in its entirety, as if the entire contents of each reference were set forth herein in their entirety.

The invention may be further understood with reference to the following non-limiting clauses:

1. A method of degrading a biofilm comprising contacting the biofilm with an aqueous mixture comprising (i) a peroxide compound and (ii) a mononuclear Mn(II), Mn(III) or Mn(IV), or dinuclear Mn(II)Mn(II), Mn(III)Mn(II), Mn(III)Mn(III), Mn(III)Mn(IV) or Mn(IV)Mn(IV) manganese complex, wherein the aqueous mixture comprises a ligand of formula (I) or (II):

(I)

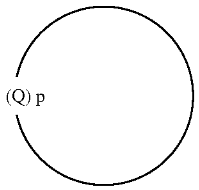

(II)

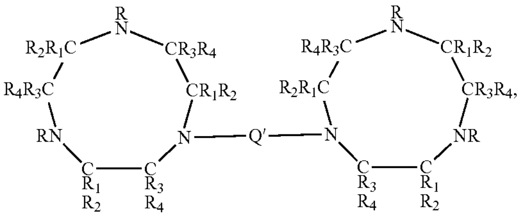

wherein:

Q=

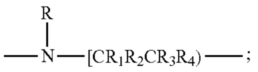

p is 3;

each R is independently selected from the group consisting of hydrogen, $C_1$-$C_{24}$alkyl, $CH_2C_6$-$C_{10}$aryl, $CH_2CH_2OH$, $CH_2OOOH$, and pyridin-2-ylmethyl;

Q' is an ethylene or propylene bridge; and $R_1$, $R_2$, $R_3$, and $R_4$ are independently selected from: H, $C_1$-$C_4$alkyl and $C_1$-$C_4$alkylhydroxy.

2. The method of clause 1 wherein the manganese complex comprises the ligand.

3. The method of clause 1 or clause 2 wherein the aqueous mixture comprises uncomplexed ligand of formula (I) or (II).

4. The method of any one preceding clause, wherein each R is independently selected from the group consisting of $C_1$-$C_{24}$alkyl, $CH_2C_6$-$C_{10}$aryl, $CH_2CH_2OH$ and $CH_2COOH$.

5. The method of any one of clauses 1 to 3, wherein each R is independently selected from the group consisting of $C_1$-$C_{12}$alkyl, $CH_2C_6$-$C_{10}$aryl, $CH_2CH_2OH$ and $CH_2COOH$.
6. The method of any one of clauses 1 to 3, wherein each R is independently selected from the group consisting of $C_1$-$C_6$alkyl and benzyl.
7. The method of any one preceding clause, wherein each R is the same.
8. The method of any one of clauses 1 to 3, wherein each R is methyl.
9. The method of any one preceding clause, wherein $R_1$, $R_2$, $R_3$ and $R_4$ are independently hydrogen or methyl.
10. The method of any one of clauses 1 to 8, wherein $R_1$, $R_2$, $R_3$ and $R_4$ are hydrogen.
11. The method of any one preceding clause, wherein Q' is an ethylene bridge.
12. The method of any one of clauses 1 to 3, wherein the ligand is $Me_3$-TACN or $Me_4$-DTNE.
13. The method of any one preceding clause, wherein the molar ratio of the ligand of formula (I) to manganese is from about 100:1 to about 0.5:1.
14. The method of any one of clauses 1 to 12, wherein the molar ratio of the ligand of formula (I) to manganese is from about 10:1 to about 0.5:1.
15. The method of any one of clauses 1 to 12, wherein the molar ratio of the ligand of formula (I) to manganese is from about 5:1 to about 0.8:1.
16. The method of any one of clauses 1 to 12, wherein the molar ratio of the ligand of formula (I) to manganese is from about 2:1 to about 1.001:1.
17. The method of any one preceding clause, wherein the molar ratio of the ligand of formula (II) to manganese is from about 50:1 to about 0.05:1.
18. The method of any one of clauses 1 to 16, wherein the molar ratio of the ligand of formula (II) to manganese is from about 5:1 to about 0.1:1.
19. The method of any one of clauses 1 to 16, wherein the molar ratio of the ligand of formula (II) to manganese is from about 3:1 to about 0.2:1.
20. The method of any one of clauses 1 to 16, wherein the molar ratio of the ligand of formula (II) to manganese is from about 1:1 to about 0.5001:1.
21. The method of any one preceding clause, wherein the manganese complex is part of a salt comprising one or more non-coordinating counterions selected from the group consisting of $SO_4^{2-}$, $R^5COO^-$, $Cl^-$, $NO_3^-$, $R^6SO_3^-$ and $PF_6^-$, wherein:
   $R^5$ is selected from the group consisting of hydrogen, $C_1$-$C_{12}$alkyl and optionally $C_1$-$C_6$alkyl-substituted phenyl; and
   $R^6$ is selected from the group consisting of optionally $C_1$-$C_6$alkyl-substituted phenyl, $C_1$-$C_6$alkyl, and $CF_3$.
22. The method of clause 21, wherein $R^5$ is selected from the group consisting of hydrogen, $C_1$-$C_6$alkyl and optionally $C_1$-$C_6$alkyl-substituted phenyl.
23. The method of clause 21, wherein $R^5$ is methyl or phenyl.
24. The method of clause 21, wherein $R^5$ is methyl.
25. The method of any one of clauses 21 to 24, wherein $R^6$ is phenyl optionally substituted with one or more methyl groups.
26. The method of any one of clauses 21 to 24, wherein $R^6SO_3^-$ is tosylate.
27. The method of clause 21, wherein the non-coordinating counterions are selected from the group consisting of acetate, chloride, sulfate, nitrate and hexafluorophosphate.
28. The method of clause 21, wherein the non-coordinating counterions are selected from the group consisting of acetate, chloride, sulfate and nitrate.
29. The method of any one preceding clause, wherein the manganese complex is dinuclear.
30. The method of clause 29, wherein the dinuclear manganese complex comprises two or three bridging ligands independently selected from the group consisting of oxide, hydroxide, water, phenylboronate and $R^5COO^-$;
   wherein $R^5$ is selected from the group consisting of hydrogen, $C_1$-$C_{12}$alkyl and optionally $C_1$-$C_6$alkyl-substituted phenyl.
31. The method of clause 30, wherein $R^5$ is selected from the group consisting of hydrogen, $C_1$-$C_{12}$alkyl and phenyl optionally substituted with one or more methyl groups.
32. The method of clause 30, wherein $R^5$ is selected from the group consisting of hydrogen, $C_1$-$C_6$alkyl and phenyl.
33. The method of clause 30, wherein $R^5$ is methyl or phenyl, for example methyl.
34. The method of 29, wherein the dinuclear manganese complex comprises two or three bridging ligands independently selected from oxide, hydroxide, water, acetate and benzoate.
35. The method of any one of clauses 29 to 34, wherein the dinuclear manganese complex comprises three bridging ligands.
36. The method of any one of clauses 29 to 35, wherein the dinuclear manganese complex is a Mn(III)Mn(III), Mn(III)Mn(IV) or Mn(IV)Mn(IV) complex.
37. The method of any one of clauses 1 to 28, wherein the manganese complex is any one of the group consisting of $[Mn^{III}Mn^{III}(\mu\text{-}O)(\mu\text{-}R^5COO)_2(Me_3\text{-}TACN)_2]^{2+}$, $[Mn^{III}Mn^{IV}(\mu\text{-}O)(\mu\text{-}R^5COO)_2(Me_3\text{-}TACN)_2]^{3+}$ $[Mn^{IV}Mn^{IV}(\mu\text{-}O)_3(Me_3\text{-}TACN)_2]^{2+}$, $[Mn^{III}Mn^{IV}(\mu\text{-}O)_2(\mu\text{-}R^5COO)(Me_4\text{-}DTNE)]^{2+}$ and $[Mn^{IV}Mn^{IV}(\mu\text{-}O)_2(\mu\text{-}R^5COO)(Me_4\text{-}DTNE)]^{3+}$, wherein $R^5$ is selected from hydrogen, $C_1$-$C_{12}$alkyl and optionally $C_1$-$C_6$alkyl-substituted phenyl.
38. The method of any one of clauses 1 to 28, wherein the manganese complex is part of a salt, wherein the salt is any one of the group consisting of $[Mn^{III}Mn^{III}(\mu\text{-}O)(\mu\text{-}R^5COO)_2(Me_3\text{-}TACN)_2][CH_3CO_0]_2$, $[Mn^{III}Mn^{IV}(\mu\text{-}O)(\mu\text{-}R^5COO)_2(Me_3\text{-}TACN)_2][CH_3COO]_3$, $[Mn^{IV}Mn^{IV}(\mu\text{-}O)_3(Me_3\text{-}TACN)_2][CH_3COO]_2$, $[Mn^{III}Mn^{III}(\mu\text{-}O)(\mu\text{-}R^5COO)_2(Me_3\text{-}TACN)_2][SO_4]$, $[Mn^{III}Mn^{IV}(\mu\text{-}O)(\mu\text{-}R^5COO)_2(Me_3\text{-}TACN)_2]_2[SO_4]_3$, $[Mn^{IV}Mn^{IV}(\mu\text{-}O)_3(Me_3\text{-}TACN)_2][SO_4]$, $[Mn^{III}Mn^{III}(\mu\text{-}O)(\mu\text{-}R^5COO)_2(Me_3\text{-}TACN)_2][NO_3]_2$, $[Mn^{III}Mn^{IV}(\mu\text{-}O)(\mu\text{-}R^5COO)_2(Me_3\text{-}TACN)_2][NO_3]_3$, $[Mn^{IV}Mn^{IV}(\mu\text{-}O)_3(Me_3\text{-}TACN)_2][NO_3]_2$, $[Mn^{IV}Mn^{IV}(\mu\text{-}O)_3(Me_3\text{-}TACN)_2][PF_6]_2$, $[Mn^{III}Mn^{IV}(\mu\text{-}O)_2(\mu\text{-}R^5COO)(Me_4\text{-}DTNE)][Cl]_2$ and $[Mn^{IV}Mn^{IV}(\mu\text{-}O)_2(\mu\text{-}R^5COO)(Me_4\text{-}DTNE)][C]_3$, wherein $R^5$ is selected from hydrogen, $C_1$-$C_{12}$alkyl and optionally $C_1$-$C_6$alkyl-substituted phenyl.
39. The method of any one of clauses 1 to 28, wherein the manganese complex is $[Mn^{IV}Mn^{IV}(\mu\text{-}O)_3(Me_3\text{-}TACN)_2]^{2+}$ or $[Mn^{III}Mn^{IV}(\mu\text{-}O)_2(\mu\text{-}R^5COO)(Me_4\text{-}DTNE)]^{2+}$, wherein $R^5$ is selected from hydrogen, $C_1$-$C_{12}$alkyl and optionally $C_1$-$C_6$alkyl-substituted phenyl.

40. The method of any one of clauses 37 to 39, wherein $R^5$ is methyl.
41. The method of any one of clauses 1 to 28, wherein the manganese complex is part of a salt, wherein the salt is $[Mn^{IV}Mn^{IV}(\mu\text{-}O)_3(Me_3\text{-}TACN)_2][CH_3COO]_2$, $[Mn^{IV}Mn^{IV}(\mu\text{-}O)_3(Me_3\text{-}TACN)_2][SO_4]$, $[Mn^{IV}Mn^{IV}(\mu\text{-}O)_3(Me_3\text{-}TACN)_2][NO_3]_2$, $[Mn^{IV}Mn^{IV}(\mu\text{-}O)_3(Me_3\text{-}TACN)_2][PF_6]_2$, or $[Mn^{III}Mn^{IV}(\mu\text{-}O)_2(\mu\text{-}CH_3COO)(Me_4\text{-}DTNE)][Cl]_2$.
42. The method of any one of clauses 1 to 36, wherein prior to the contacting, a manganese compound is contacted with a reducing agent to provide the manganese complex.
43. The method of clause 42, wherein the reducing agent is selected from the group consisting of ascorbic acid, ascorbyl palmitate, ascorbyl stearate, catechol, 4-tert-butyl catechol, 4-allylcatechol, caffeic acid, maltol, ethylmaltol, hydroquinone, tert-butyl hydroquinone, 2,5-di-tert-butyl hydroquinone, pyrogallol, and n-propylgallate, an alkali metal sulfite, an alkali metal bisulfite and an alkali metal thiosulfate.
44. The method of clause 42, wherein the reducing agent is selected from the group consisting of ascorbic acid, catechol, hydroquinone, pyrogallol, and sodium sulfite.
45. The method of clause 42, wherein the reducing agent is ascorbic acid.
46. The method of any one of clauses 42 to 45, wherein the molar ratio of the manganese compound to the reducing agent is from about 0.1:1 to about 10:1.
47. The method of any one of clauses 42 to 45, wherein the molar ratio of the manganese compound to the reducing agent is from about 0.2:1 to about 3:1.
48. The method of any one of clauses 42 to 47, wherein the manganese compound comprises a non-coordinating counterion selected from the group consisting of $SO_4^{2-}$, $R^5COO^-$, $Cl^-$, $NO_3^-$, $R^6SO_3^-$ and $PF_6^-$, wherein:
   $R^5$ is selected from the group consisting of hydrogen, $C_1$-$C_{12}$alkyl and optionally $C_1$-$C_6$alkyl-substituted phenyl; and
   $R^6$ is selected from the group consisting of optionally $C_1$-$C_6$alkyl-substituted phenyl, $C_1$-$C_6$alkyl, and $CF_3$.
49. The method of clause 48, wherein $R^5$ is selected from the group consisting of hydrogen, $C_1$-$C_6$alkyl and optionally $C_1$-$C_6$alkyl-substituted phenyl.
50. The method of clause 48, wherein $R^5$ is methyl or phenyl.
51. The method of clause 48, wherein $R^5$ is methyl.
52. The method of any one of clauses 48 to 51, wherein $R^6$ is phenyl optionally substituted with one or more methyl groups.
53. The method of any one of clauses 48 to 52 wherein $R^6SO_3^-$ is tosylate.
54. The method of clause 48, wherein the non-coordinating counterion is selected from the group consisting of acetate, chloride, sulfate, nitrate and hexafluorophosphate.
55. The method of clause 48, wherein the non-coordinating counterion is selected from the group consisting of acetate, chloride, sulfate and nitrate.
56. The method of any one of clauses 42 to 55, wherein the manganese compound comprises a ligand of formula (I) or (II):

(I)

-continued (II)

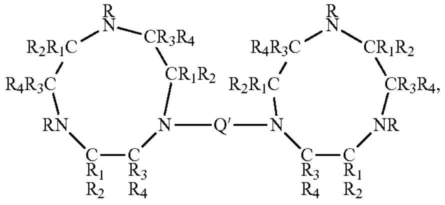

wherein:

Q=

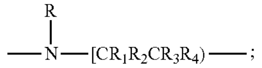

p is 3;

each R is independently selected from the group consisting of hydrogen, $C_1$-$C_{24}$alkyl, $CH_2C_6$-$C_{10}$aryl, $CH_2CH_2OH$, $CH_2COOH$, and pyridin-2-ylmethyl;

Q' is an ethylene or propylene bridge; and $R_1$, $R_2$, $R_3$, and $R_4$ are independently selected from: H, $C_1$-$C_4$alkyl and $C_1$-$C_4$alkylhydroxy.

57. The method of clause 56, wherein each R of the manganese compound is independently selected from the group consisting of $C_1$-$C_{24}$alkyl, $CH_2C_6$-$C_{10}$aryl, $CH_2CH_2OH$ and $CH_2COOH$.
58. The method of clause 56, wherein each R of the manganese compound is independently selected from the group consisting of $C_1$-$C_{12}$alkyl, $CH_2C_6$-$C_{10}$aryl, $CH_2CH_2OH$ and $CH_2COOH$.
59. The method of clause 56, wherein each R of the manganese compound is independently selected from the group consisting of $C_1$-$C_6$alkyl and benzyl.
60. The method of any one of clauses 56 to 59, wherein each R of the manganese compound is the same.
61. The method of any one of clauses 56 to 59, wherein each R of the manganese compound is methyl.
62. The method of any one of clauses 56 to 61, wherein $R_1$, $R_2$, $R_3$ and $R_4$ of the manganese compound are independently hydrogen or methyl.
63. The method of any one of clauses 56 to 61, wherein $R_1$, $R_2$, $R_3$ and $R_4$ of the manganese compound are hydrogen.
64. The method of any one of clauses 56 to 61, wherein Q' of the manganese compound is an ethylene bridge.
65. The method of clause 56, wherein the ligand of the manganese compound is $Me_3$-TACN or $Me_4$-DTNE.
66. The method of any one of clauses 42 to 65, wherein the manganese compound is a dinuclear Mn(III)Mn(III), Mn(III)Mn(IV) or Mn(IV)Mn(IV) compound.
67. The method of any one of clauses 42 to 65, wherein the manganese complex is any one or a combination selected from the group consisting of mononuclear Mn(II), Mn(III) and Mn(IV), and dinuclear Mn(II)Mn(II), Mn(III)Mn(II), Mn(III)Mn(III) and Mn(III)Mn(IV) complexes, and the manganese compound is selected from the group consisting of dinuclear Mn(III)Mn(III), Mn(III)Mn(IV) and Mn(IV)Mn(IV) compounds.
68. The method of clause 66 or clause 67, wherein the dinuclear manganese compound comprises 2 or 3 bridging ligands independently selected from the group consisting of oxide, hydroxide, water, phenylboronate and $R^5COO^-$, wherein $R^5$ is selected from the group consisting of hydrogen, $C_1$-$C_{12}$alkyl and optionally $C_1$-$C_6$alkyl-substituted phenyl.

69. The method of clause 68, wherein $R^5$ of the manganese compound is selected from the group consisting of hydrogen, $C_1$-$C_{12}$alkyl and phenyl optionally substituted with one or more methyl groups.
70. The method of clause 68, wherein $R^5$ of the manganese compound is selected from the group consisting of hydrogen, $C_1$-$C_6$alkyl and phenyl.
71. The method of clause 68, wherein $R^5$ of the manganese compound is selected from methyl and phenyl, for example methyl.
72. The method of clause 66 or clause 67, wherein the dinuclear manganese compound comprises 2 or 3 bridging ligands independently selected from oxide, hydroxide, water, acetate and benzoate.
73. The method of clause 66 or clause 67, wherein the dinuclear manganese compound comprises 3 bridging ligands independently selected from oxide, hydroxide, water, acetate and benzoate.
74. The method of any one of clauses 42 to 55, wherein the manganese compound comprises any one of the group consisting of $[Mn^{III}Mn^{III}(\mu\text{-}O)(\mu\text{-}R^5COO)_2(Me_3\text{-}TACN)_2]^{2+}$, $[Mn^{III}Mn^{IV}(\mu\text{-}O)(\mu\text{-}R^5COO)_2(Me_3\text{-}TACN)_{2]3}+[Mn^{IV}Mn^{IV}(\mu\text{-}O)_3(Me_3\text{-}TACN)_2]^{2+}$, $[Mn^{III}Mn^{IV}(\mu\text{-}O)_2(\mu\text{-}R^5COO)(Me_4\text{-}DTNE)]^{2+}$ and $[Mn^{IV}Mn^{IV}(\mu\text{-}O)_2(\mu\text{-}R^5COO)(Me_4\text{-}DTNE)]^{3+}$, wherein $R^5$ is selected from hydrogen, $C_1$-$C_{12}$alkyl and optionally $C_1$-$C_6$alkyl-substituted phenyl.
75. The method of any one of clauses 42 to 47, wherein the manganese compound is any one of the group consisting of $[Mn^{III}Mn^{III}(\mu\text{-}O)(\mu\text{-}R^5COO)_2(Me_3\text{-}TACN)_2][CH_3COO]_2$, $[Mn^{III}Mn^{IV}(\mu\text{-}O)(\mu\text{-}R^5COO)_2(Me_3\text{-}TACN)_2][CH_3COO]_3$, $[Mn^{IV}Mn^{IV}(\mu\text{-}O)_3(Me_3\text{-}TACN)_2][CH_3COO]_2$, $[Mn^{III}Mn^{III}(\mu\text{-}O)(\mu\text{-}R^5COO)_2(Me_3\text{-}TACN)_2][SO_4]$, $[Mn^{III}Mn^{IV}(\mu\text{-}O)(\mu\text{-}R^5COO)_2(Me_3\text{-}TACN)_2]_2[SO_4]_3$, $[Mn^{IV}Mn^{IV}(\mu\text{-}O)_3(Me_3\text{-}TACN)_2][SO_4]$, $[Mn^{III}Mn^{III}(\mu\text{-}O)(\mu\text{-}R^5COO)_2(Me_3\text{-}TACN)_2][NO_3]_2$, $[Mn^{III}Mn^{IV}(\mu\text{-}O)(\mu\text{-}R^5COO)_2(Me_3\text{-}TACN)_2][NO_3]_3$, $[Mn^{IV}Mn^{IV}(\mu\text{-}O)_3(Me_3\text{-}TACN)_2][NO_3]_2$, $[Mn^{IV}Mn^{IV}(\mu\text{-}O)_3(Me_3\text{-}TACN)_2][PF_6]_2$, $[Mn^{III}Mn^{IV}(\mu\text{-}O)_2(\mu\text{-}R^5COO)(Me_4\text{-}DTNE)][Cl]2$ and $[Mn^{IV}Mn^{IV}(\mu\text{-}O)_2(\mu\text{-}R^5COO)(Me_4\text{-}DTNE)][Cl]_3$, wherein $R^5$ is selected from hydrogen, $C_1$-$C_{12}$alkyl and optionally $C_1$-$C_6$alkyl-substituted phenyl.
76. The method of any one of clauses 42 to 55, wherein the manganese compound is $[Mn^{IV}Mn^{IV}(\mu\text{-}O)_3(Me_3\text{-}TACN)_2]^{2+}$ or $[Mn^{III}Mn^{IV}(\mu\text{-}O)_2(\mu\text{-}R^5COO)(Me_4\text{-}DTNE)]^{2+}$, wherein $R^5$ is selected from hydrogen, $C_1$-$C_{12}$alkyl and optionally $C_1$-$C_6$alkyl-substituted phenyl.
77. The method of any one of clauses 74 to 76, wherein $R^5$ of the manganese compound is methyl.
78. The method of any one of clauses 42 to 47 wherein the manganese compound is $[Mn^{IV}Mn^{IV}(\mu\text{-}O)_3(Me_3\text{-}TACN)_2][CH_3COO]_2$, $[Mn^{IV}Mn^{IV}(\mu\text{-}O)_3(Me_3\text{-}TACN)_2][SO_4]$, $[Mn^{IV}Mn^{IV}(\mu\text{-}O)_3(Me_3\text{-}TACN)_2][NO_3]_2$, $[Mn^{IV}Mn^{IV}(\mu\text{-}O)_3(Me_3\text{-}TACN)_2][PF_6]_2$, or $[Mn^{III}Mn^{IV}(\mu\text{-}O)_2(\mu\text{-}CH_3COO)(Me_4\text{-}DTNE)][Cl]_2$.
79. The method of any one preceding clause, wherein the concentration of the manganese complex in the aqueous mixture is from about 0.0001 to about 100 M.
80. The method of any one of clauses 1 to 78, wherein the concentration of the manganese complex in the aqueous mixture is from about 0.001 to about 50 M.
81. The method of any one of clauses 1 to 78, wherein the concentration of the manganese complex in the aqueous mixture is from about 0.01 to about 30 M.
82. The method of any one of clauses 1 to 78, wherein the concentration of the manganese complex in the aqueous mixture is from about 0.05 to about 20 M.
83. The method of any one preceding clause, wherein the peroxide compound is any one or a combination of the group consisting of hydrogen peroxide, a peroxyacid, an alkylhydroperoxide, a phenylalkylhydroperoxide, and a ketone peroxide.
84. The method of any one of clauses 1 to 82, wherein the peroxide compound is any one or a combination of the group consisting of hydrogen peroxide, a peroxy acid, $C_{1-12}$alkylhydroperoxide and cumene hydroperoxide.
85. The method of any one of clauses 1 to 82, wherein the peroxide compound is a mixture of a peroxy acid and hydrogen peroxide.
86. The method of clause 85, wherein the molar ratio of peroxy acid to hydrogen peroxide is from about 10:1 to about 1:100.
87. The method of clause 85, wherein the molar ratio of peroxy acid to hydrogen peroxide is from about 5:1 to about 1:10.
88. The method of any one of clauses 83 to 87, wherein the peroxy acid is peracetic acid.
89. The method of any one of clauses 1 to 82, wherein the peroxide compound is a mixture of $C_{1-12}$alkylhydroperoxide and hydrogen peroxide.
90. The method of clause 89, wherein the molar ratio of $C_{1-12}$alkylhydroperoxide to hydrogen peroxide is from about 10:1 to about 1:10.
91. The method of any one of clauses 89 to 90, wherein the $C_{1-12}$alkylhydroperoxide is tert-butyl-hydroperoxide.
92. The method of any one preceding clause, wherein the concentration of the peroxide compound is from about 0.01 to about 500 mM.
93. The method of any one of clauses 1 to 91, wherein the concentration of the peroxide compound is from about 0.1 to about 100 mM.
94. The method of any one of clauses 1 to 91, wherein the concentration of the peroxide compound is from about 0.3 to about 30 mM.
95. The method of any one preceding clause, wherein the temperature of the aqueous mixture is from about 15° C. to about 90° C.
96. The method of any one of clauses 1 to 94, wherein the temperature of the aqueous mixture is from about 20° C. to about 70° C.
97. The method of any one of preceding clause, wherein the pH of the aqueous mixture is from about 4 to about 12.
98. The method of any one of clauses 1 to 96, wherein the pH of the aqueous mixture is from about 6 to about 11.
99. The method of any one preceding clause, wherein the aqueous mixture further comprises one or more sequestrants selected from the group consisting of an aminophosphonate, an aminocarboxylate and a carboxylate.
100. The method of clause 99, wherein the aminophosphonate sequestrant is any one or a combination of the group consisting of nitrilo trimethylene phosphonate, ethylenediamine-N,N,N',N'-tetra(methylene phosphonate) (DEQUEST 204™) and diethylenetriamine-N,N,N',N",N"-penta(methylene phosphonate) (DEQUEST 206™); the aminocarboxylate sequestrant is any one of the group consisting of ethylenediaminetetraacetic acid, N-hydroxyethylenediaminetetraacetic acid, nitrilotriacetic acid, N-hydroxyethylaminodiacetic acid, N-hydroxyethylaminodiacetic acid, glutamic diacetic acid, sodium iminodisuccinate, diethylenetriaminepentaacetic acid, ethylenediamine-N,N'-disuccinic acid, methylglycinediacetic acid and alanine-N, N-diacetic acid; and the carboxylate sequestrant is any one of the group consisting of citric acid, citrate alkali salts and gluconate.

101. The method of clause 99, wherein the aminophosphonate sequestrant is ethylenediamine-N,N,N',N'-tetra (methylene phosphonate) (DEQUEST 204™) or diethylenetriamine-N,N,N',N",N"-penta (methylenephosphonate) (DEQUEST 206™); the aminocarboxylate sequestrant is selected from ethylenediaminetetraacetic acid, diethylenetriaminepentaacetic acid, and methylglycinediacetic acid; and the carboxylate sequestrant is selected from citric acid, citrate alkali salts and gluconate.

102. The method of any one preceding clause wherein the aqueous mixture comprises a buffer.

103. The method of clause 102, wherein the buffer is any one or a combination selected from the group consisting of phosphate, carbonate and borate.

104. The method of clause 102, wherein the buffer is a carbonate.

105. The method of clause 102, wherein the pH of the aqueous mixture is from about 8 to about 10.5.

106. The method of clause 102, wherein the pH of the aqueous mixture is from about 8 to about 10.

107. The method of clause 102, wherein the pH of the aqueous mixture is from about 8.5 to 9.5.

108. The method of clause 102, wherein the pH of the aqueous mixture is about 9.

109. The method of any one of clauses 1 to 101, wherein a buffer is not added to the aqueous mixture.

110. The method of clause 109, wherein the pH of the aqueous mixture is from about 9.5 to about 11.5.

111. The method of clause 109, wherein the pH of the aqueous mixture is from about 10 to about 10.5.

112. The method of any one preceding clause, wherein the biofilm comprises any one or a combination of constituents selected from the group consisting of alginate, bacterial cellulose, colonic acid, dextran, kefiran, curdlan, wedlan, gellan, and xanthan.

113. The method of any one of clauses 1 to 111, wherein the biofilm comprises alginate.

114. The method of clause 112 or 113, wherein the alginate is produced by bacteria or algae.

115. The method of clause 114 wherein the bacteria is *Azotobacter* and *Pseudomonas*.

116. The method of clause 114 or clause 115, wherein the algae is green algae.

117. The method of any one preceding clause, wherein the method reduces the mass of the biofilm by at least 1 wt %.

118. The method of any one of clauses 1 to 116, wherein the method reduces the mass of the biofilm by at least 10%, 119. A method of degrading a biofilm comprising contacting the biofilm with an aqueous mixture comprising a peroxide compound and a ligand of formula (I) or (II):

(I)

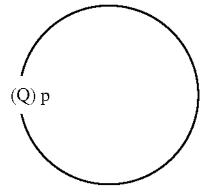

(II)

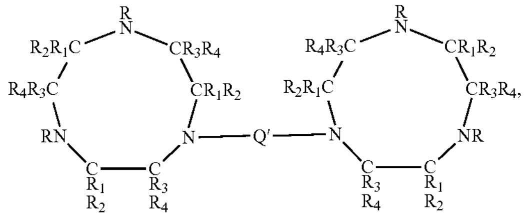

wherein:

Q=

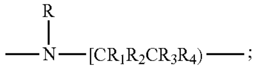

p is 3;

each R is independently selected from the group consisting of hydrogen, $C_1$-$C_{24}$alkyl, $CH_2C_6$-$C_{10}$aryl, $CH_2CH_2OH$, $CH_2COOH$, and pyridin-2-ylmethyl;

Q' is an ethylene or propylene bridge; and $R_1$, $R_2$, $R_3$, and $R_4$ are independently selected from: H, $C_1$-$C_4$alkyl and $C_1$-$C_4$alkylhydroxy.

EXPERIMENTAL

Raw Materials $Me_3$-TACN was obtained as disclosed in WO 94/08981 A1.

$[Mn_2(\mu\text{-}O)_3(Me_3\text{-}TACN)_2](CH_3COO)_2$ (as a 3.5 wt % aqueous solution in acetate buffer pH 5, made from 2.4 wt % Na-acetate, 1.8 wt % glacial acetic acid and adjusted to pH 5) was obtained as disclosed in WO 2006/125517 A1.

$[Mn_2(\mu\text{-}O)_2(\mu\text{-}CH_3COO)(Me_4DTNE)]Cl_2$ was prepared as disclosed in WO 2011/106906 A1.

Sodium alginate was purchased from BDH@Prolabo (WVR).

All other chemicals were obtained from standard chemical suppliers.

Preparation of the Initial Alginate Solution

First a 1.5 wt % alginate solution in water was prepared by slowly adding 7.5 g of solid sodium alginate into 492.5 g of demineralised water whilst stirring vigorously using a mechanical stirrer. The mixture was left to stir at room temperature (which denotes 20° C. herein) until no more solid sodium alginate was visible.

Stock Solutions

Stock 1: A 5 M stock solution of hydrogen peroxide was prepared by placing 4.29 mL of commercial hydrogen peroxide (35% purity) into a 10 mL volumetric flask and topping up with demineralised water until the 10 mL mark was reached.

Stock 2: A 0.5 M stock solution of tert-butyl hydroperoxide (abbreviated as $^tBuOOH$) was obtained by placing 0.685 mL of a commercial 70% purity solution of $^{t}$BuOOH into a 10 mL volumetric flask and topping up to the 10 mL mark with demineralised water.

Stock 3: A 39.6 g/L stock solution of $NaHCO_3$ was obtained by weighing 3.96 g of solid $NaHCO_3$ powder and placing it into a 100 mL glass beaker. About 50 mL demineralised water was added and the solution was stirred until complete dissolution of the powder. Once dissolved, the pH was adjusted to pH 7.4 using diluted HCl before the content of the beaker was transferred into a 100 mL volumetric flask. The beaker was rinsed with demineralised water and the rinsing media was also transferred into the flask. Finally, the volumetric flask containing the carbonate solution was filled with demineralised water until the 100 mL mark was reached and the content was shaken.

Stock 4: A 25 g/L solution of sodium tetraborate decahydrate was prepared by placing 2.5 g of the solid powder into a 100 mL volumetric flask. Demineralised water was then added and the flask was swirled until complete dissolution of the solid. Finally, demineralised water was added until the 100 mL mark was reached.

Stock 5: Ascorbic acid 5 mM: 17.62 mg of commercial L-ascorbic acid was weighed and placed in a 20 mL volumetric flask. Demineralised water was added to the flask until the 20 mL mark was reached. The flask was then closed and shaken until full dissolution of the solid.

Stock 6: Ascorbic acid 0.5 mM neutralised: 2 mL of the 5 mM ascorbic acid stock solution was placed in a 20 mL vial followed by 15 mL demineralised water. The solution was stirred, and the pH was measured. NaOH 0.1M was added to bring the pH of the solution up to pH 6-7 (the exact volume of NaOH used was recorded). Finally, the volume of the solution was increased to 20 mL by addition of demineralised water.

Stock 7: A 2 mM stock solution of neutralised L-ascorbic acid was prepared as follows: 35.22 mg of the ascorbic acid powder was weighed and transferred into a 100 mL glass beaker. About 60 mL demineralised water was added before the solution was stirred. Once the solid had fully dissolved, diluted NaOH solution was used to bring the pH of the solution from pH 6 to 7 before the solution was transferred into a 100 mL volumetric flask. The beaker was rinsed with demineralised water, the rinsing water was transferred into the volumetric flask and finally the volume of the solution was brought up to 100 mL using demineralised water.

Stock 8: A 4 mM stock solution of manganese sulfate was made by dissolving 13.52 mg of manganese sulfate monohydrate into a 20 mL volumetric flask using demineralised water. The total volume of the solution was 20 mL.

Stock 9: A 4 mM stock solution of manganese chloride was made by dissolving 15.83 mg of $MnCl_2 \cdot 4H_2O$ in a 20 mL volumetric flask using demineralised water. The total volume of the solution was 20 mL.

Stock 10: A 4 mM stock solution of $Me_3$-TACN was obtained by placing 14.43 mg of a 95% pure commercial solution of the product into a 20 mL volumetric flask. About 18 mL demineralised water was added followed by 80 μL HCl (1 M) before the solution was swirled. Finally, demineralised water was added until the 20 mL mark was reached. The flask was stoppered and shaken until the solution was homogeneous.

Stock 11: 10 mL of a 2 mM aqueous solution of $[Mn_2(\mu\text{-}O)_2(\mu\text{-}CH_3COO)(Me_4DTNE)]Cl_2$ was prepared by dissolving 24.24 mg of a 50.5% pure commercial batch of the catalyst into a 10 mL volumetric flask using demineralised water. Water was added until the 10 mL mark was reached, then the flask was stoppered and shaken until the solution was homogeneous.

Stock 12: A 2 mM stock solution of $[Mn_2(\mu\text{-}O)_3(Me_3\text{-}TACN)_2](CH_3COO)_2$ was obtained by diluting 0.327 mL of a 3.5 wt % solution with 9.573 mL demineralised water into a 10 mL volumetric flask.

Stock 13: A 0.5 mM stock solution of $[Mn_2(\mu\text{-}O)_3(Me_3\text{-}TACN)_2](CH_3COO)_2$ was obtained by diluting 0.163 mL of a 3.5 wt % solution with 19.827 mL demineralised water into a 20 mL volumetric flask.

Procedure 1 Intrinsic Viscosity Measurements

Apparatus and Principle

Intrinsic viscosity was measured using a manual SCAN tube viscometer type C purchased from PSL-Rheotek. This viscometer has a built-in water-jacket that was connected to a water bath circulating water at 25° C. so that the temperature could be kept steady during the tests.

Analysis consisted of measuring the time needed for a solution to flow through the tube (efflux time in seconds); efflux time is linked to the viscosity of the sample. To make measurements more reliable, the viscometer was equipped with two markings (upper and lower) delimiting a set volume within the tube. Before each measurement, the viscometer was filled with the test solution up to a level slightly above the upper mark and the solution was kept in the tube for a few minutes to allow for temperature homogenisation.

Next, the tube was opened to let the liquid flow through. When the meniscus crossed the upper mark of the tube, the time measurement was started and when the level of liquid reached the lower mark the chronometer was stopped. The value displayed on the chronometer corresponded to the efflux time. For enhanced reliability, the measurement was repeated a second time and the average efflux time was calculated.

Note that NaCl 0.1 mM was used as solvent; the efflux time for this solution was equal to 53.26 seconds.

Calculation of the Intrinsic Viscosity

The intrinsic viscosity of a solution was obtained using the Huggins equation:

$$\frac{\eta_{sp}}{c} = [\eta] + k'.[\eta]^2.C \qquad \text{(equation 1)}$$

With:

[η] the Intrinsic Viscosity in g/dL

C: the concentration of biofilm in solution expressed in g/dL $\eta_{sp}$ the specific viscosity defined as:

$$\eta_{sp} = \frac{\eta_{solution}}{\eta_{solvent}} - 1$$

Since very dilute solutions were used, one can assume that the densities of the solvent and test solutions were similar and simplify the equation as follows:

$$\eta_{sp} = \frac{\text{Efflux } time_{solution}}{\text{Efflux } time_{solvent}} - 1 \qquad \text{(equation 2)}$$

From equation 1, the Intrinsic Viscosity of a sample can be obtained by diluting said sample to different concentrations of biofilm before measuring the efflux time of the diluted solutions. Then, $$\frac{\eta_{sp}}{C}$$

be calculated for each concentration and plotted versus the level of biofilm (in g/dL) effectively present. The data points obtained formed a straight line (see example in FIG. 1) with the Y-intercept corresponding to the Intrinsic Viscosity.

Calculation of the Average Molecular Weight of the Alginate Chains

The average molecular weight of the alginate chains was calculated using the Mark-Houwink equation. In this case, the values for the different constants of the equations were obtained from *Rheological Evaluation of Inter-grade and Inter-batch Variability of Sodium Alginate* published in *AAPS Pharm. Sci. Tech.*, Vol. 11, No. 4, December 2010.

$$M_w = \left(\frac{[\eta]}{0.023}\right)^{\frac{1}{0.984}} \quad \text{(equation 3)}$$

$$M_n = \left(\frac{[\eta]}{0.095}\right)^{\frac{1}{0.963}} \quad \text{(equation 4)}$$

As explained above, [η] corresponds to the Intrinsic Viscosity in dL/g. The average Molecular Weights calculated are expressed in kilo Dalton (kDa).

Treatment of the Alginate Solution 200 mL of the 1.5 wt % alginate solution was placed in a 500 mL glass beaker followed by 0.43 mL of the $H_2O_2$ stock solution and 4.1 mL demineralised water. The solution was homogenized using a magnetic stirrer and 0.37 mL NaOH (1 M) was added to bring the pH up to pH 10.5. Then, 19.98 g aliquots of the alginate mixture were transferred into 75 mL High-Density Polyethylene (HDPE) containers (Duma Container Special purchased from VWR).

4 mL of the $[Mn_2(\mu\text{-}O)_3(Me_3\text{-}TACN)_2](CH_3COO)_2$ solution (0.5 mM, stock 13) was pre-mixed with 4 mL of the 0.5 mM ascorbic acid solution (stock 6) in a 20 mL vial. The sample obtained was shaken until homogeneous before being used to dose the catalyst into the HDPE bottles. The concentration of catalyst in the samples ranged from 0 to 10 M.

Finally, demineralised water was added into each bottle to bring the volume of solution contained up to 21 mL (i.e. the alginate content of the samples was equal to 1.4 wt %). The bottles were closed and shaken to homogenize the systems. Immediately after, the bottles were stored in a warm water bath set to 50° C. for 60 minutes.

At the end of the reaction time, the bottles were taken out of the water bath and placed in ice to stop the reaction.

Intrinsic Viscosity Measurements:

All the analyses were performed using NaCl 0.1M as solvent. The Intrinsic Viscosity of 6 solutions was measured:

Sample 1: 1.4% alginate, untreated

Sample 2: 1.4% alginate treated with 10 mM $H_2O_2$

Sample 3: 1.4% alginate treated with 10 mM $H_2O_2$ and 0.5 μM $[Mn_2(\mu\text{-}O)_3(Me_3\text{-}TACN)_2](CH_3COO)_2$ premixed with ascorbic acid (see description above)

Sample 4: 1.4% alginate treated with 10 mM $H_2O_2$ and 1 μM $[Mn_2(\mu\text{-}O)_3(Me_3\text{-}TACN)_2](CH_3COO)_2$ premixed with ascorbic acid (see description above)

Sample 5: 1.4% alginate treated with 10 mM $H_2O_2$ and 2 μM $[Mn_2(\mu\text{-}O)_3(Me_3\text{-}TACN)_2](CH_3COO)_2$ premixed with ascorbic acid (see description above)

Sample 6: 1.4% alginate treated with 10 mM $H_2O_2$ and 10 μM $[Mn_2(\mu\text{-}O)_3(Me_3\text{-}TACN)_2](CH_3COO)_2$ premixed with ascorbic acid (see description above)

Each solution analysed was diluted to three different alginate levels as indicated in Table 1 Table, below, using demineralised water and NaCl (1 M). The diluted solutions all contained 0.1 M NaCl.

TABLE 1

Overview concentrations of alginate in 0.1M NaCl used for the intrinsic viscosity measurements.

| Sample no. | Original alginate content | Alginate content dilution 1 | Alginate content dilution 2 | Alginate content dilution 3 |
|---|---|---|---|---|
| 1 | 1.4% | 0.075% | 0.1% | 0.125% |
| 2 | 1.4% | 0.075% | 0.1% | 0.125% |
| 3 | 1.4% | 0.075% | 0.1% | 0.125% |
| 4 | 1.4% | 0.1% | 0.15% | 0.2% |
| 5 | 1.4% | 0.1% | 0.2% | 0.3% |
| 6 | 1.4% | 0.3% | 0.5% | 0.7% |

The efflux time or each of the solutions was measure twice before being averaged. This value was used to calculate $\eta_{sp}$ as explained above, considering an efflux time for the solvent equal to 53.26 seconds.

After plotting $$\frac{\eta_{sp}}{C}$$

against C (C=alginate content in g/dL), a linear regression was performed with the Y-intercept of the trendline corresponding to the Intrinsic Viscosity in dL/g. This value was used to calculate the average Molecular weight of the polymer chains in the sample tested.

Procedure 2 Dynamic Viscosity Measurements

Treatment of the Alginate Solution 19.5 mL of the 1.5 wt % alginate solution was placed in a plastic bottle followed by the stock solution of oxidant (hydrogen peroxide, tert-butyl hydroperoxide, peracetic acid, or mixtures thereof), optionally the sequestrant and/or buffer, NaOH to adjust the pH and (when needed) $[Mn_2(\mu\text{-}O)_3(Me_3\text{-}TACN)_2](CH_3COO)_2$, $[Mn_2(\mu\text{-}O)_2(\text{—}CH_3COO)(Me_4DTNE)]Cl_2$, $[Mn_2(\mu\text{-}O)_3(Me_3\text{-}TACN)_2](CH_3COO)_2$ premixed with 1 molar equivalent of ascorbic acid solution[note 1] or $MnSO_4 \cdot H_2O$ mixed with $Me_3$-TACN).[note 2] Then, demineralised water was added to increase the volume of the solution to 21 mL. At this stage, the alginate content of the sample was equal to 1.4 wt %.

The bottle was placed in a warm water bath (50° C.) for 60 minutes before being removed and cooled in an ice bath. Finally, the dynamic viscosity was determined using a Brookfield viscosity meter as outlined below.

Note 1: A 2 mM solution of $[Mn_2(\mu\text{-}O)_3(Me_3\text{-}TACN)_2](CH_3COO)_2$ (see description of stock 12 above) was mixed with equivalent volume of the 2 mM ascorbic acid stock solution (stock solution 7). Upon contact with the ascorbic acid, the catalyst turned from orange/red to red/purple.

Note 2: 0.5 mL of both $Me_3$-TACN ligand (stock solution 10) and $MnSO_4 \cdot H_2O$ (stock solution 8) were mixed, stirred and used as a source of catalyst to be placed in the alginate solution.

Dynamic Viscosity Analyses

The dynamic viscosity of the samples was measured using a Brookfield HBDV-II cone/plate viscosity meter equipped with a spindle CPE-40. The viscometer was linked to a water bath to maintain the temperature at 25° C. The apparatus was controlled via computer (external mode) using the Rheocalc software.

Initially, the viscometer was zeroed without spindle. Then, the spindle CPE-40 was installed and the gap between the bottom of the cone and the top of the cup was set according to the recommendations given by Brookfield.

0.5 mL of the treated alginate solution was placed in the cup of the viscometer using a disposable plastic syringe before the apparatus was closed and the test program launched. This program was set-up as follows:

Step 1: the initial rotation speed of the cone spindle was set to 150 rotations per minute (RPM).

Step 2: the cone rotated at said speed for 30 seconds.

Step 3: a viscosity measurement was taken.

Step 4: the rotation speed increased by 10 RPM and steps 2 to 4 were repeated. The program stopped after a viscosity measurement was taken at a rotation speed of 200 RPM.

Results.

Experiment 1 Determination of Molecular Weight Parameters of Alginate Treated with $[Mn^{IV}_2(\mu\text{-}0)_3(Me_3\text{-TACN})_2](CH_3COO)_2$/Ascorbic Acid Combined with $H_2O_2$ A solution of sodium alginate was treated at pH 10.5 with 10 mM $H_2O_2$ and different concentrations of the $[Mn_2(\mu\text{-}O)_3(Me_3\text{-TACN})_2](CH_3COO)_2$ catalyst pre-mixed with 1 molar equivalent of ascorbic acid. Treatment took place for 60 minutes at 50° C.; a full description can be found in Procedure 1 above.

At the end of the reaction time, both the dynamic and intrinsic viscosity values were measured as explained above. The results are shown in Table 2.

TABLE 2

Dynamic and intrinsic viscosities of alginate treated with 10 mM $H_2O_2$ and from 0 and 10 μM of $[Mn_2(\mu\text{-}O)_3(Me_3\text{-TACN})_2](CH_3COO)_2$ and equimolar amounts of ascorbic acid, pH 10.5; 60 min treatment time at 50° C.

| Sample no. | Description | Dynamic Viscosity @200 RPM (mPa.s) | Intrinsic Viscosity (dL/g) | Mw (kDa) | Mn (kDa) | Mw/Mn |
|---|---|---|---|---|---|---|
| 1 | untreated | 97.1 | 10.3 | 496 | 130 | 3.8 |
| 2 | Blank, no catalyst | 91.6 | 8.7 | 421 | 110 | 3.8 |
| 3 | 0.5 μM catalyst | 85.2 | 7.2 | 347 | 90 | 3.8 |
| 4 | 1 μM catalyst | 67.6 | 5.6 | 267 | 69 | 3.9 |
| 5 | 2 μM catalyst | 40.2 | 3.9 | 189 | 48 | 3.9 |
| 6 | 10 μM catalyst | 6.0 | 1.4 | 68 | 17 | 4.0 |

The results presented in Table 2 show that treatment with $[Mn_2(\mu\text{-}O)_3(Me_3\text{-TACN})_2](CH_3COO)_2$ premixed with ascorbic acid leads to a clear decrease both in the dynamic and in the Intrinsic Viscosity of the alginate solution. As the Intrinsic Viscosity is linked to the length of the polymer chains (Mw-5$^{th}$ column), one can conclude that treatment with catalyst leads to cleavage of the polymer chains, thus shortening the polymer and making it more soluble.

Experiment 2 pH Dependent Depolymerisation of Alginate by $[Mn^{IV}_2(\mu\text{-}O)_3(Me_3\text{-TACN})_2](CH_3COO)_2$ and $H_2O_2$ These experiments were carried out following Procedure 2 described above. The alginate solutions were treated with 20 mM $H_2O_2$ at pH 9.0, 9.5, 10.0, 10.5 and 11.0 with 0 (blanks), 5 μM and 10 μM of $[Mn^{IV}_2(\mu\text{-}O)_3(Me_3\text{-TACN})_2](CH_3COO)_2$ before their dynamic viscosity was measured after a 60-minute reaction at 50° C. (see Table 3 Table below).

TABLE 3

Influence of the pH and level of $[Mn_2(\mu\text{-}O)_3(Me_3\text{—TACN})_2](CH_3COO)_2$ in solution on the depolymerisation of alginate. Conditions: 20 mM $H_2O_2$, 0, 2.5, 5 and 10 μM $[Mn_2(\mu\text{-}O)_3(Me_3\text{—TACN})_2](CH_3COO)_2$, pH 9-11; 1 h reaction time at 50° C.

| $[Mn_2(\mu\text{-}O)_3(Me_3\text{—TACN})_2]^{2+}$ | Dynamic Viscosity (mPa · s) | | | | |
|---|---|---|---|---|---|
| | pH 9.0 | pH 9.5 | pH 10.0 | pH 10.5 | pH 11.0 |
| 0 | 110.3 | 109.5 | 109.2 | 107.5 | 103.5 |
| 2.5 μM | 99.7 | 76.8 | 60.6 | 56.6 | 64.8 |
| 5 μM | 78.1 | 41.3 | 27.2 | 25.6 | 40.4 |
| 10 μM | 47.9 | 16.2 | 11.9 | 11.1 | 37.4 |

The data presented in Table 3 show that an effective loss in viscosity can be obtained using $[Mn^{IV}_2(\mu\text{-}O)_3(Me_3\text{-TACN})_2](CH_3COO)_2$ at various pH values. Under the conditions tested, the optimal pH for alginate depolymerisation is about pH 10 but significant viscosity losses are observed from pH 9.0 to pH 11.0 (upper and lower pH values tested). It should be noted that very low concentrations of the catalyst are sufficient to bring about significant viscosity losses: losses were observed after treatment with only 2.5 μM of the product.

Experiment 3 pH Dependent Depolymerisation of Alginate by $[Mn^{IV}_2(\mu\text{-}O)_3(Me_3\text{-TACN})_2](CH_3COO)_2$/Ascorbic Acid and $H_2O_2$ These tests were carried out the same way as presented in "Experiment 2" above, but the catalyst solution was pre-mixed with one molar equivalent of neutralised ascorbic acid prior to being added to the alginate solution. The results of the dynamic viscosity measurements are given in Table 4 below.

TABLE 4

Influence of the pH and level of $[Mn_2(\mu\text{-}O)_3(Me_3\text{—}TACN)_2](CH_3COO)_2$ in solution of the depolymerisation of alginate. Conditions: 20 mM $H_2O_2$, 0, 2.5, 5 and 10 μM $[Mn_2(\mu\text{-}O)_3(Me_3\text{—}TACN)_2](CH_3COO)_2$ premixed with 1 molar equivalent of ascorbic acid at pH 9-11; 1 h reaction time at 50° C.

| $[Mn_2(\mu\text{-}O)_3(Me_3\text{—}TACN)_2]^{2+}$/ | Dynamic Viscosity (mPa · s) | | | | |
|---|---|---|---|---|---|
| Ascorbic acid (1/1) | pH 9.0 | pH 9.5 | pH 10.0 | pH 10.5 | pH 11.0 |
| 0 | 99.8 | 98.3 | 99.0 | 97.2 | 90.6 |
| 2.5 μM | 50.1 | 33.8 | 31.3 | 41.5 | 53.2 |
| 5 μM | 38.5 | 20.1 | 14.3 | 19.1 | 35.8 |
| 10 μM | 20.3 | 10.5 | 6.9 | 10.1 | 32.3 |

The data in Table 4 show that pre-mixing the catalyst with ascorbic acid prior to the reaction leads to a very pronounced loss of viscosity of the alginate, often larger than when the catalyst is used without ascorbic acid (see Table 3). This is especially noticeable when using low levels of catalyst. The highest activity is observed over a wide pH range with an optimum about pH 9.5-10.5.

Experiment 4 pH Dependent Depolymerisation of Alginate by $[Mn^{IV}_2(\mu\text{-}O)_3(Me_3\text{-}TACN)_2](CH_3COO)_2$ and $H_2O_2$ in Carbonate Buffer The tests described in "Experiment 2" were repeated with 4.7 mM sodium hydrogen carbonate added to the alginate solution. The pH range was investigated from pH 8.0 to 10.5. Results are shown in Table 5.

TABLE 5

Influence of the pH and level of $[Mn_2(\mu\text{-}O)_3(Me_3\text{-}TACN)_2](CH_3COO)_2$ in solution of the depolymerisation of alginate. Conditions: 20 mM $H_2O_2$; 4.7 mM $NaHCO_3$; 0, 2.5, 5 and 10 μM $[Mn_2(\mu\text{-}O)_3(Me_3\text{-}TACN)_2](CH_3COO)_2$, pH 8-10.5; 1 h reaction time at 50° C.

| | Dynamic Viscosity (mPa.s) | | | | | |
|---|---|---|---|---|---|---|
| $[Mn_2(\mu\text{-}O)_3(Me_3\text{-}TACN)_2]^{2+}$ | pH 8.0 | pH 8.5 | pH 9.0 | pH 9.5 | pH 10.0 | pH 10.5 |
| 0 | 99.0 | 99.2 | 98.6 | 99.2 | 99.4 | 96.7 |
| 2.5 μM | 85.0 | 72.2 | 55.7 | 59.5 | 81.2 | 67.5 |
| 5 μM | 50.9 | 38.6 | 24.1 | 28.0 | 61.0 | 57.0 |
| 10 μM | 26.3 | 16.1 | 9.4 | 12.8 | 38.1 | 49.4 |

The data presented in Table show that an effective viscosity loss can be obtained when using $[Mn^{IV}_2(\mu\text{-}O)_3(Me_3\text{-}TACN)_2](CH_3COO)_2$ at various pH's in a solution containing carbonate. The addition of carbonate to the alginate solution led to a decrease in the optimal pH that was found to be about pH 9. It should be noted that even on lower end of the pH ranges tested (pH 8-8.5) the catalyst showed good depolymerisation activity.

Experiment 5 pH Dependent Depolymerisation of Alginate by $[Mn^{IV}_2(\mu\text{-}O)_3(Me_3\text{-}TACN)_2](CH_3COO)_2$/Ascorbic Acid and $H_2O_2$ in Carbonate Buffer Similar experiments as described in "Experiment 3" were conducted but now in the presence of 4.7 mM sodium hydrogen carbonate. The results of the dynamic viscosity measurements are shown in Table 6 below.

TABLE 6

Influence of the pH and level of $[Mn_2(\mu\text{-}O)_3(Me_3\text{-}TACN)_2](CH_3COO)_2$ in solution of the depolymerisation of alginate. Conditions: 20 mM $H_2O_2$, 0, 2.5, 5 and 10 μM $[Mn_2(\mu\text{-}O)_3(Me_3\text{-}TACN)_2](CH_3COO)_2$ premixed with 1 molar equivalent of ascorbic acid in 4.7 mM $NaHCO_3$ at pH 8-10.5; 1 h reaction time at 50° C.

| $[Mn_2(\mu\text{-}O)_3(Me_3\text{-}TACN)_2]^{2+}$/ | Dynamic Viscosity (mPa.s) | | | | | |
|---|---|---|---|---|---|---|
| Ascorbicacid (1/1) | pH 8.0 | pH 8.5 | pH 9.0 | pH 9.5 | pH 10.0 | pH 10.5 |
| 0 | 100.2 | 1001. | 98.8 | 98.4 | 99.9 | 97.8 |
| 2.5 μM | 66.6 | 46.7 | 31.0 | 42.6 | 75.3 | 80.6 |
| 5 μM | 34.8 | 21.6 | 14.6 | 26.4 | 61.1 | 66.7 |
| 10 μM | 14.8 | 9.8 | 6.9 | 12.8 | 44.9 | 50.6 |

The mixture of $[Mn_2(\mu-O)_3(Me_3-TACN)_2]^{2+}$ and ascorbic acid was very active in alginate depolymerisation. As seen in "Experiment 4", the addition of carbonate buffer leads to an increase in activity at low pH, with an optimal pH of about 9. When the catalyst is allowed to react with ascorbic acid prior to the alginate treatment process, the activity at pH 8.0-8.5 is clearly higher than when using the non-treated catalyst solution.

Experiment 6 Time Dependency of Depolymerisation of Alginate by $[Mn^{IV}_2(\mu-O)_3(Me_3-TACN)_2](CH_3COO)_2$/Ascorbic Acid and $H_2O_2$ in Carbonate Buffer Similar tests as described in "Experiment 5" were performed at pH 8.5 and pH 9.5. The dynamic viscosity was determined after different reaction times ranging from 10 to 60 min. The results are presented in Table 7.

TABLE 7

Time dependency of alginate depolymerisation by $[Mn_2(\mu-O)_3(Me_3-TACN)_2](CH_3COO)_2$ mixed with ascorbic acid. Conditions: 20 mM $H_2O_2$; 4.7 mM $NaHCO_3$; pH 8.5 and pH 9.5; 0, 2.5, 5 and 10 μM $[Mn_2(\mu-O)_3(Me_3-TACN)_2](CH_3COO)_2$ premixed with 1 molar equivalent of ascorbic acid. Treatment times 10 min, 30 min and 1 h at 50° C.

| | Dynamic Viscosity (mPa.s) | | | | | |
|---|---|---|---|---|---|---|
| $[Mn_2(\mu-O)_3(Me_3-TACN)_2]^{2+}$/ Ascorbic acid (1/1) | 10 min pH 9.5 | 30 min pH 9.5 | 60 min pH 9.5 | 10 min pH 8.5 | 30 min pH 8.5 | 60 min pH 8.5 |
| 0 | 99.8 | 100.7 | 97.8 | 99.8 | 98.1 | 92.6 |
| 2.5 μM | 55.5 | 46.3 | 42.6 | 51.8 | 46.4 | 46.0 |
| 5 μM | 28.5 | 24.7 | 19.9 | 24.6 | 26.0 | 21.1 |
| 10 μM | 14.3 | 13.1 | 9.7 | 11.6 | 11.9 | 9.8 |

The data shown in Table 7 indicate that the rate of depolymerisation was very high under the conditions tested, with a large loss in viscosity measured after only 10 minutes of treatment.

Experiment 7 Reduction of Alginate Treatment Temperature by $[Mn^{IV}_2(\mu-O)_3(Me_3-TACN)_2](CH_3COO)_2$/Ascorbic Acid and $H_2O_2$ in Carbonate Buffer Experiments similar to those described in "Experiment 5" were carried out, but at 30° C. instead of 50° C. The reaction time was also shortened to 30 minutes vs. 60 minutes previously.

The alginate solutions were treated at various pH values using the catalyst pre-treated with ascorbic acid before the dynamic viscosity values were measured. Results are presented in Table 8.

TABLE 8

Alginate depolymerisation by $[Mn_2(\mu-O)_3(Me_3—TACN)_2](CH_3COO)_2$ mixed with ascorbic acid. Conditions: 20 mM $H_2O_2$; 4.7 mM $NaHCO_3$; pH from 8.0 to 10.0; 0, 2.5, 5 and 10 μM $[Mn_2(\mu-O)_3(Me_3—TACN)_2](CH_3COO)_2$ premixed with 1 molar equivalent of ascorbic acid; 30 minutes reaction time at 30° C.

| $[Mn_2(\mu-O)_3(Me_3—TACN)_2]^{2+}$/ | Dynamic Viscosity (mPa · s) | | | | |
|---|---|---|---|---|---|
| Ascorbic acid (1/1) | pH 8.0 | pH 8.5 | pH 9.0 | pH 9.5 | pH 10.0 |
| 0 | 99.3 | 100.5 | 97.8 | 98.6 | 95.4 |
| 2.5 μM | 64.6 | 45.0 | 29.3 | 48.9 | 81.1 |
| 5 μM | 30.6 | 20.4 | 13.0 | 29.0 | 68.8 |
| 10 μM | 13.2 | 11.9 | 6.9 | 17.1 | 52.8 |

The data in Table 8 indicate that at 30° C., the activity of the catalyst towards depolymerisation of alginate is very high at a variety of pH values.

Experiment 8 Depolymerisation of Alginate by $[Mn^{IV}_2(\mu-O)_3(Me_3-TACN)_2](CH_3COO)_2$/Ascorbic Acid with Reduced Levels of $H_2O_2$ in Carbonate Buffer Tests were performed as described in "Experiment 7" with a pH of 9 and a $H_2O_2$ concentration ranging from 0.5 to 10 mM. The dynamic viscosity values measured from the solutions after treatment are presented in Table 9.

TABLE 9

$[H_2O_2]$ dependency of alginate depolymerisation by $[Mn_2(\mu-O)_3(Me_3—TACN)_2](CH_3COO)_2$ mixed with ascorbic acid. Conditions: 0.5-10 mM $H_2O_2$; 4.7 mM $NaHCO_3$; pH 9.0; 0, 2.5, 5 and 10 μM $[Mn_2(\mu-O)_3(Me_3—TACN)_2](CH_3COO)_2$ premixed with 1 molar equivalent of ascorbic acid; 30 min treatment time at 30° C.

| $[Mn_2(\mu-$ | Dynamic Viscosity (mPa · s) | | | | |
|---|---|---|---|---|---|
| $O)_3(Me_3—TACN)_2]^{2+}$/ Ascorbic acid (1/1) | 0.5 mM $H_2O_2$ | 1.25 mM $H_2O_2$ | 2.5 mM $H_2O_2$ | 5.0 mM $H_2O_2$ | 10.0 mM $H_2O_2$ |
| 0 | 99.5 | 99.4 | 99.7 | 100.9 | 100.7 |
| 2.5 μM | 45.7 | 25.8 | 27.6 | 20.4 | 22.3 |
| 5 μM | 39.9 | 19.4 | 16.0 | 11.3 | 12.3 |
| 10 μM | 39.8 | 17.8 | 10.7 | 12.3 | 7.5 |

The data gathered in Table 9 show that even when low levels of $H_2O_2$ are present, high alginate depolymerisation activity is observed when the manganese catalyst is used.

Experiment 9 Depolymerisation of Alginate by $[Mn^{IV}_2(\mu\text{-}O)_3(Me_3\text{-}TACN)_2](CH_3COO)_2$/Various Amounts of Ascorbic Acid and $H_2O_2$ in Carbonate Buffer Similar experiments to those of "Experiment 7" were carried out at pH 9.5 using various ratios of ascorbic acid: Mn catalyst. Results are presented in Table 10.

Table 10: Alginate depolymerisation by $[Mn_2(\mu\text{-}O)_3(Me_3\text{-}TACN)_2](CH_3COO)_2$ mixed with different molar ratios of ascorbic acid; [Catalyst]/[asc acid] molar ratios 1:0.5, 1:1, 1:2 and 1:3. Conditions: 20 mM $H_2O_2$; 4.7 mM $NaHCO_3$; pH 9.5; 0, 2.5, 5 and 10 μM $[Mn_2(\mu\text{-}O)_3(Me_3\text{-}TACN)_2](CH_3COO)_2$ premixed with various amounts of ascorbic acid; 30 min treatment time at 30° C.

TABLE 10

Alginate depolymerisation by $[Mn_2(\mu\text{-}O)_3(Me_3\text{-}TACN)_2](CH_3COO)_2$ mixed with different molar ratios of ascorbic acid; [Catalyst]/[asc acid] molar ratios 1:0.5, 1:1, 1:2 and 1:3. Conditions: 20 mM $H_2O_2$; 4.7 mM $NaHCO_3$; pH 9.5; 0, 2.5, 5 and 10 μM $[Mn_2(\mu\text{-}O)_3(Me_3\text{-}TACN)_2](CH_3COO)_2$ premixed with various amounts of ascorbic acid; 30 min treatment time at 30° C.

| $[Mn_2(\mu\text{-}O)_3(Me_3\text{-}TACN)_2]^{2+}$/ | Dynamic Viscosity (mPa · s) | | | |
|---|---|---|---|---|
| Ascorbic acid | 1:0.5 | 1:1 | 1:2 | 1:3 |
| 0 | 97.7 | 97.7 | 97.7 | 97.7 |
| 2.5 μM | 52.7 | 51.1 | 50.6 | 38.6 |
| 5 μM | 32.8 | 26.5 | 24.7 | 22.6 |
| 10 μM | 16.7 | 13.6 | 9.9 | 11.3 |

The data displayed in Table 10 show that various molar ratios of ascorbic acid: catalyst can be used to attain high alginate depolymerisation activity.

Experiment 10 Depolymerisation of Alginate by $[Mn^{IV}2(\mu\text{-}O)_3(Me_3\text{-}TACN)_2](CH_3COO)_2$/Ascorbic Acid with $^tBuOOH$ in Carbonate Buffer Similar experiments to those of "Experiment 5" were carried out at pH 9.5, replacing $H_2O_2$ with $^tBuOOH$. Results are presented in Table 11.

TABLE 11

Alginate depolymerisation by $[Mn_2(\mu\text{-}O)_3(Me_3\text{-}TACN)_2](CH_3COO)_2$/ascorbic acid. Conditions: 20 mM $^tBuOOH$; 4.7 mM $NaHCO_3$; pH 9.5; 0, 2.5, 5 and 10 μM $[Mn_2(\mu\text{-}O)_3(Me_3\text{-}TACN)_2](CH_3COO)_2$ premixed with 1 molar equivalent of ascorbic acid; 60 min treatment time at 50° C.

| $[Mn_2(\mu\text{-}O)_3(Me_3\text{-}TACN)_2]^{2+}$/ | Dynamic Viscosity (mPa · s) | | | |
|---|---|---|---|---|
| Ascorbic acid | pH 7.5 | pH 8.0 | pH 8.4 | pH 9.0 |
| 0 | 100.5 | 101.6 | 97.8 | n.d. |
| 2.5 μM | n.d. | n.d. | n.d | 36.8 |
| 5 μM | 40.4 | 27.6 | 24.6 | n.d. |
| 10 μM | 22.2 | 14.1 | 14.4 | n.d. |

n.d.: not done

The data in Table 11 show that effective depolymerisation of alginate also occurs when using $^tBuOOH$ in combination with the Mn catalyst at various pH's.

Experiment 11 Depolymerisation of Alginate by $[Mn^{IV}_2(\mu\text{-}O)_M(Me_3\text{-}TACN)_2](CH_3COO)_2$/Ascorbic Acid with $^tBuOOH$ and $H_2O_2$ in Carbonate Buffer Similar experiments to those described above in "Experiment 10" were carried out using a mixture of $^tBuOOH$ and $H_2O_2$. Results are presented in Table 12

TABLE 12

Alginate depolymerisation by $[Mn_2(\mu\text{-}O)_3(Me_3\text{-}TACN)_2](CH_3COO)_2$/ascorbic acid. Conditions: 20 mM $^tBuOOH$ or 10 mM $^tBuOOH$ + 10 mM $H_2O_2$ or 20 mM $H_2O_2$. 4.7 mM $NaHCO_3$; pH 8.5; 0, 2.5, 5 and 10 μM $[Mn_2)\mu\text{-}O)_3(Me_3\text{-}TACN)_2](CH_3COO)_2$ premixed with 1 molar equivalent of ascorbic acid; 60 min treatment time at 50° C.

| $[Mn_2(\mu\text{-}O)_3(Me_3\text{-}TACN)_2]^{2+}$/ | Dynamic Viscosity (mPa · s) | | |
|---|---|---|---|
| Ascorbic acid | $^tBuOOH$ | $^tBuOOH$ + $H_2O_2$ | $H_2O_2$ |
| 0 | 101.6 | 100.5 | 97.2 |
| 2.5 μM | 37.3 | 42.0 | 44.0 |
| 5 μM | 22.5 | 22.4 | 21.2 |
| 10 μM | 12.4 | 10.3 | 9.7 |

The data presented in Table 12 show that the activity of solutions of the invention comprising $^tBuOOH$ mixed with $H_2O_2$ is very similar to that of solutions of the invention comprising $^tBuOOH$ or $H_2O_2$ (when keeping total concentration of oxidant equal).

Experiment 12 Depolymerisation of Alginate by $[Mn^{IV}_2(\mu\text{-}O)_3(Me_3\text{-}TACN)_2](CH_3COO)_2$/Ascorbic Acid with Peracetic Acid and $H_2O_2$ in Carbonate Buffer Similar experiments to those shown in "Experiment 7" were carried out, with either peracetic acid (without hydrogen peroxide) or with a mixture of peracetic acid (PAA) and hydrogen peroxide ($H_2O_2$). The reaction time was increased from 30 to 60 minutes. Results are presented in Table 13.

TABLE 13

Alginate depolymerisation by $[Mn_2(\mu\text{-}O)_3(Me_3\text{-}TACN)_2](CH_3COO)_2$/ascorbic acid. Conditions: 3 mM PAA or 1.5 mM PAA + 1.5 mM $H_2O_2$ or 3 mM $H_2O_2$, 0.185M Tris buffer; pH 8.5; 0 or 10 μM $[Mn_2(\mu\text{-}O)_3(Me_3\text{-}TACN)_2](CH_3COO)_2$ or 10 μM $[Mn_2(\mu\text{-}O)_3(Me_3\text{-}TACN)_2](CH_3COO)_2$ premixed with 1 molar equivalent of ascorbic acid; 60 min treatment time at 30° C.
Dynamic Viscosity (mPa · s)

| Catalyst | 3 mM PAA | 1.5 mM PAA + 1.5 mM $H_2O_2$ | 3 mM $H_2O_2$ |
|---|---|---|---|
| None | 102.8 | 98.8 | 104.9 |
| 10 μM $[Mn_2(\mu\text{-}O)_3(Me_3\text{-}TACN)_2]^{2+}$ | 94.8 | 85.3 | 49.4 |
| 10 μM $[Mn_2(\mu\text{-}O)_3(Me_3\text{-}TACN)_2]^{2+}$/Ascorbic acid | 80.4 | 51.4 | 20.0 |

The data presented in Table 13 show that the Mn catalysts can be used in combination with $H_2O_2$, peracetic acid or a mixture of the two oxidants to depolymerise alginate. The activity of the catalyst without ascorbic acid premixed is much lower when PAA is present in solution (vs. $H_2O_2$ on its own) but premixing of the catalyst with ascorbic acid allows for a significant increase in the depolymerisation of the alginate chains.

Experiment 13 Depolymerisation of Alginate by Mn—$SO_4$ and $Me_3$-TACN Ligand with $H_2O_2$ in Carbonate Buffer These tests were carried out as described in "Experiment 5", using a mixture of $MnSO_4$ and $Me_3$TACN ligand combined with hydrogen peroxide. Results are presented in Table 14.

TABLE 14

Alginate depolymerisation by $[Mn_2(\mu\text{-}O)_3(Me_3\text{-}TACN)_2](CH_3COO)_2$ vs a combination of Mn-salt and $Me_3$TACN. Conditions: 10 mM $H_2O_2$, 4.7 mM $NaHCO_3$; pH 9, 10 or 11; 0 or 5 μM $[Mn_2(\mu\text{-}O)_3(Me_3\text{-}TACN)_2](CH_3COO)_2$ or 10 μM $Mn^{2+}$ + 10 μM $Me_3$TACN; 60 min treatment time at 50° C.

| | Dynamic Viscosity (mPa · s) | | |
|---|---|---|---|
| Catalyst | pH 9 | pH 10 | pH 11 |
| None | 95.5 | 95.5 | 95.5 |
| 5 μM $[Mn_2(\mu\text{-}O)_3(Me_3\text{-}TACN)_2]^{2+}$ | 21.6 | 40.6 | 62.1 |
| 10 μM ($Mn^{2+}$ + $Me_3$-TACN) | 61.9 | 69.9 | 71.6 |

The data presented in Table 14 show that both the pre-formed $[Mn_2(\mu\text{-}O)_3(Me_3\text{-}TACN)_2](CH_3COO)_2$ complex and the combination of $Mn^{2+}$ with $Me_3$TACN ligand significantly reduce viscosity upon treatment of the alginate with $H_2O_2$.

Experiment 14 Depolymerisation of Alginate by $MnCl_2 \cdot 4H_2O$ and $Me_3$-TACN Ligand in Combination with Tert-Butyl Hydroperoxide Experiments similar to those described in "Experiment 13" were performed using borate as a buffer and tert-butyl hydroperoxide as oxidant. The results of these experiments are shown in Table 15 below.

TABLE 15

Alginate depolymerisation by $[Mn_2(\mu\text{-}O)3(Me_3\text{-}TACN)_2](CH_3COO)_2$ vs a combination of Mn-chloride and $Me_3$TACN. Conditions: 20 mM $^t$BuOOH, 0.25 g/L sodium tetraborate decahydrate pH 9; 0 or 5 μM $[Mn_2(\mu\text{-}O)_3(Me_3\text{-}TACN)2]2(CH_3COO)_2$ or 10 μM $MnCl_2$ + 10 μM $Me_3$TACN; treatment time of 60 min at 50° C.

| | Dynamic Viscosity (mPa · s) |
|---|---|
| Catalyst | pH 9 |
| None | 102.8 |
| 5 μM $[Mn_2(\mu\text{-}O)_3(Me_3\text{-}TACN)_2]^{2+}$ | 52.3 |
| 10 μM ($Mn^{2+}$ + $Me_3$-TACN) | 72.1 |

The results of the experiments presented in Table 15 show that a combination of $Mn^{2+}$ and $Me_3$TACN ligand is also active towards alginate depolymerisation when used with $^t$BuOOH.

Experiment 15 Depolymerisation of Alginate by a Combination of Catalyst, $Me_3$TACN Ligand and Hydrogen Peroxide These experiments were carried out by treating a carbonate buffered solution (pH 10) containing 1.4% sodium alginate, 20 mM $H_2O_2$, $Me_3$-TACN ligand, and $MnSO_4$, $[Mn_2(\mu\text{-}O)_3(Me_3\text{-}TACN)_2]^{2+}$ or $[Mn_2(\mu\text{-}O)_3(Me_3\text{-}TACN)_2]^{2+}$ mixed with one equivalent of ascorbic acid (see Procedure 2, Note 1). $Me_3$-TACN ligand was added into all solutions in such a way that the catalyst to ligand molar ratio was either 1:1, 1:2 or 1:4. Note that two experiments (entry numbers 7 and 11 in Table 16 below) were run without any ligand so that the results could be used as references.

TABLE 16

Alginate depolymerisation by a combination of $H_2O_2$, catalyst and $Me_3$TACN ligand. Conditions: 20 mM $H_2O_2$, 4.7 mM $NaHCO_3$; pH 10; 5 μM $MnSO_4$ or 2.5 μM-5 μM $[Mn_2(\mu\text{-}O)_3(Mn_3\text{-}TACN)_2](CH_3COO)_2$ or 2.5 μM $[Mn_2(\mu\text{-}O)_3(Me_3\text{-}TACN)_2](CH_3COO)_2$ pre-mixed with 2.5 μM neutralised ascorbic acid, 2.5-20 μM $Me_3$-TACN ligand; 60 min treatment time at 50° C.

| Entry | Catalyst | Ascorbic acid | $Me_3$TACN ligand | Dynamic Viscosity (mPa · s) |
|---|---|---|---|---|
| 1 | 10 μM $MnSO_4$ | | 10 μM | 85.4 |
| 2 | 10 μM $MnSO_4$ | | 20 μM | 76.1 |
| 3 | 10 μM $MnSO_4$ | | 40 μM | 63.4 |
| 4 | 2.5 μM $[Mn_2(\mu\text{-}O)_3(Me_3\text{-}TACN)_2]^2$ | 2.5 μM | 2.5 μM | 72.5 |
| 5 | 2.5 μM $[Mn_2(\mu\text{-}O)_3(Me_3\text{-}TACN)_2]^2$ | 2.5 μM | 5 μM | 69.3 |
| 6 | 2.5 μM $[Mn_2(\mu\text{-}O)_3(Me_3\text{-}TACN)_2]^{2+}$ | 2.5 μM | 10 μM | 61.7 |
| 7 | 2.5 μM $[Mn_2(\mu\text{-}O)_3(Me_3\text{-}TACN)_2]^{2+}$ | | | 78.1 |
| 8 | 2.5 μM $[Mn_2(\mu\text{-}O)_3(Me_3\text{-}TACN)_2]^{2+}$ | | 2.5 μM | 73.3 |
| 9 | 2.5 μM $[Mn_2(\mu\text{-}O)_3(Me_3\text{-}TACN)_2]^{2+}$ | | 5 μM | 66.6 |
| 10 | 2.5 μM $[Mn_2(\mu\text{-}O)_3(Me_3\text{-}TACN)_2]^{2+}$ | | 10 μM | 56.8 |
| 11 | 5 μM $[Mn_2(\mu\text{-}O)_3(Me_3\text{-}TACN)_2]^{2+}$ | | | 61.0 |
| 12 | 5 μM $[Mn_2(\mu\text{-}O)_3(Me_3\text{-}TACN)_2]^{2+}$ | | 5 μM | 54.0 |
| 13 | 5 μM $[Mn_2(\mu\text{-}O)_3(Me_3\text{-}TACN)_2]^{2+}$ | | 10 μM | 47.7 |
| 14 | 5 μM $[Mn_2(\mu\text{-}O)_3(Me_3\text{-}TACN)_2]^{2+}$ | | 20 μM | 38.1 |

The data presented in Table 16 show that the addition of $Me_3$TACN ligand to either $MnSO_4$, $[Mn_2(\mu\text{-}O)_3(Me_3\text{-}TACN)_2]^{2+}$ or $[Mn_2(\mu\text{-}O)_3(Me_3\text{-}TACN)_2]^{2+}$ mixed with one equivalent of ascorbic acid, lead in all cases to a significant decrease in the viscosity of the alginate, i.e. to an increase in depolymerisation of the alginate chains. Thus, adding $Me_3$-TACN ligand to the $Me_3$-TACN-containing manganese catalyst or adding molar excess of $Me_3$-TACN ligand to a manganese salt has a beneficial effect on the performance of the system.

Experiment 16 Depolymerisation of Alginate with $[Mn_2(\mu\text{-}O)_2(\mu\text{-}CH_3COO)(Mea\text{-}DTNE)]Cl_2$, Combined with $H_2O_2$ These experiments were carried out by treating an alginate solution (1.4% in water) with 10 mM hydrogen peroxide and $[Mn_2(\mu\text{-}O)_2(\text{—}CH_3COO)(Me_4\text{-}DTNE)]^{2+}$. The pH ranged from pH 7.5 to pH 9 and no buffer was used. The level of catalyst in solution was either 0 μM (reference experiment), 2.5 μM or 5 μM. The results of the experiments are listed in Table 17.

TABLE 17

Viscosity loss of an alginate solution upon treatment with $H_2O_2$ and $[Mn_2(\mu\text{-}O)_2(\mu\text{-}CH_3COO)(Me_4\text{-}DTNE)]^{2+}$. Conditions: 10 mM $H_2O_2$, pH 7.5-9; 0, 2.5 or 5 μM $[Mn_2(\mu\text{-}O)_2(\mu\text{-}CH_3COO)(Me_4\text{-}DTNE)]^{2+}$; 60 min treatment time at 50° C.

| | Dynamic Viscosity (mPa · s) | | | |
|---|---|---|---|---|
| Catalyst | pH 7.5 | pH 8.0 | pH 8.5 | pH 9.0 |
| None | 96.5 | 97.2 | 98.6 | 99.9 |
| 2.5 μM $[Mn_2(\mu\text{-}O)_2(\mu\text{-}CH_3COO)(Me_4\text{-}DTNE)]^{2+}$ | 82.3 | 82.9 | 80.7 | n.d. |
| 5.0 μM $[Mn_2(\mu\text{-}O)_2(\mu\text{-}CH_3COO)(Me_4\text{-}DTNE)]^{2+}$ | 49.4 | 53.7 | 51.5 | 62.9 |

n.d.: not done

TABLE 18

Influence of the pH and concentration of $[Mn_2(\mu\text{-}O)_3(Me_3\text{-}TACN)_2](CH_3COO)_2$ in solution on the degree of depolymerisation of alginate. Conditions: 20 mM $H_2O_2$; 4.7 mM $NaHCO_3$; 0, 5 and 10 μM $[Mn_2(\mu\text{-}O)_3(Me_3\text{-}TACN)_2](CH_3COO)_2$, pH 8-10.5; 1 h reaction time at 40° C.

| $[Mn_2(\mu\text{-}O)_3(Me_3\text{-}$ | Dynamic Viscosity (mPa · s) | | | | |
|---|---|---|---|---|---|
| $TACN)_2]^{2+}$ | pH 8.0 | pH 9.0 | pH 9.5 | pH 10.0 | pH 10.5 |
| 0 | 94.9 | 92.0 | 91.0 | 94.7 | 91.6 |
| 5 μM | n.d | 17.9 | n.d | 54.2 | n.d |
| 10 μM | 24.2 | 9.1 | 10.5 | n.d | 65.5 |

n.d.: not done

The data presented in Table 18 show that an effective viscosity loss can be obtained when using $[Mn^{IV}_2(\mu\text{-}O)_3(Me_3\text{-}TACN)_2](CH_3COO)_2$ at various pHs in a solution containing carbonate. It should be noted that, as in Experiment 4, a clear reduction in the viscosity of alginate was observed over a wide pH range.

Experiment 18 pH Dependent Depolymerisation of Alginate by $[Mn^{IV}_2(\mu\text{-}O)_3(Me_3\text{-}TACN)_2](CH_3COO)_2$/Ascorbic Acid and $H_2O_2$ in Carbonate Buffer The tests described in "Experiment 5" were repeated at 40° C. for one hour. The pH range was investigated from pH 8.0 to 10.5. Results are shown in Table 19.

TABLE 19

Alginate depolymerisation by $[Mn_2(\mu\text{-}O)_3(Me_3\text{-}TACN)_2](CH_3COO)_2$ premixed with ascorbic acid. Conditions: 20 mM $H_2O_2$; 4.7 mM $NaHCO_3$; pH from 8.0 to 10.5; 0, 5 and 10 μM $[Mn_2(\mu\text{-}O)_3(Me_3\text{-}TACN)_2](CH_3COO)_2$ premixed with 1 molar equivalent of ascorbic acid; 60 minutes reaction time at 40° C.

| $[Mn_2(\mu\text{-}O)_3(Me_3\text{-}TACN)_2]^{2+}$/ | Dynamic Viscosity (mPa.s) | | | | | |
|---|---|---|---|---|---|---|
| Ascorbic acid (1/1) | pH 8.0 | pH 8.5 | pH 9.0 | pH 9.5 | pH 10.0 | pH 10.5 |
| 0 | 94.9 | 91.4 | 92.0 | 91.0 | 94.7 | 91.6 |
| 5 μM | 32.8 | 23.5 | 12.6 | 18.5 | 56.3 | 67.6 |
| 10 μM | 22.6 | 13.7 | 7.4 | 9.8 | 12.5 | 48.5 |

The data presented in Table 17 show that under the conditions tested, addition of $[Mn_2(\mu\text{-}O)_2(\mu\text{-}CH_3COO)(Me_4\text{-}DTNE)]^{2+}$ to the solutions lead to a loss of viscosity. Furthermore, the viscosity of the alginate solutions treated by this catalyst was also reduced when the pH of the solution was low and near neutral. These results are markedly different from those obtained when using $[Mn_2(\mu\text{-}O)_3(Me_3\text{-}TACN)_2]^{2+}$, where higher viscosity loss was observed at higher pH's (see Experiment 1).

Experiment 17 pH Dependent Depolymerisation of Alginate by $[Mn^{IV}_2(\mu\text{-}O)_3(Me_3\text{-}TACN)_2](CH_3COO)_2$ and $H_2O_2$ in Carbonate Buffer The tests described in "Experiment 4" were repeated at 40° C. for one hour. The pH range was investigated from pH 8.0 to 10.5. Results are shown in Table 18.

The data presented in Table 19 show that at various pHs, in a solution containing carbonate, an effective viscosity loss can be obtained when using $[Mn^{IV}_2(\mu\text{-}O)_3(Me_3\text{-}TACN)_2](CH_3COO)_2$ combined with ascorbic acid. The highest activity is observed with a pH range of about pH 9-9.5. Again, as in Experiment 5, a clear reduction in the viscosity of alginate was observed over a wide pH range.

Experiment 19 Effect of Using Dequest 2047 on Depolymerisation of Alginate by $[Mn^{IV}_2(\mu\text{-}O)_3(Me_3\text{-}TACN)_2](CH_3COO)_2$/Ascorbic Acid, $H_2O_2$ in Carbonate Buffer The tests described in "Experiment 18" were repeated using Dequest 2047 as a sequestrant, at 40° C. for one hour. The pH range investigated was from pH 8.0 to 10.5. Results are shown in Table 20.

TABLE 20

Alginate depolymerisation by $[Mn_2(\mu\text{-}O)_3(Me_3\text{-}TACN)_2](CH_3COO)_2$ mixed with ascorbic acid. Conditions: 20 mM $H_2O_2$; 4.7 mM $NaHCO_3$; 0, 1 mM Dequest 2047; pH from 8.0 to 10.5; 0, 10 μM $[Mn_2(\mu\text{-}O)_3(Me_3\text{-}TACN)_2](CH_3COO)_2$ premixed with 1 molar equivalent of ascorbic acid; 60 minutes reaction time at 40° C.

| | Dynamic Viscosity (mPa · s) | | | |
|---|---|---|---|---|
| Dequest 2047 | pH 8.0 | pH 9.0 | pH 10.0 | pH 10.5 |
| 0 mM | 22.6 | 7.4 | 12.6 | 48.5 |
| 0.2 mM | n.d. | n.d. | n.d. | 9.2 |
| 1 mM | 71.8 | 9.1 | 3.5 | 4.8 |

n.d.: not done

The data presented in Table 20 show the effect of adding Dequest 2047 to a carbonate containing solution comprising hydrogen peroxide and different concentrations of $[Mn^{IV}_2(\mu\text{-}O)_3(Me_3\text{-}TACN)_2](CH_3COO)_2$ premixed with ascorbic acid. The data in Table 19 show that, in the absence of Dequest 2047, an effective viscosity loss is obtained at a pH of about 8.5 to 10. The data in Table 20 show that Dequest 2047 has a significant positive effect on alginate depolymerization at high pH (about 10 to 10.5), whilst at pH 8 there is a strong inhibiting effect of Dequest 2047 on the alginate degradation activity. The viscosity loss increases at higher pHs when the amount of Dequest 2047 used increases from 0 to 1 mM.

Experiment 20 pH Dependent Depolymerisation of Alginate by $[Mn^{IV}_2(\mu\text{-}O)_3(Me_3\text{-}TACN)_2](PF_6)_2$/Ascorbic Acid and $H_2O_2$ in Carbonate Buffer Similar experiments to those of "Experiment 18" were carried out at 40° C. between pH values of 8 to 10.5 using 0, 5 and 10 μM $[Mn^{IV}_2(\mu\text{-}O)_3(Me_3\text{-}TACN)_2](PF_6)_2$ premixed with ascorbic acid, and $H_2O_2$ in carbonate buffer. Results are presented in Table 21.

TABLE 21

Alginate depolymerisation by $[Mn_2^{IV}(\mu\text{-}O)_3(Me_3\text{-}TACN)_2](PF_6)_2$ premixed with ascorbic acid. Conditions: 20 mM $H_2O_2$; 4.7 mM $NaHCO_3$; pH from 8.0 to 10.5; 0, 5 and 10 μM $[Mn_2^{IV}(\mu\text{-}O)_3(Me_3\text{-}TACN)_2](PF_6)_2$ premixed with 1 molar equivalent of ascorbic acid; 60 minutes reaction time at 40° C.

| $[Mn_2^{IV}(\mu\text{-}O)_3(Me_3\text{-}TACN)_2](PF_6)_2$/ | Dynamic Viscosity (mPa.s) | | | | | |
|---|---|---|---|---|---|---|
| Ascorbic acid (1/1) | pH 8.0 | pH 8.5 | pH 9.0 | pH 9.5 | pH 10.0 | pH 10.5 |
| 0 | 94.9 | 91.4 | 92.0 | 91.0 | 94.7 | 91.6 |
| 5 uM | 39.2 | 38.7 | 19.5 | 23.2 | n.d | 65.1 |
| 10 uM | 24.3 | 18.1 | 9.1 | 10.8 | n.d | 49.0 |

n.d.: not done

The data presented in Table 21 show that in a carbonate containing solution at various pHs, an effective viscosity loss can be obtained when using $[Mn^{IV}_2(\mu\text{-}O)_3(Me_3\text{-}TACN)_2](PF_6)_2$. The highest activity is observed with a pH range of about pH 8.5-9. Comparing the results in Tables 19 and 21 confirms that both catalyst salts (with acetate and $PF_6$ counterions respectively) show almost the same high activity in alginate depolymerization.

Experiment 21 Temperature Dependent Depolymerisation of Alginate by $[Mn_2(\mu\text{-}O)_3(Me_3\text{-}TACN)_2](CH_3COO)_2$/Ascorbic Acid and $H_2O_2$ in Carbonate Buffer The best conditions for alginate depolymerization at 40° C. were repeated at room temperature for one hour. The results are shown in Table 22.

TABLE 22

Alginate depolymerisation by $[Mn_2(\mu\text{-}O)_3(Me_3\text{-}TACN)_2](CH_3COO)_2$ mixed with/without ascorbic acid. Conditions: 20 mM $H_2O_2$; 4.7 mM $NaHCO_3$; 0 or 1 mM Dequest 2047; pH from 9.0 to 10.5; 10 μM $[Mn_2(\mu\text{-}O)_3(Me_3\text{-}TACN)_2](CH_3COO)_2$ premixed with 0 or 1 molar equivalent of ascorbic acid; 60 minutes reaction time at room temperature.

| | pH | Dequest 2047(mM) | Dynamic Viscosity (mPa · s) |
|---|---|---|---|
| $[Mn_2(\mu\text{-}O)_3(Me_3\text{-}TACN)_2]^{2+}$/ Ascorbic acid (1/1) | 9.0 | 0 | 7.9 |
| $[Mn_2(\mu\text{-}O)_3(Me_3\text{-}TACN)_2]^{2+}$ | 9.5 | 0 | 19.3 |
| $[Mn_2(\mu\text{-}O)_3(Me_3\text{-}TACN)_2]^{2+}$/ Ascorbic acid (1/1) | 9.5 | 0 | 24.9 |
| $[Mn_2(\mu\text{-}O)_3(Me_3\text{-}TACN)_2]^{2+}$ | 10.5 | 1.0 | 42.6 |
| $[Mn_2(\mu\text{-}O)_3(Me_3\text{-}TACN)_2]^{2+}$/ Ascorbic acid (1/1) | 10.5 | 1.0 | 41.3 |

n.d.: not done

The data presented in Table 22 indicate alginate depolymerisation at room temperature. Reference measurements (alginate treatment without Mn catalyst) gave dynamic viscosity values of between 90 and 100 mPa·s.

The data shown in Table 22 reveal that $[Mn_2(\mu\text{-}O)_3(Me_3\text{-}TACN)_2](CH_3COO)_2$ premixed with 0 or1 molar equivalent of ascorbic acid has a significant effect on alginate degradation at room temperature. In particular, when compared with the data presented in Table 19, the experiments conducted at pH 9.0 show that a temperature reduction of about 20° C. leads to only a modest reduction in the degree of alginate degradation, with the final viscosity increasing from 7.4 (at 40° C.) to 7.9 (at room temperature).

Experiment 22 Biofilm Ex *Pseudomonas aeruginosa* Removal by Mixtures of Hydrogen Peroxide (Reference Experiments)

This test was adapted from the 'ASTM standard design E2799-17 Standard Test Method for Testing Disinfection Efficiency against *Pseudomonas aeruginosa* Biofilm using the MBEC Assay'. *Pseudomonas aeruginosa* bacterial inocula were prepared in Tryptone Soya Broth (TSB) to a cell density of 1 (+/−0.5)×$10^6$ CFU $mL^{-1}$. 150 μL of each bacterial inoculum were added to each well of two microtiter plates. Each Minimum Biofilm Eradication Concentration (MBEC) device was incubated at 37° C. and 110 rpm for 6 hours. Following incubation, the established biofilms were rinsed three times in 200 μL sterile distilled water in order to remove planktonic organisms. Rinsed biofilms were exposed to a challenge plate containing 200 μL of each in-test mixture of $H_2O_2$ for one hour at 40° C. Then the plates were rinsed three times in 200 μL sterile distilled water and then fixed by adding 300 μL 95% ethanol for 15 min at room temperature (22-24° C.). The biofilm was stained with 150 μL 0.1% Crystal Violet solution for 15 min at room temperature. Stained biofilms were rinsed three times with 200 μL sterile distilled water in order to remove the excess of dye and were left to dry overnight. Then 125 μL of 33% acetic acid was added to solubilise the Crystal Violet dye. The solubilised dye was then transferred to new separate microtiter plates. The biofilm biomass was quantified by measuring the optical density at 595 nm using a microtiter plate reader (Tecan Infinite Pro200). The tests were performed in triplicate.

The following controls were done:

(1) Treating the biofilms with phosphate buffer and 1% Tryptone Soya Broth at 40° C. for one hour (negative control).

(2) Treating the biofilms with a solution of hypochlorite bleach solution (10%) at 40° C. for one hour (positive control).

The results of the tests are as follows (all values given are optical density at 595 nm of the solubilised Crystal Violet Assay and give a measure of the amount of biofilm remaining. A lower value means that more biofilm was removed due to the treatment).

The negative control gave an optical density of 0.56 (+/−0.06)—low biofilm removal—and the positive control an optical density of 0.07 (+/−0.01)—high biofilm removal.

TABLE 23

The optical density of biofilms produced by *Pseudomonas aeruginosa* after one-hour treatment with the test mixtures. SD = Standard deviation. Conditions: 0.396 g/L of sodium carbonate; pH from 8.0 to 10.5; 0, 0.2 and 1 mM Dequest 2047.

| | $H_2O_2$ (mM) | Dequest 2047 (mM) | pH | Optical Density (OD595) (Average ± SD) |
|---|---|---|---|---|
| Mixture B1 | 20 | 0 | 8.0 | 0.23 ± 0.05 |
| Mixture B2 | 20 | 0 | 9.0 | 0.22 ± 0.03 |
| Mixture B3 | 20 | 0 | 10.5 | 0.30 ± 0.04 |
| Mixture B4 | 20 | 1.0 | 10.5 | 0.27 ± 0.04 |
| Mixture B5 | 20 | 0.2 | 10.5 | 0.26 ± 0.03 |

The data presented in Table 23 show that the solutions comprising hydrogen peroxide removed biofilm to give optical densities of between 0.22 (mixture B2) and 0.30 (mixture B3). These results show that only a moderate biofilm removal can be achieved by the different hydrogen peroxide solutions.

Experiment 23 Biofilm Ex *Pseudomonas aeruginosa* Removal by $[Mn^{IV}_2(\mu\text{-}O)_3(Me_3\text{-}TACN)_2](CH_3COO)_2$ or $[Mn^{IV}_2(\mu\text{-}O)_3(Me_3\text{-}TACN)_2](CH_3COO)_2$/Ascorbic Acid Solutions of carbonate buffer (0.396 g/L sodium carbonate; pH 8 to 10.5), different levels of $H_2O_2$ (5, 10 and 20 mM), without and with Dequest 2047 (0.2 and 1 mM) with 5 or 10 μM of $[Mn^{IV}_2(\mu\text{-}O)_3(Me_3\text{-}TACN)_2](CH_3COO)_2$ or $[Mn^{IV}_2(\mu\text{-}O)_3(Me_3\text{-}TACN)_2](CH_3COO)_2$—premixed with one molar equivalent of ascorbic acid-, were added to the microtiter plate with the biofilm as explained in Experiment 22.

TABLE 24

Optical density of biofilms produced by *Pseudomonas aeruginosa* after one-hour treatment with the test mixtures. SD = Standard deviation. Conditions: 0.396 g/L of sodium carbonate; pH from 8.0 to 10.5; 0, 0.2 and 1 mM Dequest 2047; 20 mM $H_2O_2$.

| | Dequest 2047 (mM) | Mn solution 1 * (μM) | Mn solution 2 * (μM) | pH | Optical Density (OD595) (Average ± SD) |
|---|---|---|---|---|---|
| Mixture 1 | 0 | 0 | 10.0 | 8.0 | 0.11 ± 0.02 |
| Mixture 2 | 0 | 0 | 10.0 | 9.0 | 0.12 ± 0.02 |
| Mixture 3 | 1.0 | 0 | 10.0 | 9.0 | 0.16 ± 0.01 |
| Mixture 4 | 0 | 0 | 10.0 | 9.5 | 0.14 ± 0.01 |
| Mixture 5 | 0 | 10.0 | 0 | 9.5 | 0.11 ± 0.01 |
| Mixture 6 | 1.0 | 5.0 | 0 | 10.0 | 0.16 ± 0.03 |
| Mixture 7 | 1.0 | 0 | 10.0 | 10.0 | 0.18 ± 0.03 |
| Mixture 8 | 0 | 10.0 | 0 | 10.0 | 0.11 ± 0.01 |
| Mixture 9 | 0 | 0 | 10.0 | 10.0 | 0.15 ± 0.02 |
| Mixture 10 | 1.0 | 0 | 5.0 | 10.5 | 0.20 ± 0.02 |
| Mixture 11 | 1.0 | 5.0 | 0 | 10.5 | 0.21 ± 0.01 |
| Mixture 12 | 1.0 | 10.0 | 0 | 10.5 | 0.20 ± 0.01 |
| Mixture 13 | 0.2 | 0 | 5.0 | 10.5 | 0.17 ± 0.01 |

* Mn solution 1 = $[Mn_2(\mu\text{-}O)_3(Me_3\text{-}TACN)_2]^{2+}$

* Mn solution 2 = $[Mn_2(\mu\text{-}O)_3(Me_3\text{-}TACN)_2]^{2+}$/Ascorbic acid (1/1)

The data presented in Table 24 show that the optical densities at 595 nm of the Violet Dye varied between 0.11 and 0.21 (with the negative control giving 0.46 and the positive control giving 0.12 in this experiment—see Experiment 22 for the definitions of negative and positive control). Mixtures 1, 2, 5, and 8 give particularly low optical density values, showing that a large extent of the biofilm was removed. However, even the mixtures that show moderate biofilm removal (mixtures 10-13) are all significantly better than the reference examples discussed in Experiment 22 (1B3-1B5).

The outcome of Experiments 22 and 23 clearly show that the mixtures comprising low concentrations of $[Mn^{IV}_2(\mu\text{-}O)_3(Me_3\text{-}TACN)_2](CH_3COO)_2$ yield a significant improvement of biofilm removal compared to similar solutions that do not contain $[Mn^{IV}_2(\mu\text{-}O)_3(Me_3\text{-}TACN)_2](CH_3COO)_2$. It was noted that the same conditions that led to a clear biofilm reduction, also led to lower alginate viscosity in the experiments conducted using alginate as model polysaccharide for biofilm (vide supra, Experiments 17-21).

Experiment 24 Biofilm Removal Ex *Staphylococcus epidermidis* by Mixtures of Hydrogen Peroxide (Reference Experiments)

These experiments were done exactly in the same manner as described for Experiment 22, except that now *Staphylococcus epidermidis* was used to generate the biofilm.

The negative control gave an optical density of 0.32 (+/−0.04)—low biofilm removal—and the positive control an optical density of 0.06 (+/−0.00)—high biofilm removal.

TABLE 25

Optical density of biofilms produced by *Staphylococcus epidermidis* after one-hour treatment with the test mixtures. SD = Standard deviation. Conditions: 0.396 g/L of sodium carbonate; pH from 8.0 to 10.5; 0, 0.2 and 1 mM Dequest 2047.

| | $H_2O_2$ (mM) | Dequest 2047 (mM) | pH | Optical Density (OD595) (Average ± SD) |
|---|---|---|---|---|
| Mixture B1 | 20 | 0.2 | 8.0 | 0.22 ± 0.01 |
| Mixture B2 | 20 | 0 | 9.0 | 0.19 ± 0.01 |
| Mixture B3 | 20 | 1.0 | 10.5 | 0.24 ± 0.05 |

The data presented in Table 25 show that application of hydrogen peroxide at different pH's leads to a moderate amount of biofilm being removed (in agreement with Experiment 22).

Experiment 25 Biofilm Ex *Staphylococcus epidermidis* Removal by $[Mn^{IV}_2(\mu\text{-}O)_3(Me_3\text{-}TACN)_2](CH_3COO)_2$ or $[Mn^{IV}_2(\mu\text{-}O)_3(Me_3\text{-}TACN)_2](CH_3COO)_2$/Ascorbic Acid These experiments were done exactly in the same manner as described for Experiment 23, except that now *Staphylococcus epidermidis* was used to generate the biofilm. The conditions and results are shown in Table 26.

TABLE 26

Optical density of biofilms produced by *Staphylococcus epidermidis* after one-hour treatment with the test mixtures. SD = Standard deviation. Conditions: 0.396 g/L of sodium carbonate; pH from 8.0 to 10.5; 0, 0.2 and 1 mM Dequest 2047; 20 mM $H_2O_2$.

| | Dequest 2047 (mM) | Mn solution 1 * (μM) | Mn solution 2 * (μM) | pH | Optical Density (OD595) (Average ± SD) |
|---|---|---|---|---|---|
| Mixture 1 | 0 | 0 | 10.0 | 8.0 | 0.09 ± 0.02 |
| Mixture 2 | 0 | 0 | 10.0 | 9.0 | 0.08 ± 0.01 |
| Mixture 3 | 1.0 | 0 | 10.0 | 9.0 | 0.09 ± 0.01 |
| Mixture 4 | 0 | 0 | 10.0 | 9.5 | 0.08 ± 0.01 |
| Mixture 5 | 0 | 10.0 | 0 | 9.5 | 0.07 ± 0.01 |
| Mixture 6 | 1.0 | 5.0 | 0 | 10.0 | 0.08 ± 0.01 |
| Mixture 7 | 1.0 | 0 | 10.0 | 10.0 | 0.09 ± 0.01 |
| Mixture 8 | 0 | 10.0 | 0 | 10.0 | 0.07 ± 0.01 |
| Mixture 9 | 0 | 0 | 10.0 | 10.0 | 0.17 ± 0.03 |
| Mixture 10 | 1.0 | 5.0 | 0 | 10.5 | 0.10 ± 0.01 |
| Mixture 11 | 1.0 | 10.0 | 0 | 10.5 | 0.09 ± 0.02 |
| Mixture 12 | 0.2 | 0 | 5.0 | 10.5 | 0.16 ± 0.03 |

* Mn solution 1 = $[Mn_2(M\text{-}O)_3(Me_3\text{-}TACN)_2]^{2+}$

* Mn solution 2 = $[Mn_2(M\text{-}O)_3(Me_3\text{-}TACN)_2]^{2+}$/Ascorbic acid (1/1)

The data presented in Table 26 show that treatment of biofilm produced by *Staphylococcus epidermidis* with many of the mixtures comprising $[Mn_2(\mu\text{-}O)_3(Me_3\text{-}TACN)_2]^{2+}$, with or without pre-treatment with ascorbic acid, reduced the optical density of the biofilm to between 0.07 and 0.1 (i.e. treatment resulted in good biofilm removal). Mixtures 1-8, 10 and 11 in particular were highly active in biofilm removal. Although Mixtures 9 and 12 resulted in moderate levels of biofilm removal, these levels are substantially better than the negative control, which gave an optical density reading of 0.31.

Experiments 23 and 25 clearly show that the mixtures comprising low concentrations of $[Mn^{IV}_2(\mu\text{-}O)_3(Me_3\text{-}TACN)_2](CH_3COO)_2$ yield a significant improvement of biofilm removal compared to reference solutions that do not contain $[Mn^{IV}_2(\mu\text{-}O)_3(Me_3\text{-}TACN)_2](CH_3COO)_2$.

The degradation of two biofilms originating from very different bacteria is clearly enhanced when $[Mn^{IV}_2(\mu\text{-}O)_3(Me_3\text{-}TACN)_2](CH_3COO)_2$ is present. *Staphylococcus epidermidis* are Gram-positive bacteria and contain murein. *Pseudomonas aeruginosa* are Gram-negative bacteria and contain alginate in the EPS. The results described in Experiments 22-25 show that enhanced biofilm degradation by aqueous mixtures comprising $[Mn^{IV}_2(\mu\text{-}O)_3(Me_3\text{-}TACN)_2](CH_3COO)_2$ is not restricted to alginate-comprising biofilms.

Experiment 26 Biofilm Ex *Pseudomonas aeruginosa* Removal in a CDC Reactor by $[Mn^{IV}_2(\mu\text{-}O)_3(Me_3\text{-}TACN)_2](CH_3COO)_2$ or $[Mn^{IV}_2(\mu\text{-}O)_3(Me_3\text{-}TACN)_2](CH_3COO)_2$/Ascorbic Acid Based on the outcome of Experiments 23 and 25, additional tests were done in a Center for Disease Control (CDC) biofilm reactor which is a standard set-up widely used to study biofilms formation and removal (for a recent review on various reactors to study biofilms, see for example, I. B. Gomes, et al., Critical Reviews in Biotechn., 38(5), 657-680 (2018).

This is a larger scale set-up which can be used to assess the biofilm removal and to count the number of bacteria after treatment. It is seen as a good model for realistic biofilm removal.

*Pseudomonas aeruginosa* cultured for 24 hours was harvested from a Tryptone Soya Agar (TSA) plate and used to prepare individual 1 (+/−0.5)x$10^8$ CFU $mL^{-1}$ suspensions in Tryptone Soya Broth (TSB). Each bacterial suspension was further diluted in TSB to prepare 1 (+/−0.5)x107 CFU $mL^{-1}$ suspensions. 400 mL of the bacterial inocula (the bacterial suspension) were transferred to separate sterile CDC reactors containing polycarbonate coupons (purchased from BIOSURFACE TECHNOLOGIES, diameter ~1.3 cm, thickness ~3.00 mm), on which the biofilms are grown. Single biofilms were grown for 24 h at 37° C. on a magnetic stirrer at 120 rpm. Following 24 h incubation, pre-formed biofilms were washed with sterilised distilled water to remove planktonic organisms. Pre-formed biofilms attached to the polycarbonate coupons were treated with the mixtures comprising the manganese complexes (described below) at 40° C. for 1 h. One set of treated coupons were analysed using crystal violet staining (as outlined in Experiment 22) and a second set of coupons were analysed to count the number of bacteria using the plate count method. All coupons were tested/analysed in triplicate.

The first mixture contained 20 mM $H_2O_2$, no Dequest 2047, pH 9.0, 0.396 g/L sodium carbonate buffer, 10 μM $[Mn^{IV}_2(\mu\text{-}O)_3(Me_3\text{-}TACN)_2](CH_3COO)_2$ premixed with 1 molar equivalent of ascorbic acid (denoted below as 'first mixture').

The second mixture contained 20 mM $H_2O_2$, no Dequest 2047, pH 9.5, 0.396 g/L sodium carbonate buffer, 10 μM $[Mn^{IV}_2(\mu\text{-}O)_3(Me_3\text{-}TACN)_2](CH_3COO)_2$ (denoted below as 'second mixture').

The third mixture contained 20 mM $H_2O_2$, 1 mM Dequest 2047, pH 10.5, 0.396 g/L sodium carbonate buffer, 10 μM $[Mn^{IV}_2(\mu\text{-}O)_3(Me_3\text{-}TACN)_2](CH_3COO)_2$ (denoted below as 'third mixture').

A negative control was done by treatment of the biofilms at room temperature for 1 h in a phosphate buffer and TSB solution. A positive control was done by treatment of the biofilms at 40° C. for 1 h, after which the coupons were sonicated and washed 3 times with distilled water.

The results of the experiments were as follows.

The negative control gave an optical density of 0.18 (+/−0.11) and the positive control gave an optical density of 0.00 or 100% reduction compared to the negative control.

The first mixture of the catalyst gave a reading of 0.02 (+/−0.01) or 89% reduction compared to the negative control.

The second mixture of the catalyst gave a reading of 0.05 (+/−0.03) or 70% reduction compared to the negative control.

The third mixture of the catalyst gave a reading of 0.02 (+/−0.03) or 87% reduction compared to the negative control.

Also, the biofilms were analysed for the number of bacteria remaining after treatment. To this end, a viable *Pseudomonas aeruginosa* recovery of 6.19 (+/−0.14) log $CFUmL^{-1}$ was obtained from the negative control. No viable *Pseudomonas aeruginosa* was recovered after the positive control treatment.

The analyses of the biofilms treated with the first to third mixtures yielded the following Log bacterial counts and Log reduction in bacterial count compared to the negative control.

The first mixture of the catalyst gave a recovery of 4.57 (+/−0.24) or a Log reduction of 1.63.

The second mixture of the catalyst gave a recovery of 4.91 (+/−0.30) or a Log reduction of 1.28.

The third mixture of the catalyst gave a recovery of 3.04 (+/−0.20) or a Log reduction of 3.15.

Experiment 27 Biofilm Ex *Staphylococcus epidermis* Removal in a CDC Reactor by $[Mn^{IV}_2(\mu\text{-}O)_3(Me_3\text{-}TACN)_2](CH_3COO)_2$ or $[Mn^{IV}_2(\mu\text{-}O)_3(Me_3\text{-}TACN)_2](CH_3COO)_2$/Ascorbic Acid The same set up and procedures were followed as described in Experiment 26, except that now *Staphylococcus epidermis* biofilm was used in the CDC reactor.

The results of the experiments were as follows.

The negative control gave an optical density of 2.99 (+/−0.64) and the positive control gave an optical density of 0.10 (+/−0.64), which is 96.5% reduction compared to the negative control.

The first mixture of the catalyst gave a reading of 0.95 (+/−0.34) or 68% reduction compared to the negative control.

The second mixture of the catalyst gave a reading of 0.79 (+/−0.13) or 74% reduction compared to the negative control.

The third mixture of the catalyst gave a reading of 0.42 (+/−0.18) or 86% reduction compared to the negative control.

Also, the biofilms were analysed for the number of bacteria remaining after treatment. To this end, a viable *Staphylococcus epidermis* recovery of 7.29 (+/−0.36) log $CFUmL^{-1}$ was obtained from the negative control. No viable *Staphylococcus epidermis* was recovered after the positive control treatment.

The analyses of the biofilms treated with the first to third mixtures yielded the following Log bacterial counts and Log reduction in bacterial count compared to the negative control.

The first mixture of the catalyst gave a recovery of 6.02 (+/−0.40) or a Log reduction of 1.27.

The second mixture of the catalyst gave a recovery of 6.44 (+/−0.87) or a Log reduction of 0.85.

The third mixture of the catalyst gave a recovery of 5.12 (+/−0.83) or a Log reduction of 2.17.

The results described in Experiments 26 and 27 clearly show that the first to third mixtures degrade the biofilm matrix produced by two different bacteria. These results are in complete agreement with the results discussed in Experiments 23 and 25. Furthermore, it was shown that the number of residual bacteria was significantly lower after treatment with the first to third mixtures due to the partial removal of the biofilm.

The invention claimed is:

1. A method of degrading a biofilm comprising contacting the biofilm with an aqueous mixture comprising (i) a peroxide compound and (ii) a mononuclear Mn(II), Mn(III) or Mn(IV), or dinuclear Mn(II)Mn(II), Mn(III)Mn(II), Mn(III)Mn(III), Mn(III)Mn(IV) or Mn(IV)Mn(IV) manganese complex, wherein the aqueous mixture comprises a ligand of formula (I) or (II):

(I)

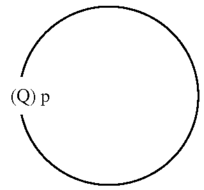

(II)

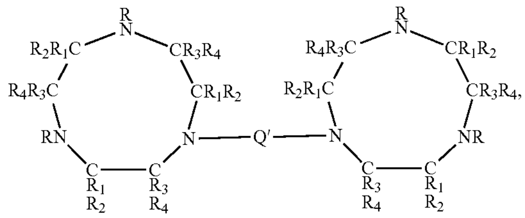

wherein:

Q=

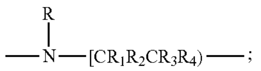

p is 3;

each R is independently selected from the group consisting of hydrogen, $C_1$-$C_{24}$ alkyl, $CH_2C_6$-$C_{10}$_aryl, $CH_2CH_2OH$, $CH_2COOH$, and pyridin-2-ylmethyl;

Q' is an ethylene or propylene bridge; and $R_1$, $R_2$, $R_3$, and $R_4$ are independently selected from: H, $C_1$-$C_4$_alkyl and $C_1$-$C_4$ alkylhydroxy.

2. The method of claim 1, wherein the ligand is 1,4,7-trimethyl-1,4,7-triazacyclononane or 1,2-bis(4,7-dimethyl-1,4,7-triazacyclonon-1-yl)-ethane.

3. The method of claim 1, wherein the manganese complex comprises one or more non-coordinating counterions selected from the group consisting of acetate, chloride, sulfate, nitrate and hexafluorophosphate.

4. The method of claim 1, wherein the manganese complex is any one or a combination selected from the group consisting of mononuclear Mn(II), Mn(III) and Mn(IV), and dinuclear Mn(II)Mn(II), Mn(III)Mn(II), Mn(III)Mn(III) and Mn(III)Mn(IV) complexes.

5. The method of claim 1, wherein the manganese complex is a dinuclear Mn(III)Mn(III), Mn(III)Mn(IV) or Mn(IV)Mn(IV) complex.

6. The method of claim 1, wherein the manganese complex is part of a salt, wherein the salt is any one of the group consisting of $[Mn^{IV}Mn^{IV}(\mu\text{-}O)_3$(1,4,7-trimethyl-1,4,7-triazacyclononane$)_2][CH_3COO]_2$, $[Mn^{IV}Mn^{IV}(\mu\text{-}O)_3$(1,4,7-trimethyl-1,4,7-triazacyclononane$)_2]_2[SO_4]$, $[Mn^{IV}Mn^{IV}(\mu\text{-}O)_3$(1,4,7-trimethyl-1,4,7-triazacyclononane$)_2][NO_3]_2$, $[Mn^{IV}Mn^{IV}(\mu\text{-}O)_3$(1,4,7-trimethyl-1,4,7-triazacyclononane$)_2][PF_6]_2$, or $[Mn^{III}Mn^{IV}(\mu\text{-}O)_2(\mu\text{-}CH_3COO)$(1,2-bis(4,7-dimethyl-1,4,7-triazacyclonon-1-yl)-ethane)][Cl$]_2$.

7. The method of claim 1, wherein the molar ratio of the ligand of formula (I) to manganese is from about 100:1 to about 1.001:1 or the molar ratio of the ligand of formula (II) to manganese is from about 50:1 to about 0.5001:1.

8. The method of claim 1, wherein, prior to the contacting, a dinuclear Mn(III)Mn(III), Mn(III)Mn(IV) or Mn(IV)Mn (IV) manganese compound is contacted with a reducing agent to provide the manganese complex.

9. The method of claim 8, wherein the manganese compound comprises a ligand of formula (I) or (II):

(I)

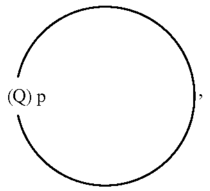

(II)

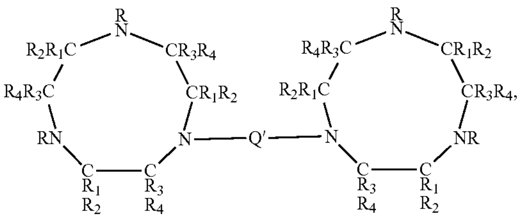

wherein:

Q=

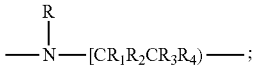

p is 3;

each R is independently selected from the group consisting of hydrogen, $C_1$-$C_{24}$ alkyl, $CH_2C_6$-$C_{10}$_aryl, $CH_2CH_2OH$, $CH_2COOH$, and pyridin-2-ylmethyl;

Q' is an ethylene or propylene bridge; and $R_1$, $R_2$, $R_3$, and $R_4$ are independently selected from: H, $C_1$-$C_4$_alkyl and $C_1$-$C_4$ alkylhydroxy.

10. The method of claim 8, wherein the manganese compound is $[Mn^{IV}Mn^{IV}(\mu\text{-}O)_3$(1,4,7-trimethyl-1,4,7-triazacyclononane$)_2][CH_3COO]_2$, $[Mn^{IV}Mn^{IV}(\mu\text{-}O)_3$(1,4,7-trimethyl-1,4,7-triazacyclononane$)_2]_2[SO_4]$, $[Mn^{IV}Mn^{IV}(\mu\text{-}O)_3$(1,4,7-trimethyl-1,4,7-triazacyclononane$)_2][NO_3]_2$, $[Mn^{IV}Mn^{IV}(\mu\text{-}O)_3$(1,4,7-trimethyl-1,4,7-triazacyclononane$)_2][PF_6]_2$, or $[Mn^{III}Mn^{IV}(\mu\text{-}O)_2(—CH_3COO)$(1,2-bis(4,7-dimethyl-1,4,7-triazacyclonon-1-yl)-ethane)][Cl$]_2$.

11. A method of degrading a biofilm comprising manganese ions, the method comprising contacting the biofilm with an aqueous mixture comprising a peroxide compound and a ligand as defined in claim 1.

12. The method of claim 1, wherein the peroxide compound is selected from the group consisting of hydrogen peroxide, a peroxyacid, an alkylhydroperoxide, a phenylalkylhydroperoxide, and combinations thereof.

13. The method of claim 1, wherein the peroxide compound is a combination of hydrogen peroxide and peracetic acid.

14. The method of claim 1, wherein the pH of the aqueous mixture is from about 6 to about 12.

15. The method of claim 1, wherein the biofilm comprises alginate.

16. The method of claim 8, wherein, the reducing agent is ascorbic acid.

17. The method of claim 11, wherein the ligand is 1,4,7-trimethyl-1,4,7-triazacyclononane or 1,2-bis(4,7-dimethyl-1,4,7-triazacyclonon-1-yl)-ethane.

18. The method of claim 11, wherein the peroxide compound is any one or a combination of the group consisting of hydrogen peroxide, a peroxyacid, an alkylhydroperoxide and a phenylalkylhydroperoxide.

19. The method of claim 11, wherein the pH of the aqueous mixture is from about 6 to about 12.

20. The method of claim 11, wherein the biofilm comprises alginate.

* * * * *